US005459868A

United States Patent [19]
Fong

[11] Patent Number: 5,459,868
[45] Date of Patent: Oct. 17, 1995

[54] INTERPRETIVE OBJECT-ORIENTED FACILITY WHICH CAN ACCESS PRE-COMPILED CLASSES

[75] Inventor: Khai Y. Fong, Greenlodge, Singapore

[73] Assignee: ST Computer Systems & Services, Singapore, Singapore

[21] Appl. No.: 167,703

[22] Filed: Dec. 14, 1993

Related U.S. Application Data

[63] Continuation-in-part of Ser. No. 65,457, May 20, 1993, Pat. No. 5,307,499, which is a continuation of Ser. No. 621,748, Nov. 30, 1990, abandoned.

[51] Int. Cl.$^6$ ........................................... G06F 9/44
[52] U.S. Cl. ............................ 395/700; 364/DIG. 1; 364/280; 364/280.4
[58] Field of Search ......................................... 395/700, 650

[56] References Cited

U.S. PATENT DOCUMENTS

| 4,821,220 | 4/1989 | Duisberg . | |
|---|---|---|---|
| 5,093,914 | 3/1992 | Coplin . | |
| 5,377,350 | 12/1994 | Skinner | 395/600 |
| 5,390,330 | 2/1995 | Talati | 395/700 |
| 5,404,529 | 4/1995 | Chernikoff et al. | 395/700 |

OTHER PUBLICATIONS

Understanding Object–Oriented: A Unifying Paradigm, Korson et al. Communications of the ACM, Sep. 1990, vol. 33, No. 9.
An Object–Oriented Class Library for C++ Programs, Gorlen, Software–Practice and Experience (Dec. 1987), pp. 181–207.
Sun Microsystems's Sun C++ Programmer's Guide (1989), pp. 7–20.
Object–Oriented Modeling and Design, Rumbaugh et al., Appendix B Glossary, 1991.
Versant Technology Datasheet—Versant C++ Application Toolset Versant Report.
Versant Technology Datasheet—Versant C++ Application Toolset Versant Screen.
Stepstone Technical Specification: Objective–C Language, Version 3.3, pp. 1–8, Stepstone Corporation, Sandy Hook, Conn.
Stepstone Technical Specification: Objective–C Interpreter, Version 1.4, pp. 1–12, Stepstone Corporation, Sandy Hook, Conn.

*Primary Examiner*—Kevin A. Kriess
*Attorney, Agent, or Firm*—Steven F. Caserza; Flehr Hohbach Test Albritton & Herbert

[57] ABSTRACT

An object-oriented technology is provided which is capable of operating interpretively to allow prompt and easy prototyping and debugging using a compiled class library, and which is also capable of operating after compilation, thereby providing excellent performance. A software facility allows direct access to class attributes and direct invocation of class methods defined in pre-compiled classes in a class library in an interpretive mode. When this facility is used with or embedded within an application development environment, it allows an application builder to interactively build prototypes as well as production quality applications rapidly. When the facility is integrated with an object-oriented database, it allows interactive query and data manipulation using pre-complied classes.

12 Claims, 7 Drawing Sheets

INTERPRETIVE OBJECT-ORIENTED FACILITY WHICH CAN ACCESS PRE-COMPILED CLASSES

RELATED APPLICATIONS

This is a continuation-in-part of application Ser. No. 08/065,457, filed May 20, 1993, now U.S. Pat. No. 5,307,499, which in turn is a continuation of application Ser. No. 07/621,748, filed Nov. 30, 1990 now abandoned.

BACKGROUND

This invention pertains to object oriented technology, and particularly to a novel object-oriented system which allows direct access to attributes and direct invocation of methods defined in compiled classes in an interpretive mode.

Object-oriented technology is beginning to enjoy widespread popularity in recent years. When using object-oriented technology to build applications, a user must first build the underlying classes. These classes are then used to develop applications in a similar way that integrated circuits are used to build electronic devices. To build these classes and applications, object-oriented languages like Smalltalk and C++ are commonly used. These two languages are unlike each other in one very important aspect. Smalltalk is a fully interpretive language that allows rapid prototyping of classes and applications, but at the expense of performance. On the other hand, programs written in C++ must be compiled and linked before they can be executed. This allows for fast program execution but makes C++ unsuitable for rapid prototyping and debugging.

Given the relative complexity of many object-oriented packages, prototyping and debugging are not simple tasks, but rather involve a considerable amount of effort and a number of iterations in order to perfect the software product. Accordingly, the inability of object-oriented languages to operate in an interpretive fashion makes prototyping and debugging utilizing such non-interpretive software extremely difficult and time-consuming. Conversely, object-oriented technologies which operate in an interpretive manner, but which cannot be compiled, introduces severe performance penalties when utilizing such interpretive object-oriented technologies.

SUMMARY OF THE INVENTION

An objective of this invention is to provide a system and a method for rapid prototyping of object-oriented applications which can be deployed in a production environment. Rapid prototyping requires an interpreter so that the source code of an application can be executed immediately without requiring compilation. Heretofore, applications executed through an interpreter have unacceptable performance and so cannot be used in a production environment. In the prior art, to have acceptable performance, applications must be compiled first into object code. This code is then deployed in a production environment for execution. But this sacrifices rapid prototyping as the compilation which must be done first is an involved and time-consuming process. Therefore, in accordance with the teachings of this invention, rapid prototyping and yet adequate performance for production deployment is provided by the novel concept in which an application is partially interpreted and partially compiled. With object-oriented technology, classes are commercially available for building applications. These classes are building blocks which are available in pre-compiled form to allow developers to create complex applications without the need to create the classes themselves. By providing a system and a method to "assemble" these pre-compiled classes interpretively to build applications, this invention provides rapid prototyping of source code applications that accesses these classes by interpretively executing the source code during prototyping and debugging, while allowing these source code applications to be deployed in a production environment, since these classes are already compiled and therefore offer acceptable performance.

In accordance with this invention, direct access to attributes and direct invocation of methods defined in the compiled classes is performed in an interpretive mode. When this facility is used with or embedded within an application development environment, it allows an application builder to interactively build prototypes as well as production quality applications rapidly. When the facility is integrated with an object-oriented database, it allows interactive query and data manipulation using compiled classes.

DETAILED DESCRIPTION

The following detailed description describes one embodiment of this invention which is particularly well suited for use in the object-oriented language known as C++. However, it is to be understood that the teachings of this invention are equally applicable to any object-oriented technology, including languages other than C++. The following abbreviations are used in the figures:

DT=Dispatch tables

OMF=Object Manipulation Functions

ID=Interpretive dispatcher

OEF=Object Entry Functions

Figure 1:
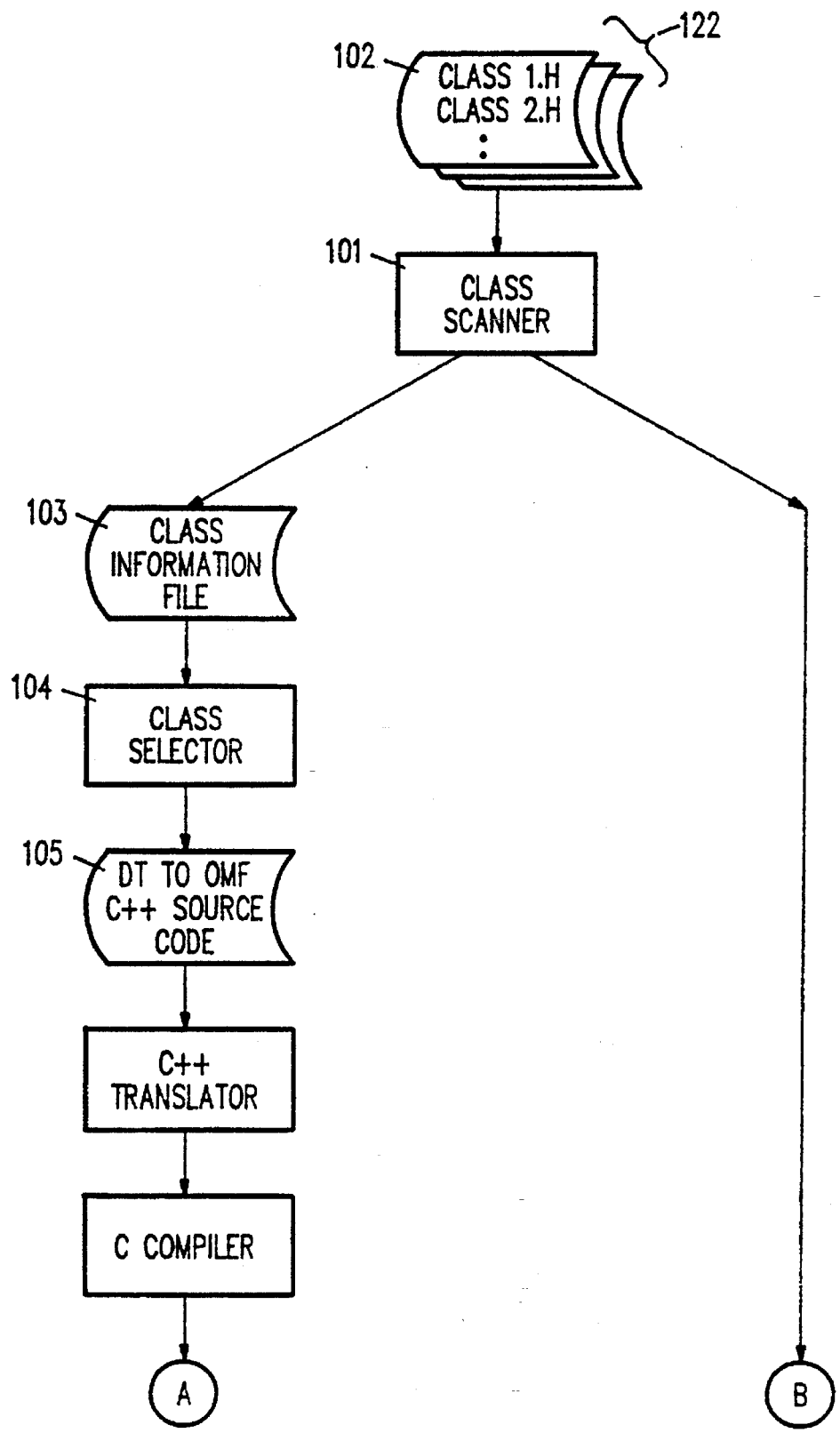
FIGS. 1 through 4 are flow charts depicting one embodiment of this invention.
Figure 2:
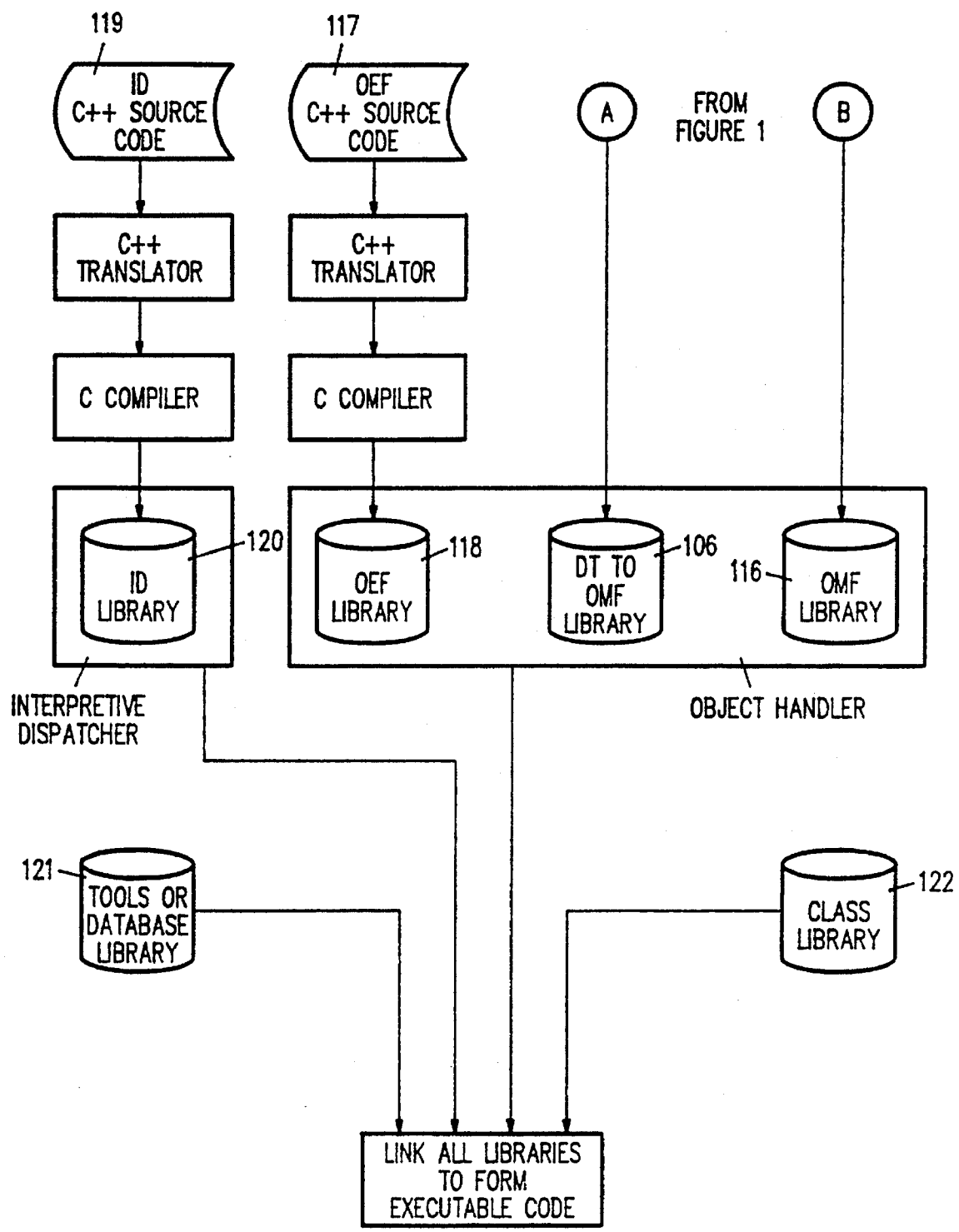

The embodiment of this invention will now be described with reference to FIGS. 1 and 2 which depict the operation of and interaction between the following modules:

a. The Class Scanner. Class Scanner 101 is used to determine the attributes of classes contained in header files 102 of a compiled class library 122. Class Scanner 101 extracts class information 103 from the header files contained in class library 122 in order to have ready access to sufficient information to understand the nature of each class. Class Scanner 101 is, preferably, run only once (unless the library changes), with the extracted information being stored for ready access without the need to run Class Scanner 101 again. In the event class library 122 is altered, Class Scanner 101 can either scan the entire class library again to extract information pertaining to each class, or can be used to extract information only pertaining to the new or altered classes, thus increasing the speed of operation. Besides extracting class information, Class Scanner 101 also generates various Object Manipulation Functions (OMF) 112 (FIG. 3) for each scanned class. These functions perform various operations on objects such as invoking their methods, accessing their attributes, performing object copy, and the like.

b. The Class Selector. Class Selector 104 is a mechanism to allow a user to choose classes from those available on the class information file provided by Class Scanner 101. Only objects from these selected classes are then accessible by Object Handler 130.

c. The Object Handler. Object Handler 130. provides a convenient mechanism for utilizing class information 103 pertaining to each class, which information has been extracted by Class Scanner 101. Object Handler 130 thus allows a user to gain access to an object in a convenient manner.

d. The Interpretive Dispatcher. Interpretive Dispatcher 120 manipulates an object, using the access to the object which is established by Object Handler 104. Interpretive Dispatcher 120 allows immediate execution of object-oriented source code by recognizing and executing the object-oriented code syntax. In accordance with the teachings of this invention, since Class Scanner 101 has extracted information pertaining to each class automatically, Interpretive Dispatcher 120 avoids the need to declare which header files will be used and their attributes, which provides a distinct advantage over prior art object-oriented compilers.

A more detailed description of one embodiment of these modules is now provided.

The Class Scanner

Figure 3:
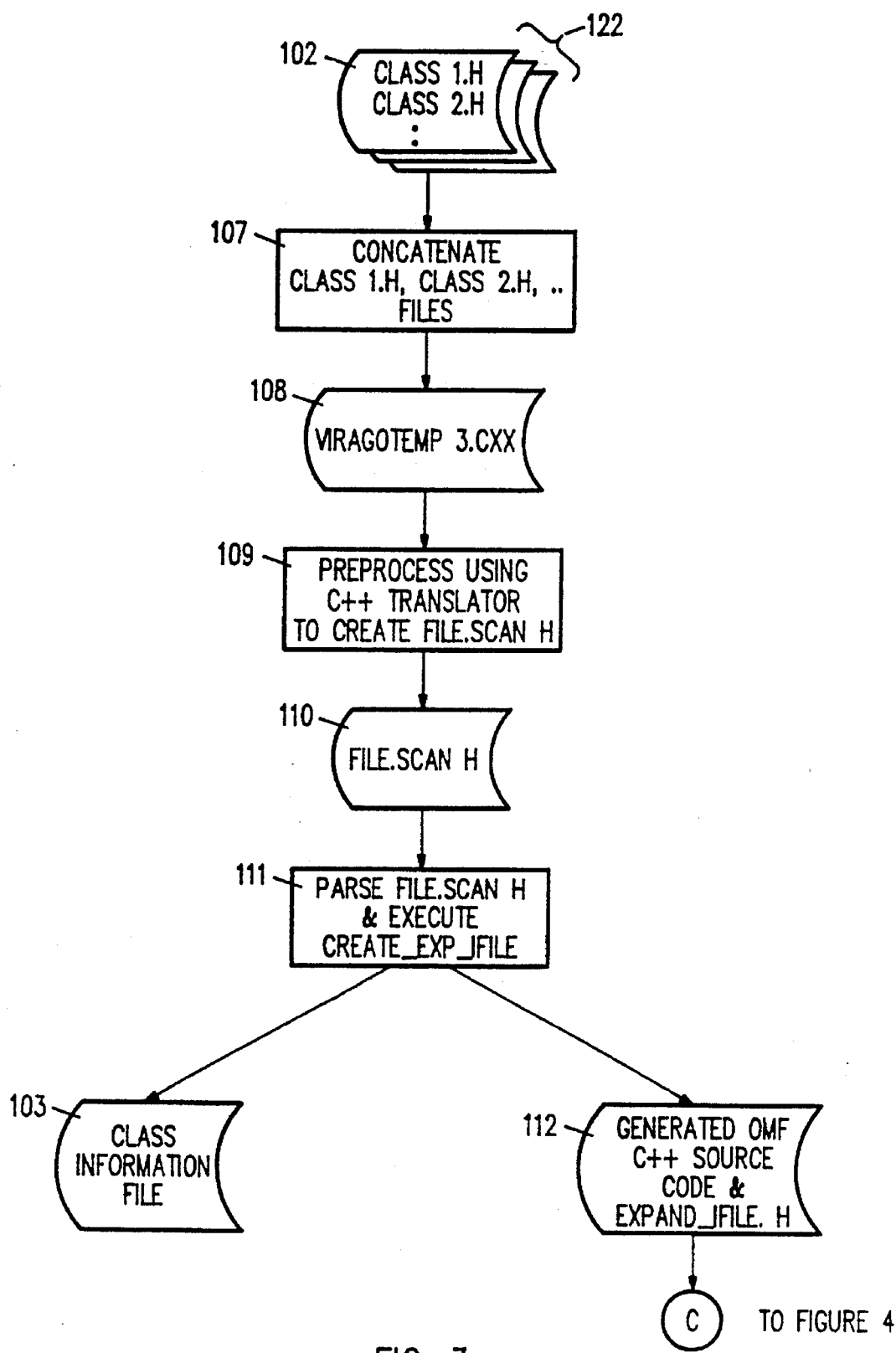
Figure 4:
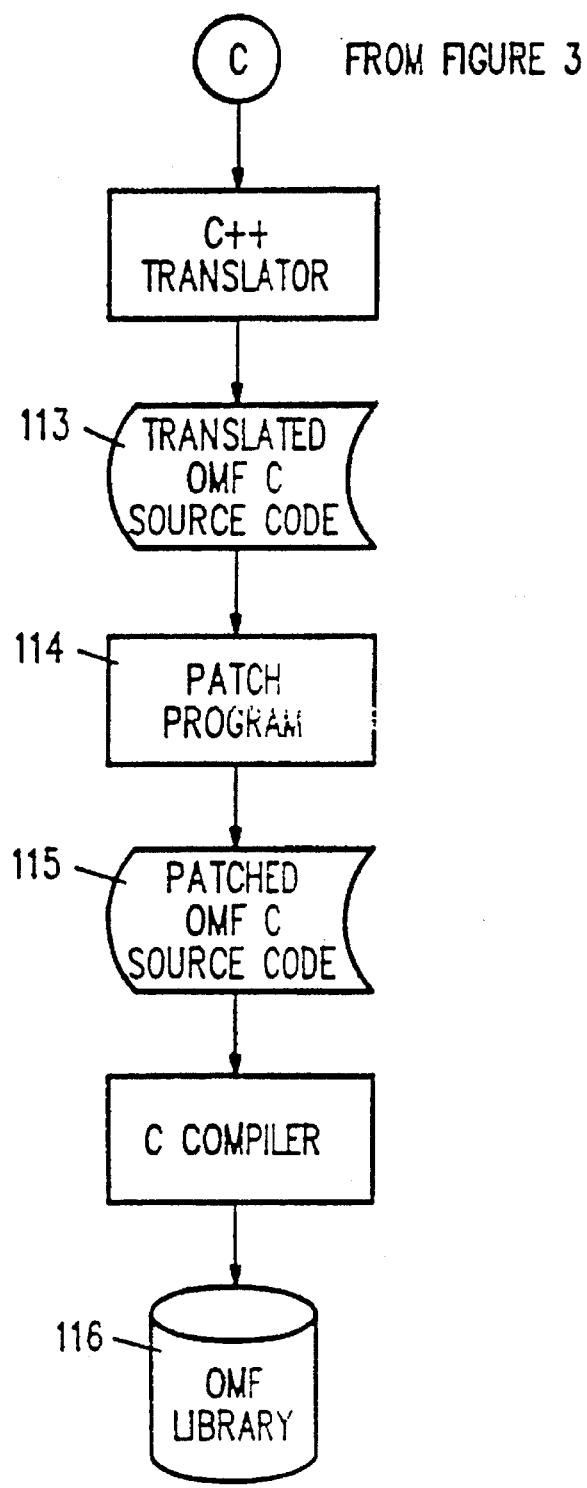

FIGS. 3 and 4 form a flow chart of one embodiment of Class Scanner 101. In order to allow access to classes, the knowledge of the structure of these classes must be made known. In "C++", all class definitions are available and can be found in .h files, which together with the compiled classes form the class library 122. This library could be developed by the user or obtained from external sources. In Step 107, Class Scanner 101 first combines .h files 102 in compiled class library 122 into a single VIRAGOTEMP3.CXX file 108, which is then preprocessed in Step 109 to create File.scanh 110. File.scanh 110 is then parsed in step 111 in order to obtain and store in Class Information file 103 the following information about each class:

a. Class name.

b. Class attributes (e.g. public, protected & private).

c. It's superclass. (or superclasses in case of multiple inheritance).

d. It's Class method (e.g. virtual, public, protected, and private).

e. The argument types of these Class methods.

f. Whether the class is an abstract class.

Besides this information, Class Scanner 101 also stores information about typedefs and global variable declarations.

Class Scanner 101 also generates through Step 111 C++ source code to form various Object Manipulation Functions (OMF) 112 to perform desired operations on the scanned classes. For example, the following Object Manipulation Functions are created for each class scanned:

a. a function to invoke the class method (including static method).

b. a function to access each class attribute.

c. a function to perform object copy.

d. a function to perform casting of objects.
from base class to derived class.
from derived class to base class.

e. a function to do class assignment..

f. a function to allocate multi-dimension object arrays.

g. a function to return the size of the class.

Naturally, it is to be understood that not all applications will need each of these functions, or additional functions maybe useful in certain applications. The selection of functions, including functions not described in this example, is apparent to those of ordinary skill in the art in light of the teaching of this invention. Furthermore, for embodiments of this invention which utilize other than C++ object oriented code, functions may be used other than the examples given above.

Annex I, below, provides examples of code generated for each of these Object Manipulation Functions 112 of Class Scanner 101.

Besides parsing File.scanh, step 111 also executes the create_exp_ifile to create the expand_ifile.h file 112.

In addition, Class Scanner 101 also generates code for a function that creates a table of sizes to store the size of a class returned by the function g. above.

After the C++ source code for the above Object Manipulation Functions 112 have been generated and the expand_ifile.h file have been created, they are translated to C source code by a C++ translator such as the Cfront translator available from AT&T. The resulting translated OMF source code 113 is then patched by patch program 114 provided in accordance with the teachings of this invention. Patched code 115 is then compiled by a C compiler to form the Object Manipulation Functions (OMF) library 116, which forms part of Object Handler 103, as depicted in FIG. 2.

When an object-oriented function is executed, it normally returns a value which is either a class object, a type of pointer, or a fundamental type, depending upon the operation of the function. However, for the above Object Manipulation Functions 112, a descriptor of the return value rather than the value itself is returned. The descriptor has a structure defined as:

```
struct descriptor {
        int type;
        int flag;
        union {
                void *return_value;
                int *Vint;
                ..
                all fundamental types.
                ..
                class1   *Vclass1;
                class1   **V1class1;
                class1   ***V2class1;
                class2   *Vclass2;
                class2   **V1class2;
                class2   ***V2class2;
                ..
                ..
        };
};
```

In the above descriptor structure, "type" describes the type specification of the return_value, and "flag" is used to indicate how the descriptor is to be freed after use.

As shown in the above descriptor structure, each class includes one line for each level of indirection; the above descriptor structure example has three levels of indirection for class 1 and class 2.

For the structure defined above, each scanned class can have a pointer to an object, a pointer to pointer to an object, and a pointer to pointer to pointer to an object. Should more indirection be needed, the union structure can be extended. For example, when an int is to be returned, the return_value in the descriptor structure is the address of that int. When an object is to be returned, the return_value is the address of that object. When a pointer to an object is to be returned, the return_value is the address of the object address pointer.

Appendix I are C and C++ source code listings for the following files which serve as one embodiment of Class Scanner 101 suitable for use with the C++ object-oriented language.

SCANNER/makefile
SCANNER/scanner_lex.lex
SCANNER/scanner_parser.y
SCANNER/scanner.h
SCANNER/scanner.c
SCANNER/scanner_extern.h
SCANNER/symbol_entry.h
SCANNER/CREATE_EXP_IFILE/makefile
SCANNER/CREATE_EXP_IFILE/create_exp_ifile.lex
SCANNER/CREATE_EXP_IFILE/create_exp_ifile.c
PATCH/makefile
PATCH/patch.c
PATCH/patch.h
PATCH/patch.lex

The Class Selector

Class Selector 104 (FIG. 1) allows a user to select only those classes whose objects the user wishes Object Handler 130 to access. The Class Information of these selected classes is then used as input to generate the C++ source code of the dispatch tables (DT) to the Object Manipulation Functions (OMF) 105. This C++ source code is then translated to C source code, which is then compiled and stored as DT to OMF library 106, one of the three libraries of Object Handler 130. Dispatch tables are well known in the art and thus specific code used to implement a suitable dispatch table is not discussed.

Appendix II are C and C++ source code listings for the following files which serve as one embodiment of Class Selector 104 suitable for use with the C++ object-oriented language.

CLASS_SELECTOR/makefile
CLASS_SELECTOR/class_selector.cxx

The Object Handler

Object Handler 130 includes Object Entry Functions (OEF) library 118, DT to OMF library 106, and OMF library 116. OEF Library 118 is obtained by translating using a C++ translator and then compiling using a C compiler the C++ source code of the Object Entry Functions 117 written in accordance with this invention. Object Handler 130 is the interface to compiled class library 122. Interpretive Dispatcher 120 uses Object Handler 130 to gain access to attributes and methods of user-defined compiled classes. There are several entry points to Object Handler 130. These entry points, which constitute Object Entry Functions (OEF) library 118, call the corresponding generated Object Manipulation Functions of OMF library 116 through dispatch tables of DT to OMF library 106, which in turn make calls to compiled class library 122.

The declaration of the entry points are:

```
a. struct descriptor *
        call_method (char *classname, char
                *methodname,
                void *objectptr,
                struct descriptor *argument_array[],
                int argument_count;
b. struct descriptor *
        call_getattr(char *classname,
                char *attributename, void *objectptr);
c. void call_copy(struct descriptor *from);
d. void call_cast(char *fromclass, char *toclass,
        void *fromclassobjectptr);
e. void call_assign(void *fromobjectptr,
        void *toobjectptr,
        char *classname);
f. struct descriptor *
        call_array(char *classname,
                int sub1, int sub2 . . .);
g. int get_sizeof(char *classname);
```

In function call_method (function "a"), the arguments in the array of descriptor may not be the exact match of a class method. In this case, integral promotions, integral conversions, arithmetic conversions, pointer conversions, and/or reference conversions had to be performed on the argument list to make it an exact match before dispatching the argument list to the functions generated by Class Scanner 101.

Appendix III are C and C++ source code listings for the following files which serve as one embodiment of Object Handler 130 suitable for use with the C++ object-oriented language.

ENTRY_FUNCTIONS/makefile
ENTRY_FUNCTIONS/classinfo.h
ENTRY_FUNCTIONS/classinfo.cxx
ENTRY_FUNCTIONS/entry_functions.cxx
ENTRY_FUNCTIONS/error_code.h Object Handler 130 also includes object manipulation functions contained in library 116, and dispatch tables to object manipulation functions, contained in DT to OMF library 106.

The object manipulation functions are generated by Class Scanner 101 while the Dispatch Tables to Object Manipulation Functions are generated by Class Selector 104, as described above.

The Interpretive Dispatcher

Interpretive Dispatcher 120 accepts C++ statements as char * and converts it into tokens of immediate codes. These codes are then evaluated. Should access to classes be needed, Interpretive Dispatcher 120 calls the respective routines in Object Handler 130 to do the job. Interpretive Dispatcher 120 is shown in FIG. 2 as a library. This library is obtained by translating using a C++ Translator and then compiling using a C compiler the source code of the Interpretive Dispatcher written in accordance with this invention.

The format to be used by another program to make a call to Interpretive Dispatcher 120 is, for example, as follows:

dml(char *statements);

where "statements" is a string of program code which is to be interpreted by Interpretive Dispatcher 120.

For example, for the class below:

```
class Customer {
    char name[30];
    float amount;
    static customer* lookup(char *customername);
    void setamount(float amt) { amount = amt;}
}
``` to set the amount of Customer "foobar" to 1234.56, the following call is made to Interpretive Dispatcher 120:

```
dm1("Customer *a = Customer::lookup(\"foobar\"); \
    a →setamount(1234.56);");
```

As Interpretive Dispatcher 120 dynamically accepts any string of statements and executes them, Interpretive Dispatcher 120 together with Object Handler 130 can conveniently be used with or embedded in object-oriented tools to interactively develop applications. Dispatcher 120 can also be integrated with an object-oriented database for interactive query or data manipulation using compiled classes. This is convenient, for example, for use with screen builders, object-oriented databases (including allowing a client on a network to send a string of statements, for example, over a communication network to a server for execution), and for use in connection with report generators. Interpreters are well known in the art and thus specific code used to implement a suitable interpreter will not be discussed.

Finally, in order to use this invention to develop applications, the following libraries are linked together into a single body of executable code 131:

Tools or Database Library 121

Interpretive Dispatcher (ID) Library 120

Object Entry Function (OEF) Library 118

Dispatch Table to Object Manipulation Functions (OT to OMF) Library 106

Object Manipulation Functions (OMF) Library 116

Class Library 122

This linking enables tools (including screen builders and report generators) or object-oriented databases 121 to have an interpretive object-oriented facility for on-line and interactive access of pre-compiled classes in the class library 122, i.e. classes which have been written using object-oriented source code and have been compiled into object code to form Class Library 122.

ANNEX I

The details of one embodiment of the generated codes for each of the class scanner Object Manipulation Functions 112 described above are as follows:

a. Function to invoke each class method

Before method invocation, Object Handler 130 has already created a global object pointer (void *objectptr) pointing to the object instance, a global array of descriptors (struct descriptor *global_argument) which describes the arguments of the method, and a count of the number of descriptors.

Thus, to generate code for a function to invoke, for example, a class method of class0, i.e.:

```
class3 a_method (int, class1, class2*)
``` where the method name is a_method, the return value is a class object of class3, and the arguments are int, class1, and pointer to class2 (class2*), the following code is generated:

```
class3 temp = objectptr →a_method(
    *(global_argument [0]→Vint),
    *(global_argument [1]→Vclass1),
    *(global_argument [2]→V1class2));
```

If the method is a static method, then the following code is generated:

```
class3 temp = class0::a_method(
    *(global_argument [0]→Vint),
    *(global_argument [1]→Vclass1),
    *(global_argument [2]→V1class2));
```

A descriptor of temp should be built and returned. However, because temp is a local variable, it will be destructed when the function exits out of its local scope. To prevent temp from being destructed, temp could be declared static, but this will incur a huge memory overhead. To overcome these problems, in accordance with the teachings of this invention, the "C" output of the C++ translator is patched in order to change the code to behave as if temp is dynamically allocated and no destructor is called when the scope of temp ends. As well known to the art a C++ code, when translated, for example, by utilizing Cfront, a C++ translator available from AT&T, becomes C code which can be compiled utilizing a standard C compiler.

For example, a C++ statement such as:

```
class3 temp = objectptr→a_method(
    *(global_arg [0]→Vint),
    *(global_arg [1]→Vclass1),
    *(global_arg [2]→V1class2));
``` would be translated by the C++ translator to something like the following C code:

```
struct class3 _1temp;
__ct__6class3Fv ( & __1temp );
__1temp = a__method__6class0Fi6class1P6class2(
    (struct class0*)object,
    (*(global_argument [0])→
    __O2__12value__struct.Vint),
    (*(global_argument [1])→
    __O2__12value__struct.Vclass1),
    (*(global_argument [2])→
    __O2__12value__struct.Vclass2));
__dt__6class3Fv ( &__1temp, 2);
```

Since temp is destroyed once it exits its scope, in accordance with the teachings of this invention a patch program has been written which when used scans the generated C code which has been generated by the C++ translator and which replaces all local variables (such as __1temp as shown in the above translated code with pre-defined global variables (such as glo_temp). Glo_temp is allocated sufficient memory space to hold what a_method would return. In addition, the patch scan program also removes the destructor that was used to remove temp when it exits its scope.

The final patched C code is, for example:

```
__ct__6class3Fv ( & glo__temp );
glo__temp = a__method__6class0Fi6class1P6class2(
    (struct class0*)object,
    (*(global__argument [0]) →
    __O2__12value__struct.Vint),
    (*(global__argument [1])→
    __O2__12value__struct.Vclass1),
    (*(global__argument [2])→
    __O2__12value__struct.Vclass2));
```

Accordingly, in accordance with this aspect of the present invention, instead of a descriptor of local variable temp, a descriptor of global variable glo__temp is built and returned. This return__value, being a global variable, can be used even outside the scope where temp is declared.

b. Function to access class attributes

Before method invocation, Interpretive Dispatcher 120 has already created a global object pointer (void *objectptr) pointing to the object instance. This function simply returns the descriptor of the attribute. For example, to return the attribute x of the following class:

```
class y {
class1 x;
);
```

The following must be performed:
1. allocate space for a descriptor from dynamic memory with a memory allocation function called malloc as follows:

```
struct descriptor *a=(struct descriptor *)malloc(sizeof(struct descriptor));
```

2. fill in the "type" and "flag" information into the descriptor.
3. generate the following "C++" code:

```
a→Vclass1=&objectptr→x;
``` c. Function to perform object copy

This function can be used by Interpretive Dispatcher 120 to make a copy of an object instance.

This function contains the following generated code for a class x:

```
x temp=*((x *)objectptr);
```

Objectptr refers to the object instance where a copy is to be made. This objectptr is created by the Object Handler. The variable temp is again only local. The same patch to "C" code generated by the C++ translator is used, as explained previously with regard to the function to invoke class method.

d. Function to perform casting of objects

In the case where only a single inheritance is used, the function simply returns the original pointer values no matter whether the casting is from base classes to derived classes or from derived classes to base classes.

In the case of multiple inheritance and non-virtual base classes, the function generates casting code from base classes to derived classes and from derived classes to base classes.

For multiple inheritance involving virtual base classes, the function generates casting code only for casting from derived classes to base classes, because for standard "C++" casting of virtual base classes to derived classes is not supported by C++.

e. Function to do class assignment

This function contains generated code that takes two arguments of void *to, void *from of class x to perform:

```
*((x *)to)=*((x *)from);
``` f. Function to allocate multi-dimensional object arrays

This function contains generated code that allocates a descriptor as follows:

```
struct descriptor *a=(struct descriptor *)malloc (sizeof(struct descriptor));
```

This generated code then fills in the type and flag information into the descriptor. This generated code also contains the following information, depending upon whether a one-dimensional or two-dimensional array is required:

```
a→V1x=newx[dimension1];
``` or

```
a→V2x=newx[dimension1*dimension2];
``` g. Function to get size of a class.

This function contains the following generated code for class x:

```
sizeof (x)
``` and also code that stores the value of this size in a table of sizes which is also created by Class Scanner 104.

In the above described embodiment of this invention, the generated code for one of the Object Manipulation Functions, namely, the "Function to invoke each class method", is patched if the generated code upon execution returns a class object or an instance of a class. This embodiment is particularly well suited for use with Object-Oriented Languages that are available as translators. Thus, in the example given above of a class method of class 0, i.e.

```
class3 a__method(int,class1,class2*)
``` the following code is generated

```
class3 temp=objectptr→a__method(*(global__argument[0]→Vint),
                                *(global__argument[1]→Vclass1),
                                *(global__argument[2]→V1class2));
```

This code is then translated and patched, as previously described.

The generated code is such that when it is executed it returns an instance of a class. If it is not patched after it has been translated the instance of the class is destroyed when it exits its scope. The patching is to ensure that the instance can be used outside its scope.

This alternative embodiment is well suited for use with object-oriented languages which are now available as compilers. These object-oriented language compilers accept object-oriented source code and compile them directly into object code unlike the object-oriented language translators which only translate the object-oriented source code into non-object-oriented source code. A standard non-objectoriented language compiler is then required to compile the translated non-object-oriented source code into object code. Instead of returning an instance of a class, the alternative embodiment of this invention generates code such that when it is executed it makes a copy of the instance and returns the copy. This copy is not destroyed when the instance of the class exits its scope. One example of this alternative embodiment is now described.

Before method invocation, Object Handler 130 has already created a global object pointer (void *objectptr) pointing to the object instance, a global array of descriptors (struct descriptor *global_argument) which describes the arguments of the method, and a count of the number of descriptors.

To generate code for a function to invoke, for example, a class method of class0, i.e.

class3 a_method(int,class1,class2*)

where the method name is a_method, the return value is a class object of class3, and the arguments are int, class1, and pointer to class2, i.e. class2*, the following algorithm is used:

---

If (classs3 has a public copy constructor) or
    (class3 has default public copy constructor and a
    public operator "=" method), then generate
glo_temp=new class3(objectptr→a_method(*(global_argument[0]→Vint)
                                            *(global_argument[1]→Vclass1),
                                            *(global_argument[2]→V1class2)),
Else generate
glo_temp=malloc(sizeof(class3));
memcpy(glo_temp,(objectptr→a_method(*(global_argument[0]→Vint),
                                        *(global_argument[1]→Vclass1),
                                        *(global_argument[2]→V1class2),
                        sizeof(class3));
where glo_temp is a global pointer of a copy of the class
object returned by method a_method.

---

Figure 5:
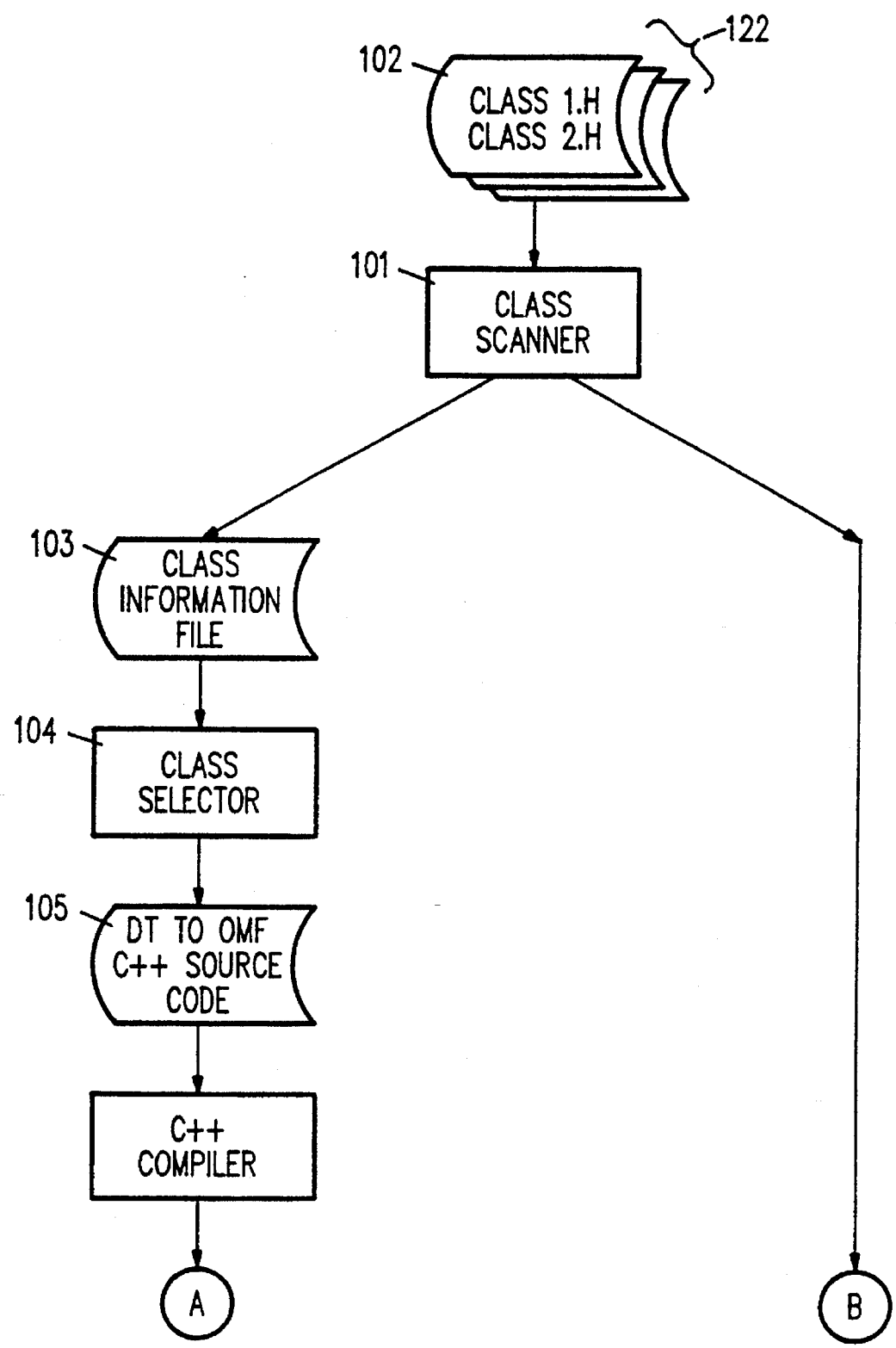
FIGS. 5 through 7 are flow charts depicting an alternative embodiment of this invention.
Figure 6:
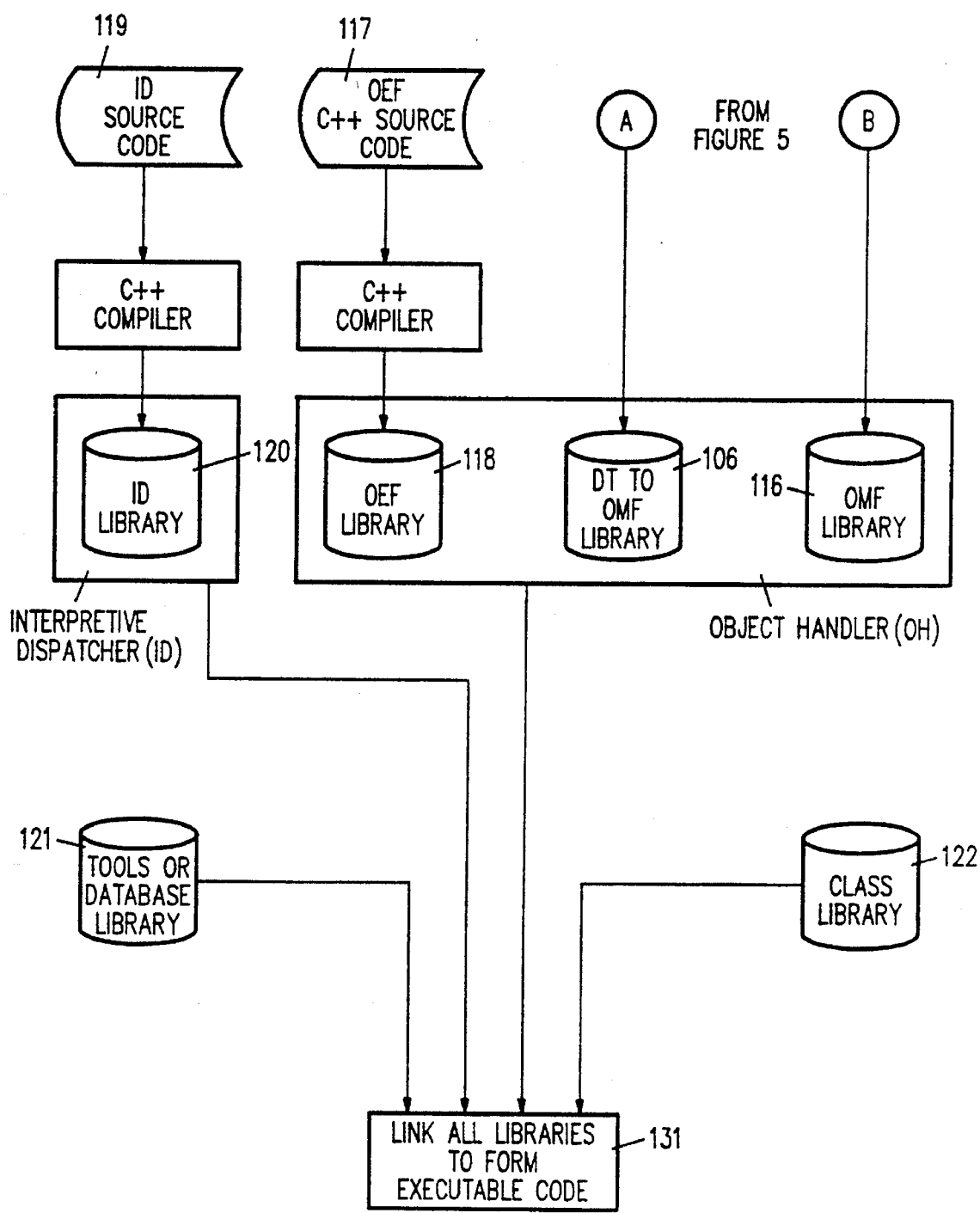
Figure 7:
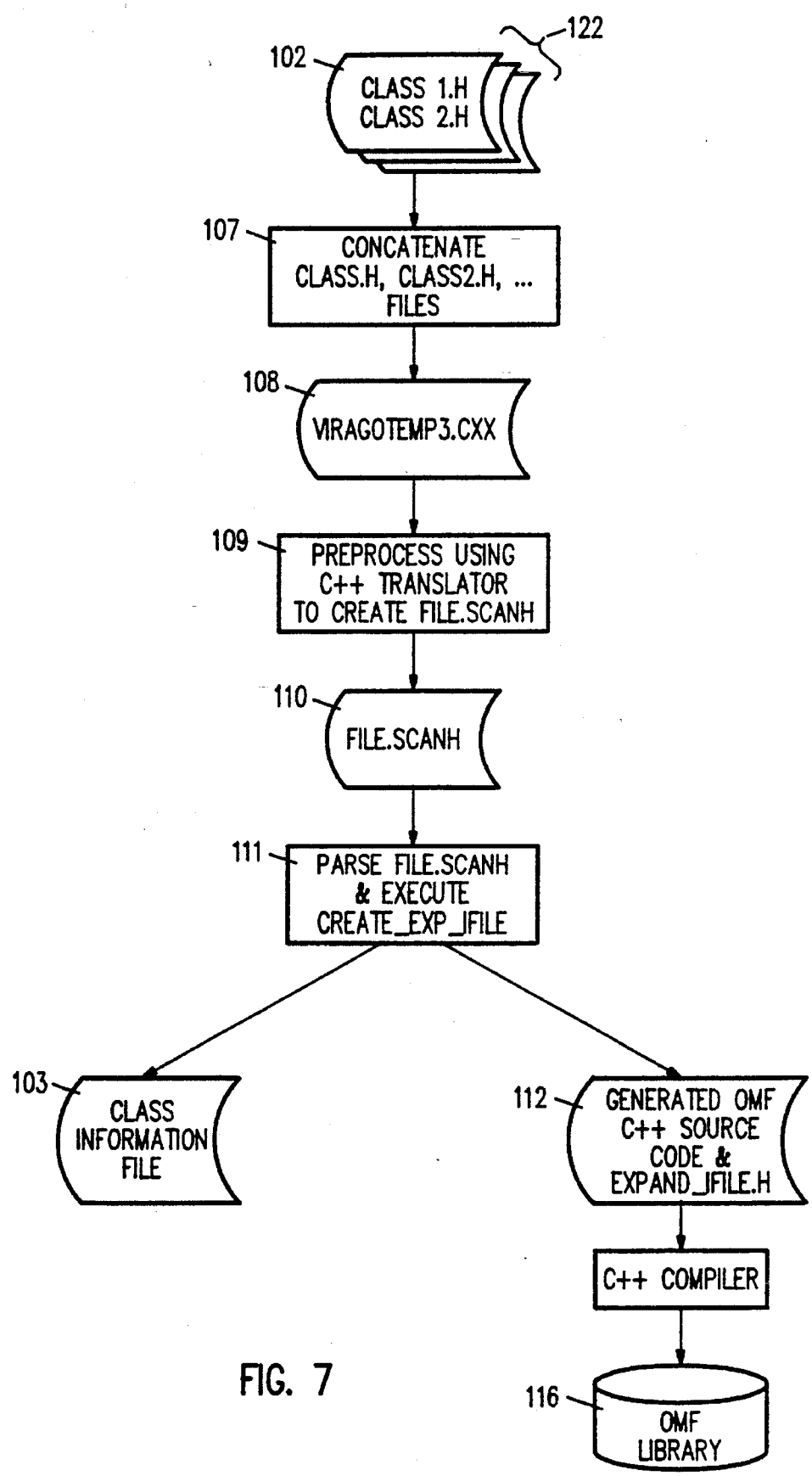

In accordance with this alternative embodiment in which no patching of translated source code is required, all source code generated in accordance with the present invention, namely the object manipulation functions and the dispatch tables and the previously written object entry functions are directly compiled to object code using the object-oriented language compilers. In accordance with this alternative embodiment of the present invention, a C++ Compiler is used, as shown in FIGS. 5, 6, and 7, rather than C++ Translator and C Compiler of the previously described embodiment.

The invention now being fully described, it will be apparent to one of ordinary skill in the art that many changes and modifications can be made thereto without departing from the spirit or scope of the appended claims.

CLASS SCANNER

APPENDIX I

Copyright (c) 1990, Singapore Computer Systems Pte Ltd make file for Class Scanner program.

```
*/
CCP = /usr/CC/sun4/CC

FLAG = -g -c

OBJECT = scanner.o y.tab.o lex.yy.o scanner:           $(OBJECT)
        cc -g -o scanner $(OBJECT)
scanner.o:         scanner.c scanner.h symbol_entry.h
        cc $(FLAG) scanner.c
y.tab.o:           y.tab.c
        cc $(FLAG) y.tab.c
lex.yy.o:          lex.yy.c
        cc $(FLAG) lex.yy.c
y.tab.c:           scanner_parser.y scanner_extern.h symbol_entry.h
        yacc -d scanner_parser.y
lex.yy.c:          scanner_lex.lex scanner_extern.h symbol_entry.h
        lex scanner_lex.lex
```

```
default     {
            return1(DEFAULT);
}
delete      {
            return1(DELETE);
}
do          {
            return1(DO);
}
double      {
            return1(DOUBLE);
}
else        {
            return1(ELSE);
}
enum        {
            return1(ENUM);
}
extern      {
            return1(EXTERN);
}
float       {
            return1(FLOAT);
}
for         {
            return1(FOR);
}
friend      {
            return1(FRIEND);
}
goto        {
            return1(GOTO);
}
if          {
            return1(IF);
}
inline      {
            return1(INLINE);
}
int         {
            return1(INT);
}
long        {
            return1(LONG);
}
new         {
            return1(NEW);
}
operator            {
            return1(OPERATOR);
}
private             {
            return1(PRIVATE);
```

```
}
protected      {
               return1(PROTECTED);
}
public         {
               return1(PUBLIC);
}
register       {
               return1(REGISTER);
}
return         {
               return1(RETURN);
}
short          {
               return1(SHORT);
}
signed         {
               return1(SIGNED);
}
sizeof         {
               return1(SIZEOF);
}
static         {
               return1(STATIC);
}
struct         {
               return1(STRUCT);
}
switch         {
               return1(SWITCH);
}
this           {
               return1(THIS);
}
typedef        {
               return1(TYPEDEF);
}
union          {
               return1(UNION);
}
unsigned       {
               return1(UNSIGNED);
}
virtual        {
               return1(VIRTUAL);
}
VIRTUAL        {
               return1(VIRTUAL);
}
void           {
               return1(VOID);
}
volatile       {
```

```
                        return1(VOLATILE);
}
while           {
                        return1(WHILE);
}
("...")         {
                        return1(TRIPLE_DOT);
}
[A-Za-z_][A-Za-z0-9_]*          {               /* identifier */
/*
printf(" identifier %s ",yytext);
*/
                        strcpy(yylval.sval,yytext);
/*
                        printf(" %s ",yytext);
*/
                        if(is_class(yytext)){
                                if(next_char_lp()){     /* if next char is '(' */
                                        return1(IDENTIFIER);
                                }else{
                                        return1(CLASS_NAME);
                                }
                        }else if(is_typedef(yytext)){
                                return1(TYPEDEF_NAME);
                        }else if(is_enum(yytext)){
                                return1(ENUM_NAME);
                        }else{
                                return1(IDENTIFIER);
                        }
}
\'[^\']*        {
                        if(yytext[yyleng-1] == '\\'){
                                yymore();
                        }else{
                                input();
                                strcpy(yylval.sval,yytext);
                                strcat(yylval.sval,"\'");
                                return1(CHARACTER_CONSTANT);
                        }
}
\"[^\"]*        {
                        if(yytext[yyleng-1] == '\\'){
                                yymore();
                        }else{
                                input();
                                strcpy(yylval.sval,yytext);
                                strcat(yylval.sval,"\"");
                                return1(STRING);
                        }
}
[0-9]+          {
                        yylval.ival = atoi (yytext);
                        return1(INTEGER_CONSTANT);
```

```
}
0x{h}+      {
            sscanf(yytext+2,"%x",&yylval.ival);
            return1(INTEGER_CONSTANT);
}
[0-9]*[\.][0-9]+      {
            sscanf(yytext,"%f",&yylval.fval);
            return1(FLOATING_CONSTANT);
}
("&=")      {
            return1(AND_EQUAL);
}
("/=")      {
            return1(DIVIDE_EQUAL);
}
("&&")      {
            return1(DOUBLE_AMPERSAND);
}
("::")      {
            return1(DOUBLE_COLON);
}
("==")      {
            return1(DOUBLE_EQUAL);
}
("<<")      {
            return1(DOUBLE_LEFT_ANGLE);
}
("--")      {
            return1(DOUBLE_MINUS);
}
("++")      {
            return1(DOUBLE_PLUS);
}
(">>")      {
            return1(DOUBLE_RIGHT_ANGLE);
}
("||")      {
            return1(DOUBLE_VERTICAL_BAR);
}
("^=")      {
            return1(EXOR_EQUAL);
}
(">=")      {
            return1(GREATER_EQUAL);
}
("<<=")     {
            return1(LEFT_SHIFT_EQUAL);
}
("<=")      {
            return1(LESS_EQUAL);
}
("-=")      {
            return1(MINUS_EQUAL);
```

```
}
("%=")      {
            return1(MOD_EQUAL);
}
("!=")      {
            return1(NOT_EQUAL);
}
("|=")      {
            return1(OR_EQUAL);
}
("+=")      {
            return1(PLUS_EQUAL);
}
("->")      {
            return1(POINTER);
}
(">>=")     {
            return1(RIGHT_SHIFT_EQUAL);
}
("*=")      {
            return1(TIMES_EQUAL);
}
("...")     {
            return1(TRIPLE_DOT);
}
}
\\[^\n]+[\n]  {
/* c++ comments // */
            }
[ \t\n]+ {
            }
[\01-\0177] {
            if(yytext[0]==12){
            }else{
                    return1(yytext[0]);
            }
}
%%
#include <sys/stat.h>
char *bufferptr=0;
char *cbuffer=-1;
input()
{
struct stat st;
static int buffercount=0;
int c;
int i;
if (buffercount==-1) return 0;
if (buffercount==0)
            {
            fstat(p,&st);
            cbuffer = malloc(st.st_size+100);
            c = read(p,cbuffer,st.st_size+10);
            if (c <= 0) return 0;
```

```
            buffercount = c;
            bufferptr = cbuffer;
        }
    if (bufferptr >= (cbuffer + buffercount))
    {
    buffercount = -1;
    free(cbuffer);
    return 0;
    }
    c = *bufferptr++;
    return(c);
}
unput(c)
char c;
{
if (bufferptr && (bufferptr > cbuffer)) --bufferptr;
} output(c)
char c;
{
} is_typedef(s)
char* s;
{
int i;

for(i=0;i<entry_array_index;i++){
                if((entry_array[i]->kind == KINDTYPEDEF)&&
                    (strcmp(s,entry_array[i]->key)==0)){
                        return 1;
                    }
        }
        return 0;
} is_class(s)
char* s;
{
int i;
        for(i=0;i<entry_array_index;i++){
                if((entry_array[i]->kind == KINDCLASS)&&
                    (strcmp(s,entry_array[i]->key)==0)){
                        return 1;
                    }
        }
        return 0;
} is_enum(s)
char* s;
```

```
{
int i;
        for(i=0;i<entry_array_index;i++){
                if((entry_array[i]->kind == KINDENUM)&&
                    (strcmp(s,entry_array[i]->key)==0)){
                        return 1;
                }
        }
        return 0;
}
next_char_lp()
{
        int count=0;
        char s[20];
        int i=0;

while(((s[count]=input())== '\t') ||          /* tab */
                (s[count]=='\n') ||                   /* cr */
                (s[count]==' '))                      /* space */
        {
                count++;
        }
        if(s[count]=='('){
                for(i=0;i<=count;i++) unput(s[i]);    /* last count not ++ thus <= count */
                return 1;
        }else{
                for(i=0;i<=count;i++) unput(s[i]);
                return 0;
        }
} char* get_file_name(s,with_path)
char* s;
int with_path;
{
char file_name[100];
int i=0;
int j=0;
char* t;
        t=&s[strlen(s)-1];
        while(*t!='\"'){
                t--;
        }
        t--;
        if(with_path){
                while(*t!='\"'){
                        t--;
                }
        }else{
                while((*t!='\"')&&(*t!='\\')){
                        t--;
```

```
            }
        }
        t++;
        while(*t!='\"'){
                file_name[i++]=*t;
                t++;
        }
        file_name[i]=0;
        return file_name;
```

```
%{
/*

Copyright (c) 1990, Singapore Computer Systems Pte Ltd

Parser for CLASS SCANNER understands C++ grammer and extracts class information
    into ma_list file.

*/
#include <stdio.h>
#include "scanner_extern.h"
#define YYDEBUG 1
#define YYMAXDEPTH 1500
%}
%token ASM AUTO BREAK CASE CATCH CHAR CLASS CONST CONTINUE DEFAULT DELETE
O
%token DOUBLE ELSE ENUM EXTERN FLOAT FOR FRIEND GOTO IF INLINE INT LONG NEW
%token OPERATOR PRIVATE PROTECTED PUBLIC REGISTER RETURN SHORT SIGNED SIZE
F
%token STATIC STRUCT SWITCH THIS TYPEDEF UNION UNSIGNED VIRTUAL VOID VOLATILE
%token WHILE /* tokens denoting combined symbols */

%token AND_EQUAL            /* &= */
%token DIVIDE_EQUAL         /* /= */
%token DOUBLE_AMPERSAND     /* && */
%token DOUBLE_COLON         /* :: */
%token DOUBLE_EQUAL         /* == */
%token DOUBLE_LEFT_ANGLE    /* << */
%token DOUBLE_MINUS         /* -- */
%token DOUBLE_PLUS          /* ++ */
%token DOUBLE_RIGHT_ANGLE   /* >> */
%token DOUBLE_VERTICAL_BAR  /* || */
%token EXOR_EQUAL           /* ^= */
%token GREATER_EQUAL        /* >= */
%token LEFT_SHIFT_EQUAL     /* <<= */
%token LESS_EQUAL           /* <= */
%token MINUS_EQUAL          /* -= */
%token MOD_EQUAL            /* %= */
%token NOT_EQUAL            /* != */
%token OR_EQUAL             /* |= */
%token PLUS_EQUAL           /* += */
%token POINTER              /* -> */
%token RIGHT_SHIFT_EQUAL    /* >>= */
%token TIMES_EQUAL          /* *= */
%token TRIPLE_DOT           /* ... */

%union {
```

```
        char sval[1000];
        int ival;
        float fval;
        char cval;
        struct method_or_attribute moaval;
        struct argument_type *atval;
        }
%token <sval> IDENTIFIER
%token <sval> CLASS_NAME
%token <sval> TYPEDEF_NAME
%token <sval> ENUM_NAME
%token <ival> INTEGER_CONSTANT
%token <sval> CHARACTER_CONSTANT
%token <fval> FLOATING_CONSTANT
%token <sval> STRING %type <sval> identifier
%type <sval> class_name
%type <sval> typedef_name
%type <sval> enum_name
%type <ival> integer_constant
%type <sval> character_constant
%type <fval> floating_constant
%type <sval> string %type <sval> base_specifier
%type <sval> base_list
%type <sval> base_spec
%type <sval> ptr_operator
%type <sval> asterisk_amper
%type <moaval> declarator
%type <sval> dname
%type <sval> dname2
%type <sval> name
%type <sval> operator_function_name
%type <sval> conversion_function_name
%type <sval> conversion_type_name
%type <sval> qualified_name
%type <sval> operator
%type <moaval> function_definition
%type <moaval> member_declarator
%type <moaval> member_declarator_list
%type <sval> class_key class_key_name
%type <sval> simple_type_name type_specifier
%type <sval> function_specifier sc_specifier
%type <sval> decl_specifier decl_specifiers
%type <sval> abstract_declarator argument_declaration
%type <atval> arg_declaration_list argument_declaration_list %type <sval> literal primary_expression postfix_expression unary_expression cast_expression
%type <sval> type_name pm_expression multiplicative_expression additive_expression
%type <sval> shift_expression relational_expression equality_expression and_expression
%type <sval> exclusive_or_expression inclusive_or_expression logical_and_expression
```

```
%type <sval> logical_or_expression conditional_expression constant_expression unary_operator
%type <moaval> init_declarator declarator_list
%type <sval> assignment_expression assignment_operator expression initializer /**********
*enumerator*
**********/
%type <sval> enumerator enum_list enum_specifier /******************
                *precedence rules*
                ******************/
%left '{' ','

%right '='
        AND_EQUAL
        DIVIDE_EQUAL
        MOD_EQUAL
        PLUS_EQUAL
        MINUS_EQUAL
        RIGHT_SHIFT_EQUAL
        LEFT_SHIFT_EQUAL
        OR_EQUAL
        EXOR_EQUAL %right '?' ':'

%left DOUBLE_VERTICAL_BAR
%left DOUBLE_AMPERSAND
%left '|'
%left '^'
%left '&'

%left DOUBLE_EQUAL NOT_EQUAL

%left '<' '>' GREATER_EQUAL LESS_EQUAL

%left DOUBLE_LEFT_ANGLE DOUBLE_RIGHT_ANGLE

%left '+' '-'

%left '*' '/' '%'

%right DOUBLE_PLUS
        DOUBLE_MINUS
        '!'
        '~'
        NEW
        DELETE %left '('
        '['
```

POINTER

```
%%
%{
/* here */
        int class_specifier_seen = 0;
        char g_class_name[100];
        struct base_class* g_bc_ptr = 0;

char temp_buf[100];
        char last_access_specifier;
        char buffer[1000];
        char declarator_buffer[1000];
        int class_key_class=0;
        int cn_buffer_index=0;
        struct class_list *head;
        struct class_list *tail;
        struct class_list *class_list_buf;
        char base_name[80];
        char arguments_buf[100];
        struct method_or_attribute declaration_buffer;
        int i;
        int const_decl=0;

char simple_type_name[50];
        int v_sizeof=0;
        int pure_specifier_seen=0;
        int declarator_count=0;
        int allocated=0;

extern in_string();
%} program : /* empty */
        |       defs
        ;

defs : def
        |       defs def
        ;

def : statement
        ;

/********************************
 *      EXPRESSIONS             *
 ********************************/ expression : /* optional */
{
        koofputs("express0\n",koofp);
}
```

```
            |       assignment_expression
{
        koofputs("express1\n",koofp);
        strcpy($$,$1);
}
            |       expression comma assignment_expression
{
        koofputs("express2\n",koofp);
        strcpy($$,$1);
        strcat($$,",");
        strcat($$,$3);
}
        ;

assignment_expression : conditional_expression
{
        koofputs("assignment_express0\n",koofp);
        strcpy($$,$1);
}
            |       unary_expression assignment_operator assignment_expression
{
        koofputs("assignment_express1\n",koofp);
        strcpy($$,$1);
        strcat($$,$2);
        strcat($$,$3);
}
        ;

assignment_operator : '='
{
        strcpy($$,"=");
}
            |       TIMES_EQUAL
{
        strcpy($$,"*=");
}
            |       DIVIDE_EQUAL
{
        strcpy($$,"/=");
}
            |       MOD_EQUAL
{
        strcpy($$,"%=");
}
            |       PLUS_EQUAL
{
        strcpy($$,"+=");
}
            |       MINUS_EQUAL
{
        strcpy($$,"-=");
}
            |       RIGHT_SHIFT_EQUAL
```

```
{
        strcpy($$,">>=");
}
|       LEFT_SHIFT_EQUAL
{
        strcpy($$,"<<=");
}
|       AND_EQUAL
{
        strcpy($$,"&=");
}
|       EXOR_EQUAL
{
        strcpy($$,"^=");
}
|       OR_EQUAL
{
        strcpy($$,"|=");
}
        ;

conditional_expression : logical_or_expression
{
        koofputs("conditional_express0\n",koofp);
        strcpy($$,$1);
}
|       logical_or_expression q_mark expression colon conditional_expression
{
        koofputs("conditional_express1\n",koofp);
        strcpy($$,$1);
        strcat($$,"?");
        strcat($$,$3);
        strcat($$,":");
        strcat($$,$5);
}
        ;

logical_or_expression : logical_and_expression
{
        koofputs("logical_or_express0\n",koofp);
        strcpy($$,$1);
}
|       logical_or_expression DOUBLE_VERTICAL_BAR { fp("||"); } logical_and_expression
{
        koofputs("logical_or_express1\n",koofp);
        strcpy($$,$1);
        strcat($$,"||");
        strcat($$,$4);
}
        ;

logical_and_expression : inclusive_or_expression
```

```
{
        koofputs("logical_and_express0\n",koofp);
        strcpy($$,$1);
}
        |       logical_and_expression DOUBLE_AMPERSAND { fp("&&"); } inclusive_or_expre
ion
{
        koofputs("logical_and_express1\n",koofp);
        strcpy($$,$1);
        strcat($$,"&&");
        strcat($$,$4);
}
        ;

inclusive_or_expression : exclusive_or_expression
{
        koofputs("inclusive_or_express0\n",koofp);
        strcpy($$,$1);
}
        |       inclusive_or_expression v_bar exclusive_or_expression
{
        koofputs("inclusive_or_express1\n",koofp);
        strcpy($$,$1);
        strcat($$,"|");
        strcat($$,$3);
}
        ;

exclusive_or_expression : and_expression
{
        koofputs("exclusive_or_express0\n",koofp);
        strcpy($$,$1);
}
        |       exclusive_or_expression caret and_expression
{
        koofputs("exclusive_or_express1\n",koofp);
        strcpy($$,$1);
        strcat($$,"^");
        strcat($$,$3);
}
        ;

and_expression : equality_expression
{
        koofputs("and_express0\n",koofp);
        strcpy($$,$1);
}
        |       and_expression ampersand equality_expression
{
        koofputs("and_express1\n",koofp);
        strcpy($$,$1);
        strcat($$,"&");
        strcat($$,$3);
```

```
}
    ;

equality_expression : relational_expression
{
        koofputs("equality_express0\n",koofp);
        strcpy($$,$1);
}
        |       equality_expression DOUBLE_EQUAL { fp("=="); } relational_expression
{
        koofputs("equality_express1\n",koofp);
        strcpy($$,$1);
        strcat($$,"==");
        strcat($$,$4);
}
        |       equality_expression NOT_EQUAL { fp("!="); } relational_expression
{
        koofputs("equality_express2\n",koofp);
        strcpy($$,$1);
        strcat($$,"!=");
        strcat($$,$4);
}
    ;

relational_expression : shift_expression
{
        koofputs("relational_express0\n",koofp);
        strcpy($$,$1);
}
        |       relational_expression less_than shift_expression
{
        koofputs("relational_express1\n",koofp);
        strcpy($$,$1);
        strcat($$,"<");
        strcat($$,$3);
}
        |       relational_expression greate_than shift_expression
{
        koofputs("relational_express2\n",koofp);
        strcpy($$,$1);
        strcat($$,">");
        strcat($$,$3);
}
        |       relational_expression LESS_EQUAL { fp("<="); } shift_expression
{
        koofputs("relational_express3\n",koofp);
        strcpy($$,$1);
        strcat($$,"<=");
        strcat($$,$4);
}
        |       relational_expression GREATER_EQUAL { fp(">="); } shift_expression
{
        koofputs("relational_express4\n",koofp);
```

```
                strcpy($$,$1);
                strcat($$,">=");
                strcat($$,$4);
        }
                ;

shift_expression : additive_expression
        {
                koofputs("shift_express0\n",koofp);
                strcpy($$,$1);
        }
                |       shift_expression DOUBLE_LEFT_ANGLE { fp("<<"); } additive_expression
        {
                koofputs("shift_express1\n",koofp);
                strcpy($$,$1);
                strcat($$,"<<");
                strcat($$,$4);
        }
                |       shift_expression DOUBLE_RIGHT_ANGLE { fp(">>"); } additive_expression
        {
                koofputs("shift_express2\n",koofp);
                strcpy($$,$1);
                strcat($$,">>");
                strcat($$,$4);
        }
                ;

additive_expression : multiplicative_expression
        {
                koofputs("additive_express0\n",koofp);
                strcpy($$,$1);
        }
                |       additive_expression plus multiplicative_expression
        {
                koofputs("additive_express1\n",koofp);
                strcpy($$,$1);
                strcat($$,"+");
                strcat($$,$3);
        }
                |       additive_expression minus multiplicative_expression
        {
                koofputs("additive_express2\n",koofp);
                strcpy($$,$1);
                strcat($$,"-");
                strcat($$,$3);
        }
                ;

multiplicative_expression : pm_expression
        {
                koofputs("multiplicative_express0\n",koofp);
                strcpy($$,$1);
        }
```

```
            |       multiplicative_expression asterisk pm_expression
{
        koofputs("multiplicative_express1\n",koofp);
        strcpy($$,$1);
        strcat($$,"*");
        strcat($$,$3);
}
            |       multiplicative_expression divide pm_expression
{
        koofputs("multiplicative_express2\n",koofp);
        strcpy($$,$1);
        strcat($$,"/");
        strcat($$,$3);
}
            |       multiplicative_expression mod pm_expression
{
        koofputs("multiplicative_express3\n",koofp);
        strcpy($$,$1);
        strcat($$,"%");
        strcat($$,$3);
}
        ;

pm_expression : cast_expression
{
        koofputs("pm_express0\n",koofp);
        strcpy($$,$1);
}
            |       pm_expression period asterisk cast_expression
{
        koofputs("pm_express1\n",koofp);
        strcpy($$,$1);
        strcat($$,".*");
        strcat($$,$4);
}
            |       pm_expression POINTER { fp("->"); } asterisk cast_expression
{
        koofputs("pm_express2\n",koofp);
        strcpy($$,$1);
        strcat($$,"->*");
        strcat($$,$5);
}
        ;

cast_expression : unary_expression
{
        koofputs("cast_express0\n",koofp);
        strcpy($$,$1);
}
            |       left_paren type_name right_paren cast_expression
{
        koofputs("cast_express1\n",koofp);
        strcpy($$,"(");
```

```
            strcat($$,$2);
            strcat($$,")");
            strcat($$,$4);
    }
        ;

unary_expression : postfix_expression
    {
            koofputs("unary_express0\n",koofp);
            strcpy($$,$1);
    }
        |       DOUBLE_PLUS { fp("++"); } unary_expression
    {
            koofputs("unary_express1\n",koofp);
            strcpy($$,"++");
            strcat($$,$3);
    }
        |       DOUBLE_MINUS { fp("--"); } unary_expression
    {
            koofputs("unary_express2\n",koofp);
            strcpy($$,"--");
            strcat($$,$3);
    }
        |       unary_operator cast_expression
    {
            koofputs("unary_express3.0\n",koofp);
            strcpy($$,$1);
            strcat($$,$2);
    }
        |       asterisk_amper cast_expression /* done to resolve r/r conflicts*/
    {
            koofputs("unary_express3.1\n",koofp);
            strcpy($$,$1);
            strcat($$,$2);
    }
        |       t_sizeof unary_expression
    {
            koofputs("unary_express4\n",koofp);
            strcpy($$,"sizeof");
            strcat($$,$2);
    }
        |       t_sizeof left_paren type_name right_paren
    {
            koofputs("unary_express5\n",koofp);
            strcpy($$,"sizeof(");
            strcat($$,$3);
            strcat($$,")");
    }
        |       allocation_expression
    {
            koofputs("unary_express6\n",koofp);
            strcpy($$,"allocation_expression");
    }
```

```
                |       deallocation_expression
        {
                koofputs("unary_express7\n",koofp);
                strcpy($$,"deallocation_expression");
        }
                ;

asterisk_amper : '*'  /* done to resolve r/r conflicts */
        {
                strcpy($$,"*");
        }
                |       '&'
        {
                strcpy($$,"&");
        }
                ;
unary_operator : '+'
        {
                strcpy($$,"+");
        }
                |       '-'
        {
                strcpy($$,"-");
        }
                |       '!'
        {
                strcpy($$,"!");
        }
                |       tilde
        {
                strcpy($$,"&");
        }
                ;

allocation_expression : double_colon t_new placement restricted_type_name initializer
        {
                koofputs("allocation_express0\n",koofp);
        }
                |       double_colon t_new placement left_paren type_name right_paren initializer
        {
                koofputs("allocation_express1\n",koofp);
        }
                |       t_new restricted_type_name initializer
        {
                koofputs("allocation_express2.0\n",koofp);
        }
                |       t_new placement restricted_type_name initializer
        {
                koofputs("allocation_express2.1\n",koofp);
        }
                |       t_new name initializer         /* identifier class_name conflict */
        {
                koofputs("allocation_express2.0\n",koofp);
```

```
}
                |       t_new placement left_paren type_name right_paren initializer
{
        koofputs("allocation_express3\n",koofp);
}
                |       double_colon t_new placement restricted_type_name
{
        koofputs("allocation_express4\n",koofp);
}
                |       double_colon t_new placement left_paren type_name right_paren
{
        koofputs("allocation_express5\n",koofp);
}
                |       t_new restricted_type_name
{
        koofputs("allocation_express6.0\n",koofp);
}
                |       t_new placement restricted_type_name
{
        koofputs("allocation_express6.1\n",koofp);
}
                |       t_new name /* identifier class_name conflict */
{
        koofputs("allocation_express6.0\n",koofp);
}
                |       t_new placement left_paren type_name right_paren
{
        koofputs("allocation_express7\n",koofp);
}
                ;

placement : left_paren expression_list right_paren
{
        koofputs("placement0\n",koofp);
}
        ;

restricted_type_name : type_specifier restricted_declarator
{
        koofputs("restricted_type_name0\n",koofp);
}
        ;

restricted_declarator :
{
        koofputs("restricted_dec0\n",koofp);
}
                |       ptr_operator restricted_declarator
{
        koofputs("restricted_dec1\n",koofp);
}
                |       restricted_declarator left_bracket expression right_bracket
{
```

```
                koofputs("restricted_dec2\n",koofp);
        }
                ;

deallocation_expression : double_colon t_delete cast_expression
        {
                koofputs("deallocation_express0\n",koofp);
        }
                |       double_colon t_delete left_bracket expression right_bracket cast_expression
        {
                koofputs("deallocation_express1\n",koofp);
        }
                |       t_delete cast_expression
        {
                koofputs("deallocation_express2\n",koofp);
        }
                |       t_delete left_bracket expression right_bracket cast_expression
        {
                koofputs("deallocation_express3\n",koofp);
        }
                ;

postfix_expression : primary_expression
        {
                koofputs("postfix_express0\n",koofp);
                strcpy($$,$1);
        }
                |       postfix_expression left_bracket expression right_bracket
        {
                koofputs("postfix_express1\n",koofp);
                strcpy($$,$1);
                strcat($$,"[");
                strcat($$,$3);
                strcat($$,"]");
        }
                |       postfix_expression left_paren right_paren
        {
                koofputs("postfix_express2.0\n",koofp);
                strcpy($$,$1);
                strcat($$,"()");
        }
                |       postfix_expression left_paren expression_list right_paren
        {
                koofputs("postfix_express2.1\n",koofp);
                strcpy($$,$1);
                strcat($$,"(expression_list)");
        }
                |       simple_type_name left_paren right_paren
        {
                koofputs("postfix_express3.0\n",koofp);
                strcpy($$,$1);
                strcat($$,"()");
        }
```

```
            |        simple_type_name left_paren expression_list right_paren
{
        koofputs("postfix_express3.1\n",koofp);
        strcpy($$,$1);
        strcat($$,"(expression_list)");
}
            |        postfix_expression period name
{
        koofputs("postfix_express4\n",koofp);
        strcpy($$,$1);
        strcat($$,".");
        strcat($$,$3);
}
            |        postfix_expression POINTER { fp("->"); } name
{
        koofputs("postfix_express5\n",koofp);
        strcpy($$,$1);
        strcat($$,"->");
        strcat($$,$4);
}
            |        postfix_expression DOUBLE_PLUS
{
        fp("++");
        koofputs("postfix_express6\n",koofp);
        strcpy($$,$1);
        strcat($$,"++");
}
            |        postfix_expression DOUBLE_MINUS
{
        fp("--");
        koofputs("postfix_express7\n",koofp);
        strcpy($$,$1);
        strcat($$,"--");
}
        ;

expression_list :          assignment_expression
{
        koofputs("express_list1\n",koofp);
}
            |        expression_list comma assignment_expression
{
        koofputs("express_list2\n",koofp);
}
        ;

primary_expression : literal
{
        koofputs("primary_express0\n",koofp);
        strcpy($$,$1);
}
            |        THIS
{
```

```
                fp("this");
                strcpy($$,"this");
        }
                |       double_colon identifier
        {
                koofputs("primary_express2\n",koofp);
                strcpy($$,"::");
                strcat($$,$2);
        }
                |       double_colon operator_function_name
        {
                koofputs("primary_express3\n",koofp);
                strcpy($$,"::");
                strcat($$,$2);
        }
                |       left_paren expression right_paren
        {
                koofputs("primary_express4\n",koofp);
                strcpy($$,"(");
                strcat($$,$2);
                strcat($$,")");
        }
                |       name
        {
                koofputs("primary_express5\n",koofp);
                strcpy($$,$1);
        }
                ;

name : identifier
{
                koofputs($1,koofp);
                koofputs(" name1\n",koofp);
                print_state(yystate);
                strcpy($$,$1);
        }
                |       operator_function_name
        {
                koofputs("name1\n",koofp);
                strcpy($$,$1);
        }
                |       conversion_function_name
        {
                koofputs("name2\n",koofp);
                strcpy($$,$1);
        }
                |       qualified_name
        {
                koofputs("name3\n",koofp);
                strcpy($$,$1);
        }
                ;
```

```
qualified_name : class_name double_colon identifier
{
        koofputs("qualified_name0\n",koofp);
        strcpy($$,$1);
        strcat($$,"::");
        strcat($$,$3);
}
        |       class_name double_colon operator_function_name
{
        koofputs("qualified_name1\n",koofp);
        strcpy($$,$1);
        strcat($$,"::");
        strcat($$,$3);
}
        |       class_name double_colon conversion_function_name
{
        koofputs("qualified_name2\n",koofp);
        strcpy($$,$1);
        strcat($$,"::");
        strcat($$,$3);
}
        |       class_name double_colon class_name
{
        koofputs("qualified_name3\n",koofp);
        strcpy($$,$1);
        strcat($$,"::");
        strcat($$,$3);
}
        |       class_name double_colon tilde class_name
{
        koofputs("qualified_name4\n",koofp);
        strcpy($$,$1);
        strcat($$,"::~");
        strcat($$,$4);
}
        ;

literal : integer_constant
{
        koofputs("literal0\n",koofp);
        sprintf($$,"%d",$1);
}
        |       character_constant
{
        koofputs("literal1\n",koofp);
        strcpy($$,$1);
}
        |       floating_constant
{
        koofputs("literal2\n",koofp);
        sprintf($$,"%f",$1);
}
```

```
                |       string
{
        koofputs("literal3\n",koofp);
        strcpy($$,$1);
}
        ;

/********************************
*       DECLARATIONS            *
********************************/ declaration : semi_colon /* null statement */
{
        koofputs("declaration-1\n",koofp);
        print_state(yystate);
}
        |       decl_specifiers semi_colon
{
        if(class_specifier_seen){
                classes_scanned[cs_index] = (char*)malloc(strlen(g_class_name)+1);
                strcpy(classes_scanned[cs_index++],g_class_name);
                class_specifier_seen=0;
        }
        koofputs("declaration0\n",koofp);
        print_state(yystate);
}
        |       declarator_list semi_colon
{
        koofputs("declaration1.0\n",koofp);
        print_state(yystate);
}
        |       decl_specifiers declarator_list semi_colon
{
        if (class_specifier_seen){
                classes_scanned[cs_index] = (char*)malloc(strlen(g_class_name)+1);
                strcpy(classes_scanned[cs_index++],g_class_name);
                class_specifier_seen=0;
        }
        koofputs("declaration1.1\n",koofp);
        print_state(yystate);
koofputs($1,constp);
koofputs(" ",constp);
koofputs($2.pointer_operator,constp);
koofputs($2.declarator,constp);
koofputs(",\n",constp);
        if(const_decl){
                const_decl=0;
        }
}
        |       t_typedef decl_specifiers declarator_list semi_colon
{
        koofputs("declaration1.2\n",koofp);
        for(i=0;i<$3.n;i++){
```

```
                    strcpy(buffer,$2);
                    strcat(buffer,$3.pointer_operator[i]);
                    strcpy(declarator_buffer,$3.declarator[i]);
                    add_to_typedef(buffer,declarator_buffer,$3.function_pointer[i],$3.arguments);
            }
            print_state(yystate);
    }
            |       t_typedef decl_specifiers class_name semi_colon
    {
            koofputs("declaration1.3\n",koofp);
            strcpy(declarator_buffer,$3);
            strcpy(buffer,$2);
            add_to_typedef($2,$3,0,NULL);
            print_state(yystate);
    }
            |       t_typedef decl_specifiers enum_name semi_colon
    {
            koofputs("declaration1.4\n",koofp);
            strcpy(declarator_buffer,$3);
            strcpy(buffer,$2);
            add_to_typedef($2,$3,0,NULL);
            print_state(yystate);
    }
            |       t_typedef decl_specifiers typedef_name semi_colon
    {
            koofputs("declaration1.5\n",koofp);
            print_state(yystate);
    }
/*
            |       asm_declaration
*/
            |       function_definition
    {
            print_state(yystate);
            koofputs("declaration2\n",koofp);
            free_pointer_declarator(&$1);
    }
            |       linkage_specification
    {
            koofputs("declaration3\n",koofp);
            print_state(yystate);
    }
            ;

decl_specifier : sc_specifier              /* storage class specifier */
    {
            koofputs("decl_specifier0\n",koofp);
            print_state(yystate);
            strcpy($$,$1);
    }
            |       type_specifier
    {
            koofputs("decl_specifier1\n",koofp);
```

```
                print_state(yystate);
                strcpy($$,$1);
        }
                |       function_specifier
        {
                koofputs("decl_specifier2\n",koofp);
                print_state(yystate);
                strcpy($$,$1);
        }
                |       FRIEND
        {
                koofputs("decl_specifier3\n",koofp);
                print_state(yystate);
                strcpy($$,"friend");
        }
                ;

decl_specifiers : decl_specifier
        {
                koofputs("decl_specifiers...1\n",koofp);
                print_state(yystate);
                strcpy($$,$1);
        }
                |       decl_specifiers decl_specifier
        {
                koofputs("decl_specifiers...2\n",koofp);
                print_state(yystate);
                strcpy($$,$1);
                strcat($$," ");
                strcat($$,$2);
        }
                ;

sc_specifier : AUTO             /* storage class specifier */
        {
                print_state(yystate);
                strcpy($$,"auto");
        }
                |       REGISTER
        {
                koofputs("sc_specifier1\n",koofp);
                print_state(yystate);
                strcpy($$,"register");
        }
                |       STATIC
        {
                koofputs("sc_specifier2\n",koofp);
                print_state(yystate);
                strcpy($$,"static");
        }
                |       t_extern
        {
                koofputs("sc_specifier3\n",koofp);
```

```
                print_state(yystate);
                strcpy($$,"extern");
        }
        ;

function_specifier : INLINE
{
        koofputs("function_specifier0\n",koofp);
        print_state(yystate);
        strcpy($$,"inline");
}
        |       VIRTUAL
{
        print_state(yystate);
        strcpy($$,"virtual");
}
        ;

cv_qualifier : CONST
{
        print_state(yystate);
}
        |       VOLATILE
{
        koofputs("cv_qualifier1\n",koofp);
        print_state(yystate);
}
        ;

type_specifier : simple_type_name
{
        koofputs("type_specifier0\n",koofp);
        print_state(yystate);
        strcpy(simple_type_name,$1);
        strcpy($$,$1);
}
        |       class_key_name /* done to resolve r/r conflicts */
{
        koofputs("type_specifier1.0\n",koofp);
        print_state(yystate);
        if(tail=0){
/*
                if(tail->class_key_class){
*/
                        delete_class_list(&head,&tail);
/*
                }
*/
        }
        strcpy($$,$1);
}
        |       class_key_name class_specifier /* done to resolve r/r conflicts */
{
```

```
                koofputs("type_specifier1.1\n",koofp);
                print_state(yystate);
                strcpy($$,$1);
                if(tail!=0){
                        if(tail->class_key_class){
                                printf("%s scanned\n",tail->class_name);
                                classes_seen++;
                                class_specifier_seen=1;
                                strcpy(g_class_name,tail->class_name);
                                update_g_bc_ptr(tail->class_name,base_name,pure_specifier_seen);
                                add_to_base_class_array(tail->class_name,base_name,pure_specifie
seen);
                                pure_specifier_seen=0;
                        }
                        delete_class_list(&head,&tail);
                }
        }
        {       |       enum_specifier koofputs("type_specifier2\n",koofp);
                print_state(yystate);
                strcpy($$,$1);
        }
        {       |       t_enum enum_name koofputs("type_specifier3\n",koofp);
                print_state(yystate);
                strcpy($$,"enum ");
                strcat($$,$2);
        }
        {       |       CONST koofputs("type_specifier4\n",koofp);
                print_state(yystate);
                const_decl=1;
                strcpy($$,"const");
        }
        {       |       VOLATILE koofputs("type_specifier5\n",koofp);
                print_state(yystate);
                strcpy($$,"volatile");
        }
/*
        {       | cv_qualifier koofputs("type_specifier4\n",koofp);
                print_state(yystate);
        }
*/
        ;
```

```
simple_type_name : dname2
{
            koofputs(" simple_type_name0\n",koofp);
            print_state(yystate);
            strcpy($$,$1);
}
        |       CHAR
{
            koofputs("char simple_type_name1\n",koofp);
            print_state(yystate);
            strcpy($$,"char");
}
        |       SHORT
{
            print_state(yystate);
            koofputs("short simple_type_name2\n",koofp);
            strcpy($$,"short");
}
        |       INT
{
            print_state(yystate);
            koofputs("int simple_type_name3\n",koofp);
            strcpy($$,"int");
}
        |       LONG
{
            print_state(yystate);
            koofputs("long simple_type_name4\n",koofp);
            strcpy($$,"long");
}
        |       SIGNED
{
            print_state(yystate);
            koofputs("signed simple_type_name5\n",koofp);
            strcpy($$,"signed");
}
        |       UNSIGNED
{
            print_state(yystate);
            koofputs("unsigned simple_type_name6\n",koofp);
            strcpy($$,"unsigned");
}
        |       FLOAT
{
            print_state(yystate);
            koofputs("float simple_type_name7\n",koofp);
            strcpy($$,"float");
}
        |       DOUBLE
{
            print_state(yystate);
            koofputs("double simple_type_name8\n",koofp);
            strcpy($$,"double");
```

```
}
        |       VOID
{
        print_state(yystate);
        koofputs("void simple_type_name9\n",koofp);
        strcpy($$,"void");
}
        |       enum_name                      /* not in c++ reference ?? */
{
        print_state(yystate);
        koofputs($1,koofp);
        koofputs(" simple_type_name10\n",koofp);
}
/* not in c++ reference ??
        |       dname2 double_colon enum_name
{
        print_state(yystate);
        koofputs($1,koofp);
        koofputs(" simple_type_name11\n",koofp);
}
*/
        ;

class_key : CLASS
{
        print_state(yystate);
        koofputs("class_key0\n",koofp);
        class_key_class = 1;
        strcpy($$,"class");
}
        |       STRUCT
{
        print_state(yystate);
        koofputs("class_key1\n",koofp);
        class_key_class = 0;
        strcpy($$,"struct");
}
        |       UNION
{
        print_state(yystate);
        koofputs("class_key2\n",koofp);
        class_key_class = 0;
        strcpy($$,"union");
}
        ;

enum_specifier : t_enum identifier left_brace enum_list maybe_comma right_brace
{
        print_state(yystate);
        koofputs("enum_specifier0\n",koofp);
        add_to_enum($2);
        strcpy($$,$2);
        /*
```

```
            strcpy($$,"enum ");
            strcat($$,$2);
            */
    }
            |       t_enum left_brace enum_list maybe_comma right_brace
    {
            print_state(yystate);
            koofputs("enum_specifier1\n",koofp);
            strcpy($$,"int");
            /*
            strcpy($$,"enum ");
            strcat($$,"{");
            strcat($$,$3);
            strcat($$,"}");
            */
    }
            ;

maybe_comma : /* empty */
            |       ','
    {
    }
            ;

enum_list : /* optional */
    {
            print_state(yystate);
            koofputs("enum_list0\n",koofp);
            strcpy($$,"");
    }
            |       enumerator
    {
            print_state(yystate);
            koofputs("enum_list1\n",koofp);
            strcpy($$,$1);
    }
            |       enum_list comma enumerator
    {
            print_state(yystate);
            koofputs("enum_list2\n",koofp);
            strcpy($$,$1);
            strcat($$," ");
            strcat($$,$3);
    }
            ;

enumerator : Identifier
    {
            print_state(yystate);
            koofputs("enumerator0\n",koofp);
            strcpy($$,$1);
    }
            |       Identifier equal constant_expression
```

```
        {
                print_state(yystate);
                koofputs("enumerator1\n",koofp);
                strcpy($$,$1);
                strcat($$,"=");
                strcat($$,$3);
        }
        ;

constant_expression : conditional_expression
        {
                print_state(yystate);
                koofputs("constant_express0\n",koofp);
                strcpy($$,$1);
        }
        ;

linkage_specification : t_extern string left_brace right_brace
        {
                print_state(yystate);
                koofputs("linkage0\n",koofp);
        }
        |       t_extern string left_brace declaration_list right_brace
        {
                print_state(yystate);
                koofputs("linkage1\n",koofp);
        }
        |       t_extern string declaration
        {
                print_state(yystate);
                koofputs("linkage2\n",koofp);
        }
        ;

declaration_list : declaration
        {
                koofputs("declaration_list0\n",koofp);
                print_state(yystate);
        }
        |       declaration_list declaration
        {
                koofputs("declaration_list1\n",koofp);
                print_state(yystate);
        }
        ;

/********************************
 *      DECLARATORS
 ********************************/ declarator_list : init_declarator
        {
```

```
                    $$.declarator=0;
                    $$.pointer_operator=0;
                    $$.arguments=0;
                    $$.function_pointer=0;

koofputs("declarator_list0\n",koofp);
            print_state(yystate);
            copy_declaration(&$$,&$1);
            free_pointer_declarator(&$1);
            $$.n++;
    }
    |       declarator_list comma init_declarator
    {
                    $$.declarator=0;
                    $$.pointer_operator=0;
                    $$.arguments=0;
                    $$.function_pointer=0;

koofputs("declarator_list1\n",koofp);
            print_state(yystate);
            allocate_pointer(&$1,strlen($3.pointer_operator[0]),$1.n);
            allocate_declarator(&$1,strlen($3.declarator[0]),$1.n);
            strcpy($1.declarator[$1.n],$3.declarator[0]);
            strcpy($1.pointer_operator[$1.n],$3.pointer_operator[0]);
            copy_declaration(&$$,&$1);
            declarator_count++;
            if(declarator_count==6){
                    declarator_count=0;
            }
            free_pointer_declarator(&$1);
            free_pointer_declarator(&$3);
            $$.n++;
    }
    ;

declarator : dname
    {
                    $$.declarator=0;
                    $$.pointer_operator=0;
                    $$.arguments=0;
                    $$.function_pointer=0;

koofputs("declarator0\n",koofp);
            print_state(yystate);
            if($$.function_pointer==NULL){
                    allocate_function_pointer(&($$.function_pointer));
/*
                    $$.function_pointer=(int*)calloc(500,;
*/
            }
            allocate_declarator(&$$,strlen($1),0);
            strcpy($$.declarator[0],$1);
            allocate_pointer(&$$,strlen(""),0);
```

```
                    strcpy($$.pointer_operator[0],"");
                    $$.meth_or_att='a';
       }
            |       ptr_operator declarator
       {
                    $$.declarator=0;
                    $$.pointer_operator=0;
                    $$.arguments=0;
                    $$.function_pointer=0;

koofputs("declarator1\n",koofp);
print_state(yystate);
if($2.pointer_operator!=NULL){
            strcpy(buffer,$1); /* $2.n by 0 */
            strcat(buffer,$2.pointer_operator[0]); /* $2.n by 0 */
            allocate_pointer(&$2,strlen(buffer),0); /* $2.n by 0 */
            strcpy($2.pointer_operator[0],buffer); /* $2.n by 0 */
}else{
            allocate_pointer(&$2,strlen($1),0); /* $2.n by 0 */
            strcpy($2.pointer_operator[0],$1); /* $2.n by 0 */
}
copy_declaration(&$$,&$2);
free_pointer_declarator(&$2);
       }
            |       declarator left_paren right_paren
       {
                    $$.declarator=0;
                    $$.pointer_operator=0;
                    $$.arguments=0;
                    $$.function_pointer=0;

koofputs("declarator2.0\n",koofp);
print_state(yystate);
if($1.function_pointer[0]){
            strcpy(buffer,$1.pointer_operator[0]);
            strcat(buffer,$1.declarator[0]);
            allocate_declarator(&$1,strlen(buffer),0); /* $2.n by 0 */
            strcpy($1.declarator[0],buffer); /* $2.n by 0 */
            strcpy($1.pointer_operator,"");
            $1.pointer_operator=0;
            $1.meth_or_att='a';
}else{
            $1.meth_or_att='m';
}
copy_declaration(&$$,&$1);
allocate_argument_type(&($$.arguments));
$$.arguments->count=0;
$$.arguments->variable_arg=0;
free_pointer_declarator(&$1);
       }
            |       declarator left_paren right_paren cv_qualifier_list
       {
                    $$.declarator=0;
```

```
                        $$.pointer_operator=0;
                        $$.arguments=0;
                        $$.function_pointer=0;

koofputs("declarator2.1\n",koofp);
            print_state(yystate);
            $1.meth_or_att='m';
            copy_declaration(&$$,&$1);
            allocate_argument_type(&($$.arguments));
            $$.arguments->count=0;
            $$.arguments->variable_arg=0;
            free_pointer_declarator(&$1);
}
    |       declarator left_paren argument_declaration_list right_paren
{
                        $$.declarator=0;
                        $$.pointer_operator=0;
                        $$.arguments=0;
                        $$.function_pointer=0;

koofputs("declarator2.2\n",koofp);
            print_state(yystate);
            if($1.function_pointer[0]){
                        strcpy(buffer,$1.pointer_operator[0]);
                        strcat(buffer,$1.declarator[0]);
                        allocate_declarator(&$1,strlen(buffer),0); /* $2.n by 0 */
                        strcpy($1.declarator[0],buffer); /* $2.n by 0 */
                        strcpy($1.pointer_operator,"");
                        $1.pointer_operator=0;
                        $1.meth_or_att='a';
            }else{
                        $1.meth_or_att='m';
            }
            copy_declaration(&$$,&$1);
            allocate_argument_type(&($$.arguments));
            exact_alloc_copy_atval(&($$.arguments),$3);
            free_pointer_declarator(&$1);
            free_atval(&$3);
}
    |       declarator left_paren argument_declaration_list right_paren cv_qualifier_list
{
                        $$.declarator=0;
                        $$.pointer_operator=0;
                        $$.arguments=0;
                        $$.function_pointer=0;

koofputs("declarator2.3\n",koofp);
            print_state(yystate);
            $1.meth_or_att='m';
            copy_declaration(&$$,&$1);
            allocate_argument_type(&($$.arguments));
            exact_alloc_copy_atval(&($$.arguments),$3);
            free_pointer_declarator(&$1);
```

```
            free_atval(&$3);
    }
          |        declarator left_bracket right_bracket
    {
                   $$.declarator=0;
                   $$.pointer_operator=0;
                   $$.arguments=0;
                   $$.function_pointer=0;

koofputs("declarator3\n",koofp);
print_state(yystate);
$1.meth_or_att='a';
strcpy(declarator_buffer,"/*array_subscripts#");
strcat(declarator_buffer,"[");
strcat(declarator_buffer,"]");
strcat(declarator_buffer,"#*/");
strcat(declarator_buffer,$1.declarator[0]);
allocate_declarator(&$1,strlen(declarator_buffer),0);
strcpy($1.declarator[0],declarator_buffer);
if($1.pointer_operator!=NULL){
            strcpy(buffer,$1.pointer_operator[0]); /* $1.n by 0 */
            strcat(buffer,"*"); /* $1.n by 0 */
            allocate_pointer(&$1,strlen(buffer),0); /* $1.n by 0 */
            strcpy($1.pointer_operator[0],buffer); /* $1.n by 0 */
}else{
            allocate_pointer(&$1,strlen(1),0); /* $1.n by 0 */
            strcpy($1.pointer_operator[0],"*"); /* $1.n by 0 */
}
copy_declaration(&$$,&$1);
free_pointer_declarator(&$1);
    }
          |        declarator left_bracket constant_expression right_bracket
    {
                   $$.declarator=0;
                   $$.pointer_operator=0;
                   $$.arguments=0;
                   $$.function_pointer=0;

koofputs("declarator4\n",koofp);
print_state(yystate);
$1.meth_or_att='a';
strcpy(declarator_buffer,"/*array_subscripts#");
strcat(declarator_buffer,"[");
strcat(declarator_buffer,$3);
strcat(declarator_buffer,"]");
strcat(declarator_buffer,"#*/");
strcat(declarator_buffer,$1.declarator[0]);
allocate_declarator(&$1,strlen(declarator_buffer),0);
strcpy($1.declarator[0],declarator_buffer);
if($1.pointer_operator!=NULL){
            strcpy(buffer,$1.pointer_operator[0]); /* $1.n by 0 */
            strcat(buffer,"*"); /* $1.n by 0 */
            allocate_pointer(&$1,strlen(buffer),0); /* $1.n by 0 */
```

```
                strcpy($1.pointer_operator[0],buffer); /* $1.n by 0 */
        }else{
                allocate_pointer(&$1,strlen(1),0); /* $1.n by 0 */
                strcpy($1.pointer_operator[0],"*"); /* $1.n by 0 */
        }
        copy_declaration(&$$,&$1);
        free_pointer_declarator(&$1);
}
        |       left_paren declarator right_paren
{
                $$.declarator=0;
                $$.pointer_operator=0;
                $$.arguments=0;
                $$.function_pointer=0;

koofputs("declarator5\n",koofp);
        print_state(yystate);
        $2.function_pointer[0]=1;
        copy_declaration(&$$,&$2);
        free_pointer_declarator(&$2);
}
        ;

init_declarator : declarator
{
                $$.declarator=0;
                $$.pointer_operator=0;
                $$.arguments=0;
                $$.function_pointer=0;

koofputs("init_declarator0\n",koofp);
        print_state(yystate);
        copy_declaration(&$$,&$1);
        free_pointer_declarator(&$1);
}
        |       declarator initializer
{
                $$.declarator=0;
                $$.pointer_operator=0;
                $$.arguments=0;
                $$.function_pointer=0;

koofputs("init_declarator1\n",koofp);
        print_state(yystate);
        copy_declaration(&$$,&$1);
        free_pointer_declarator(&$1);
}
        ;

ptr_operator : asterisk_amper cv_qualifier_list
/* done to resolve r/r conflicts */
{
        koofputs("ptr_operator0\n",koofp);
```

```
                print_state(yystate);
                strcpy($$,$1);
        }
        |       class_name colon colon asterisk cv_qualifier_list
        {
                koofputs("ptr_operator2\n",koofp);
                print_state(yystate);
                strcpy($$,$1);
                strcat($$,"::*");
        }
        |       asterisk_amper /* done to resolve r/r conflicts */
        {
                koofputs("ptr_operator4\n",koofp);
                print_state(yystate);
                strcpy($$,$1);
        }
        |       class_name colon colon asterisk
        {
                koofputs("ptr_operator5\n",koofp);
                print_state(yystate);
                strcpy($$,$1);
                strcat($$,"::*");
        }
        ;

cv_qualifier_list : cv_qualifier
{
        koofputs("cv_qualifier_list1\n",koofp);
        print_state(yystate);
}
        |       cv_qualifier cv_qualifier_list
{
        koofputs("cv_qualifier_list1\n",koofp);
        print_state(yystate);
}
        ;

dname : name
{
        koofputs("dname0\n",koofp);
        print_state(yystate);
        strcpy($$,$1);
}
        |       tilde identifier
{
        koofputs("dname1\n",koofp);
        print_state(yystate);
        strcpy($$,"~");
        strcat($$,$2);
}
        |       dname2
{
        print_state(yystate);
```

```
                koofputs("dname2\n",koofp);
                strcpy($$,$1);
        }
                ;

dname2 : typedef_name
        {
                print_state(yystate);
                koofputs($1,koofp);
                koofputs(" dname2--0\n",koofp);
                strcpy($$,get_typedef($1));
        }
        |       class_name
        {
                print_state(yystate);
                koofputs($1,koofp);
                koofputs(" dname2--1\n",koofp);
                strcpy($$,$1);
        }
                ;

type_name : decl_specifiers
        {
                koofputs("type_name0\n",koofp);
                print_state(yystate);
                strcpy($$,$1);
        }
        |       decl_specifiers abstract_declarator
        {
                koofputs("type_name1\n",koofp);
                print_state(yystate);
                strcpy($$,$1);
                strcat($$,$2);
        }
                ;

abstract_declarator : ptr_operator
        {
                print_state(yystate);
                koofputs("abstract_declarator0\n",koofp);
                strcpy($$,$1);
        }
        |       ptr_operator abstract_declarator
        {
                print_state(yystate);
                koofputs("abstract_declarator1\n",koofp);
                strcpy($$,$1);
                strcat($$,$2);
        }
        |       left_paren right_paren
        {
                print_state(yystate);
                koofputs("abstract_declarator2.0\n",koofp);
```

```
                    strcpy($$,"()");
        }
                |       abstract_declarator left_paren right_paren
        {
                    print_state(yystate);
                    koofputs("abstract_declarator2.1\n",koofp);
                    strcpy($$,$1);
                    strcat($$,"()");
        }
                |       left_paren right_paren cv_qualifier_list
        {
                    print_state(yystate);
                    koofputs("abstract_declarator2.2\n",koofp);
                    strcpy($$,"()");
        }
                |       abstract_declarator left_paren right_paren cv_qualifier_list
        {
                    print_state(yystate);
                    koofputs("abstract_declarator2.3\n",koofp);
                    strcpy($$,$1);
                    strcat($$,"()");
        }
                |       left_paren argument_declaration_list right_paren
        {
                    print_state(yystate);
                    koofputs("abstract_declarator2.4\n",koofp);
                    strcpy(arguments_buf,$2);
                    strcpy($$,"()");
                    free_atval(&$2);
        }
                |       abstract_declarator left_paren argument_declaration_list right_paren
        {
                    print_state(yystate);
                    koofputs("abstract_declarator2.5\n",koofp);
                    strcpy(arguments_buf,$3);
                    strcpy($$,$1);
                    strcat($$,"()");
                    free_atval(&$3);
        }
                |       left_paren argument_declaration_list right_paren cv_qualifier_list
        {
                    print_state(yystate);
                    koofputs("abstract_declarator2.6\n",koofp);
                    strcpy(arguments_buf,$2);
                    strcpy($$,"()");
                    free_atval(&$2);
        }
                |       abstract_declarator left_paren argument_declaration_list right_paren cv_qualifier
st
        {
                    print_state(yystate);
                    koofputs("abstract_declarator2.7\n",koofp);
                    strcpy(arguments_buf,$3);
```

```
            strcpy($$,$1);
            strcat($$,"()");
            free_atval(&$3);
}
        |       left_bracket right_bracket
{
            print_state(yystate);
            koofputs("abstract_declarator3.0\n",koofp);
            strcpy($$,"*");
}
        |       left_bracket constant_expression right_bracket
{
            print_state(yystate);
            koofputs("abstract_declarator3.1\n",koofp);
            strcpy($$,"*");
}
        |       abstract_declarator left_bracket right_bracket
{
            print_state(yystate);
            koofputs("abstract_declarator3.2\n",koofp);
            strcpy($$,$1);
            strcat($$,"*"); .
}
        |       abstract_declarator left_bracket constant_expression right_bracket
{
            print_state(yystate);
            koofputs("abstract_declarator3.3\n",koofp);
            strcpy($$,$1);
            strcat($$,"*");
}
        |       left_paren abstract_declarator right_paren
{
            print_state(yystate);
            koofputs("abstract_declarator4\n",koofp);
            strcpy($$,"(");
            strcat($$,$2);
            strcat($$,")");
}
        ;

argument_declaration_list :         TRIPLE_DOT
{
            print_state(yystate);
            koofputs("argument_declaration_list0\n",koofp);
            allocate_argument_type(&$$);
            $$->count=-1;
            $$->variable_arg=1;
}
        |       arg_declaration_list
{
            koofputs("argument_declaration_list1\n",koofp);
            print_state(yystate);
            $1->variable_arg=0;
```

```
                allocate_argument_type(&$$);
                exact_alloc_copy_atval(&$$,$1);
                free_atval(&$1);
}
        |       arg_declaration_list TRIPLE_DOT
{
                print_state(yystate);
                koofputs("argument_declaration_list2\n",koofp);
                $1->variable_arg=1;
                allocate_argument_type(&$$);
                exact_alloc_copy_atval(&$$,$1);
                free_atval(&$1);
}
        |       arg_declaration_list comma TRIPLE_DOT
{
                print_state(yystate);
                koofputs("argument_declaration_list3\n",koofp);
                $1->variable_arg=1;
                allocate_argument_type(&$$);
                exact_alloc_copy_atval(&$$,$1);
                free_atval(&$1);
}
        ;

arg_declaration_list : argument_declaration
{
                print_state(yystate);
                koofputs("arg_declaration_list0\n",koofp);
                allocate_argument_type(&$$);
                alloc_copy_increment_atval(&$$,$1);
}
        |       arg_declaration_list comma argument_declaration
{
                print_state(yystate);
                koofputs("arg_declaration_list1\n",koofp);
                alloc_copy_increment_atval(&$1,$3);
                allocate_argument_type(&$$);
                exact_alloc_copy_atval(&$$,$1);
                free_atval(&$1);
}
        ;

argument_declaration : decl_specifiers declarator
{
                print_state(yystate);
                koofputs("argument_declaration0\n",koofp);
                if($2.function_pointer[0]){
                        strcpy($$,"/*function_pointer*/");
                        strcat($$,$1);
                        strcat($$,$2.pointer_operator[0]);
                        strcat($$,"(");
                        strcat($$,$2.declarator[0]);
                        strcat($$,")");
```

```
                    strcat($$,"(");
                    for(i=0;i<$2.arguments->count;i++){
                            strcat($$,$2.arguments->arg[i]);
                            if(i<$2.arguments->count-1)strcat($$,",");
                    }
                    strcat($$,")");
            }else{
                    strcpy($$,$1);
                    strcat($$,$2.pointer_operator[0]);
            }
            free_pointer_declarator(&$2);

|       decl_specifiers declarator '=' {fp(" = ");} expression
    {
    print_state(yystate);
    koofputs("argument_declaration1\n",koofp);
    strcpy($$,$1);
    strcat($$,$2.pointer_operator[0]);
    strcat($$,"=");
    strcat($$,$5);
    strcat($$,"$"); /* end this with $ to indicate default initializer; remove in create_ma_list */
    free_pointer_declarator(&$2);
    }
    |       decl_specifiers
    {
    print_state(yystate);
    koofputs("argument_declaration2.0\n",koofp);
    strcpy($$,$1);
    }
    |       decl_specifiers abstract_declarator
    {
    print_state(yystate);
    koofputs("argument_declaration2.1\n",koofp);
    strcpy($$,$1);
    strcat($$,$2);
    }
    |       decl_specifiers '=' {fp(" = ");} expression
    {
    print_state(yystate);
    koofputs("argument_declaration3.0\n",koofp);
    strcpy($$,$1);
    strcat($$,"=");
    strcat($$,$4);
    strcat($$,"$");/* end this with $ to indicate default initializer; remove in create_ma_list */
    }
    |       decl_specifiers abstract_declarator '=' {fp(" = ");} expression
    {
    print_state(yystate);
    koofputs("argument_declaration3.1\n",koofp);
    strcpy($$,$1);
    strcat($$,$2);
    strcat($$,"=");
    strcat($$,$5);
```

```
                strcat($$,"$");/* end this with $ to indicate default initializer; remove in create_ma_list */
}
/*
        |       literal
{
        print_state(yystate);
        koofputs("argument_declaration3.2\n",koofp);
}
        |       declarator
{
        print_state(yystate);
        koofputs("argument_declaration3.3\n",koofp);
        strcpy($$,$1);
}
*/
        ;

function_definition : declarator function_body
{
                $$.declarator=0;
                $$.pointer_operator=0;
                $$.arguments=0;
                $$.function_pointer=0;

koofputs("function_definition0\n",koofp);
        print_state(yystate);
/*      default type int
*/
        strcpy($1.type,"");
        copy_declaration(&$$,&$1);
        free_pointer_declarator(&$1);
        $$.n++;
}
        |       declarator ctor_initializer function_body
{
                $$.declarator=0;
                $$.pointer_operator=0;
                $$.arguments=0;
                $$.function_pointer=0;

print_state(yystate);
        koofputs("function_definition1\n",koofp);
/*      default type int
*/
        strcpy($1.type,"");
        copy_declaration(&$$,&$1);
        free_pointer_declarator(&$1);
        $$.n++;
}
        |       decl_specifiers declarator function_body
{
                $$.declarator=0;
                $$.pointer_operator=0;
```

```
                $$.arguments=0;
                $$.function_pointer=0;

print_state(yystate);
        koofputs("function_definition2\n",koofp);
        strcpy($2.type,$1);
        copy_declaration(&$$,&$2);
        free_pointer_declarator(&$2);
        $$.n++;
}
        |       decl_specifiers declarator ctor_initializer function_body
{
                $$.declarator=0;
                $$.pointer_operator=0;
                $$.arguments=0;
                $$.function_pointer=0;

print_state(yystate);
        koofputs("function_definition3\n",koofp);
        strcpy($2.type,$1);
        copy_declaration(&$$,&$2);
        free_pointer_declarator(&$2);
        $$.n++;
}
        ;

function_body : compound_statement
{
        koofputs("function_body0\n",koofp);
        print_state(yystate);
}
        ;

initializer : equal expression
{
        koofputs("initializer1\n",koofp);
        print_state(yystate);
        strcpy($$,$2);
}
        |       equal left_brace initializer_list right_brace
{
        koofputs("initializer2\n",koofp);
        print_state(yystate);
}
        |       equal left_brace initializer_list comma right_brace
{
        koofputs("initializer3\n",koofp);
        print_state(yystate);
}
        |       left_paren expression_list right_paren
{
        koofputs("initializer4\n",koofp);
        print_state(yystate);
```

```
}
        ;

initializer_list : expression
{
        koofputs("initializer_list0\n",koofp);
        print_state(yystate);
}
        |       initializer_list comma expression
{
        koofputs("initializer_list1\n",koofp);
        print_state(yystate);
}
        |       left_brace initializer_list right_brace
{
        koofputs("initializer_list2\n",koofp);
        print_state(yystate);
}
        |       left_brace initializer_list comma right_brace
{
        koofputs("initializer_list3\n",koofp);
        print_state(yystate);
}
        ;

/*******************************
 *      CLASS DECLARATIONS     *
 *******************************/ class_specifier : left_brace {g_bc_ptr = (struct base_class*)malloc(sizeof(struct base_class)); last_ac
ss_specifier=PRIVATE_M; strcpy(base_name,"nobase");} make_friend member_list right_brace
{
        koofputs("class_specifier0\n",koofp);
}
        |       class_head left_brace {g_bc_ptr = (struct base_class*)malloc(sizeof(struct base_
ass)); last_access_specifier=PRIVATE_M;} make_friend member_list right_brace
{
        koofputs("class_specifier1\n",koofp);
        /*
        superclass=0;
        */
}
        ;

class_head : base_spec
{
        koofputs("class_head0.2\n",koofp);
        strcpy(base_name,$1);
        /*
        for(i=0;i<superclass->count;i++){
                free(superclass->superclass[i]);
                superclass->superclass[i]=0;
        }
```

```
                superclass->count=0;
                free((char*)superclass);
                superclass = 0;
                */
        }
                ;

class_key_name : class_key
{
                koofputs(" class_key_name0\n",koofp);
                strcpy($$,$1);
}
                |        class_key identifier
{
                koofputs($2,koofp);
                koofputs(" class_key_name1\n",koofp);
                add_to_class($2);
/*
                if(class_key_class){
*/
                        do_class_list($2);
/*
                }
*/
                strcpy($$,$1);
                strcat($$," ");
                strcat($$,$2);
}
                |        class_key class_name
{
                koofputs(" class_key_name2\n",koofp);
/*
                if(class_key_class){
*/
                        do_class_list($2);
/*
                }
*/
                strcpy($$,$1);
                strcat($$," ");
                strcat($$,$2);
}
                ;

/*
elaborated_type_specifier : class_key identifier
{
                koofputs($2,koofp);
                koofputs(" elaborated_type_specifier0\n",koofp);
                add_to_class($2);
}
                |        class_key class_name
{
```

```
                koofputs("elaborated_type_specifier1\n",koofp);
}
                |       t_enum enum_name
{
                koofputs("elaborated_type_specifier2\n",koofp);
}
                ;
*/ member_list :   member_declaration
{
        koofputs("member_list0\n",koofp);
}
                |       member_declaration member_list
{
        koofputs("member_list1\n",koofp);
}
                |       access_specifier ':'
{
        koofputs("member_list2.0\n",koofp);
}
                |       access_specifier ':' member_list
{
        koofputs("member_list2.1\n",koofp);
}
                ;

member_declaration : /*semi_colon
{
        koofputs("member_declaration-1\n",koofp);
}
                |*/     decl_specifiers semi_colon
{
        koofputs("member_declaration0\n",koofp);
        allocate_pointer(&declaration_buffer,1,declaration_buffer.n);
        allocate_declarator(&declaration_buffer,1,declaration_buffer.n);
        strcpy(declaration_buffer.type,$1);
        strcpy(declaration_buffer.declarator[declaration_buffer.n],"");
        declaration_buffer.meth_or_att = 'a';
        strcpy(declaration_buffer.pointer_operator[declaration_buffer.n],"");
        if(tail!=0){
                if(tail->class_key_class){
                        update_info_array(tail->class_name,declaration_buffer);
                }
        }
}
                |       member_declarator_list semi_colon
{
        koofputs("member_declaration0.1\n",koofp);
/* default type int
*/
        strcpy($1.type,"");
        if(tail!=0){
```

```
                              if(tail->class_key_class){
                                      update_info_array(tail->class_name,$1);
                              }
                      }
                      free_pointer_declarator(&$1);
}
              |       decl_specifiers member_declarator_list semi_colon
{
koofputs("member_declaration1.0\n",koofp);
strcpy($2.type,$1);
if(tail!=0){
              if(tail->class_key_class){
                              if(in_string("friend",$1)){
                                      update_friend_function_array(tail->class_name,$2);
                              }else{
                                      update_info_array(tail->class_name,$2);
                              }
                      }
              }
              free_pointer_declarator(&$2);
}
              |       t_typedef decl_specifiers member_declarator_list semi_colon
{
koofputs("member_declaration1.1\n",koofp);
for(i=0;i<$3.n;i++){
              strcpy(buffer,$2);
              strcat(buffer,$3.pointer_operator[i]);
              strcpy(declarator_buffer,$3.declarator[i]);
              add_to_typedef(buffer,declarator_buffer,$3.function_pointer[i],$3.arguments);
}
free_pointer_declarator(&$3);
}
              |       function_definition
{
koofputs("member_declaration2\n",koofp);
if(tail!=0){
              if(tail->class_key_class){
                              if(in_string("friend",$1.type)){
                                      update_friend_function_array(tail->class_name,$1);
                              }else{
                                      update_info_array(tail->class_name,$1);
                              }
                      }
              }
              free_pointer_declarator(&$1);
}
              |       function_definition semi_colon
{
koofputs("member_declaration3\n",koofp);
if(tail!=0){
              if(tail->class_key_class){
                              if(in_string("friend",$1.type)){
                                      update_friend_function_array(tail->class_name,$1);
```

```
                    }else{
                            update_info_array(tail->class_name,$1);
                    }
            }
        }
        free_pointer_declarator(&$1);
        |       qualified_name semi_colon
                {
                        koofputs("member_declaration4\n",koofp);
                }
        ;

member_declarator_list : member_declarator
        {
                $$.declarator=0;
                $$.pointer_operator=0;
                $$.arguments=0;
                $$.function_pointer=0;

koofputs("member_declarator_list0\n",koofp);
                copy_declaration(&$$,&$1);
                free_pointer_declarator(&$1);
                $$.n++;
        }
        |       member_declarator_list comma member_declarator
                {
                        $$.declarator=0;
                        $$.pointer_operator=0;
                        $$.arguments=0;
                        $$.function_pointer=0;

koofputs("member_declarator_list1\n",koofp);
                        allocate_pointer(&$1,strlen($3.pointer_operator[0]),$1.n);
                        allocate_declarator(&$1,strlen($3.declarator[0]),$1.n);
                        strcpy($1.declarator[$1.n],$3.declarator[0]);
                        strcpy($1.pointer_operator[$1.n],$3.pointer_operator[0]);
                        copy_declaration(&$$,&$1);
                        free_pointer_declarator(&$1);
                        free_pointer_declarator(&$3);
                        $$.n++;
                }
        ;

member_declarator : declarator
        {
                $$.declarator=0;
                $$.pointer_operator=0;
                $$.arguments=0;
                $$.function_pointer=0;

koofputs("member_declarator0\n",koofp);
                strcpy($1.type,"");
```

```
            copy_declaration(&$$,&$1);
            free_pointer_declarator(&$1);
}
        |       declarator pure_specifier
{
            $$.declarator=0;
            $$.pointer_operator=0;
            $$.arguments=0;
            $$.function_pointer=0;

koofputs("member_declarator1\n",koofp);
            strcpy($1.type,"");
            copy_declaration(&$$,&$1);
            pure_specifier_seen=1;
            free_pointer_declarator(&$1);
}
        |       identifier colon constant_expression
{
            $$.declarator=0;
            $$.pointer_operator=0;
            $$.arguments=0;
            $$.function_pointer=0;

koofputs("member_declarator2\n",koofp);
            strcpy($$,"member_decl2");
}
        ;

pure_specifier : equal integer_constant
{
        if($2 == 0){
                koofputs("pure_specifier\n",koofp);
        }else{ yyerror("pure specifier has number other than 0\n");
        }
}
        ;

base_spec : colon base_list
{
        koofputs("base_spec1\n",koofp);
        strcpy($$,$2);
}
        ;

base_list : base_specifier
{
        koofputs("base_list0\n",koofp);
        strcpy($$,$1);
}
        |       base_list comma base_specifier
{
```

```
        koofputs("base_list1\n",koofp);
        /*
        superclass->superclass[superclass->count]=(char*)malloc(strlen($1)+1);
        strcpy(superclass->superclass[superclass->count++],$3);
        */
        strcpy($$,$1);
        strcat($$,",");
        strcat($$,$3);
}
        ;

base_specifier : class_name
{
        koofputs("base_specifier0\n",koofp);
        strcpy($$,$1);
}
        |       VIRTUAL access_specifier {fp("virtual ");} class_name
{
        koofputs("base_specifier1\n",koofp);
        strcpy($$,$4);
}
        |       VIRTUAL {fp("virtual ");}              class_name
{
        koofputs("base_specifier2\n",koofp);
        strcpy($$,$3);
}
        |       access_specifier VIRTUAL {fp("virtual ");} class_name
{
        koofputs("base_specifier3\n",koofp);
        strcpy($$,$4);
}
        |       access_specifier {fp("");} class_name
{
        koofputs("base_specifier4\n",koofp);
        strcpy($$,$3);
}
        ;

access_specifier : PRIVATE
{
        koofputs("access_specifier0\n",koofp);
        last_access_specifier=PRIVATE_M;
}
        |       PROTECTED
{
        koofputs("access_specifier1\n",koofp);
        last_access_specifier=PROTECTED_M;
}
        |       PUBLIC
{
        koofputs("access_specifier2\n",koofp);
        last_access_specifier=PUBLIC_M;
}
```

```
        ;

conversion_function_name : OPERATOR {fp("operator ");} conversion_type_name
{
        koofputs("conversion_function_name0\n",koofp);
        strcpy($$,"conversion_type_nameoperator ");
        strcat($$,$3);
}
        ;

conversion_type_name : decl_specifiers  /* change from type_specifier to decl_specifier to handle op
ator const fd_set&() const {...} in class FDSet */
{
        koofputs("conversion_type_name0\n",koofp);
        strcpy($$,$1);
}
        |       decl_specifiers ptr_operator
{
        koofputs("conversion_type_name1\n",koofp);
        strcpy($$,$1);
        strcat($$,$2);
}
        |       name    /* to resolve identifier or class_name conflict */
{
        koofputs("conversion_type_name2\n",koofp);
        strcpy($$,$1);
}
        |       name ptr_operator               /* identifier class_name conflict */
{
        koofputs("conversion_type_name3\n",koofp);
        strcpy($$,$1);
        strcat($$,$2);
}
        ;

ctor_initializer : colon member_initializer_list
{
        koofputs("ctor_initializer0\n",koofp);
}
        ;

member_initializer_list : member_initializer
{
        koofputs("member_initializer_list0\n",koofp);
}
        |       member_initializer comma member_initializer_list
{
        koofputs("member_initializer_list1\n",koofp);
}
        ;

member_initializer : identifier left_paren right_paren
{
```

```
                koofputs("member_initializer0\n",koofp);
        }
                |       identifier left_paren expression_list right_paren
        {
                koofputs("member_initializer1\n",koofp);
        }
                |       class_name left_paren right_paren
        {
                koofputs("member_initializer2\n",koofp);
        }
                |       class_name left_paren expression_list right_paren
        {
                koofputs("member_initializer3\n",koofp);
        }
                |       left_paren right_paren
        {
                koofputs("member_initializer4\n",koofp);
        }
                ;

operator_function_name : OPERATOR {fp("operator ");} operator
{
        koofputs("operator_function_name0\n",koofp);
        strcpy($$,"operator ");
        strcat($$,$3);
}
        ;

operator : NEW
{
        fp("new ");
        strcpy($$,"new");
}
        |       DELETE
{strcpy($$,"delete");}
        |       '+'
{strcpy($$,"+");}
        |       '-'
{ strcpy($$,"-");}
        |       '*'
{ strcpy($$,"*");}
        |       '/'
{ strcpy($$,"/");}
        |       '%'
{ strcpy($$,"%");}
        |       '^'
{ strcpy($$,"^");}
        |       '&'
{ strcpy($$,"&");}
        |       '|'
{ strcpy($$,"|");}
        |       '~'
{ strcpy($$,"~");}
```

| '!'
{ strcpy($$,"!");}
| '='
{ strcpy($$,"=");}
| '<'
{ strcpy($$,"<");}
| '>'
{ strcpy($$,">");}
| PLUS_EQUAL
{ strcpy($$,"+=");}
| MINUS_EQUAL
{ strcpy($$,"-=");}
| TIMES_EQUAL
{ strcpy($$,"*=");}
| DIVIDE_EQUAL
{ strcpy($$,"/=");}
| MOD_EQUAL
{ strcpy($$,"%=");}
| EXOR_EQUAL
{ strcpy($$,"^=");}
| AND_EQUAL
{ strcpy($$,"&=");}
| OR_EQUAL
{ strcpy($$,"|=");}
| DOUBLE_LEFT_ANGLE
{ fp("<<"); strcpy($$,"<<");}
| DOUBLE_RIGHT_ANGLE
{ fp(">>"); strcpy($$,">>");}
| RIGHT_SHIFT_EQUAL
{ strcpy($$,">>=");}
| LEFT_SHIFT_EQUAL
{ strcpy($$,"<<=");}
| DOUBLE_EQUAL
{ fp("=="); strcpy($$,"==");}
| NOT_EQUAL
{ fp("!="); strcpy($$,"!=");}
| LESS_EQUAL
{ fp("<="); strcpy($$,"<=");}
| GREATER_EQUAL
{ fp(">="); strcpy($$,">=");}
| DOUBLE_AMPERSAND
{ fp("&&"); strcpy($$,"&&");}
| DOUBLE_VERTICAL_BAR
{ fp("||"); strcpy($$,"||");}
| DOUBLE_PLUS
{ fp("++"); strcpy($$,"++");}
| DOUBLE_MINUS
{ fp("--"); strcpy($$,"--");}
| ','
{ strcpy($$,",");}
| POINTER '*'
{ fp("->*"); strcpy($$,"->*");}
| POINTER

```
{ fp("->"); strcpy($$,"->");}
         |                      '(' ')'
{ strcpy($$,"()");}
         |                      '[' ']'
{ strcpy($$,"[]");}
         ;
```

/*********************************
 *       STATEMENTS              *
 *********************************/

```
statement : labeled_statement
          |          expression_statement
          |          compound_statement
          |          selection_statement
          |          iteration_statement
          |          jump_statement
          |          declaration_statement
          ;

labeled_statement : identifier colon statement
                  |          t_case constant_expression colon statement
                  |          t_default colon statement
                  ;

expression_statement : expression semi_colon
                     ;

compound_statement : left_brace right_brace
                   |          left_brace statement_list right_brace
                   ;

statement_list : statement
               |          statement_list statement
               ;

selection_statement : t_if left_paren expression right_paren statement
                    |          t_if left_paren expression right_paren statement t_else statement
                    |          SWITCH left_paren expression right_paren statement
                    ;

iteration_statement : WHILE left_paren expression right_paren statement
                    |          t_do statement WHILE left_paren expression right_paren
                    |          FOR left_paren for_init_statement expression semi_colon expression right_pare
tatement
                    ;

for_init_statement : expression_statement
                   |          declaration_statement
                   ;

jump_statement : BREAK ';'
{ }
```

```
            |        CONTINUE ';'
{ }
            |        t_return expression semi_colon
            |        GOTO identifier ';'
{
}
            ;

declaration_statement : declaration
            ;

/************************************************
 * done to ensure fputting at the right time *
 ************************************************/ make_friend :
{
        if(class_key_class){
        /*
                fp("friend char* get_attribute(char*,void*,char*);\n");
                fp("friend char* call_method(char*,void*,char*,struct value_struct**,int);\n");
        */
                fp("public :\n");
        }
}
        ;

left_paren : '('
{
}
        ;

right_paren : ')'
{
}
        ;

left_brace : '{'
{
}
        ;

right_brace : '}'
{
}
        ;

left_bracket : '['
{
}
        ;
```

```
right_bracket : ']'
{
}
        ;

comma : ','
{
}
        ;

equal : '='
{
            koofputs("equal\n",koofp);
}
        ;

q_mark : '?'
{
}
        ;

colon : ':'
{
}
        ;

v_bar : '|'
{
}
        ;

caret : '^'
{
}
        ;

ampersand : '&'
{
}
        ;

less_than : '<'
{
}
        ;

greate_than : '>'
{
}
        ;

plus : '+'
{
```

```
}
    ;
minus : '-'
{
}
    ;
asterisk : '*'
{
}
    ;
divide : '/'
{
}
    ;
mod : '%'
{
}
    ;
period : '.'
{
}
    ;
semi_colon : ';'
{
}
    ;
tilde : '~'
{
}
    ;
t_return : RETURN
{           }
    ;
t_case : CASE
{           }
    ;
t_default : DEFAULT
{           }
    ;
t_delete: DELETE
{           }
    ;
```

```
t_do : DO
{               }
        ;

identifier : IDENTIFIER
{
        strcpy($$,$1);
        fpstatep($1);
}
        ;

class_name : CLASS_NAME
{
        strcpy($$,$1);
        fputs($1,koofp);
        fputs("    class\n",koofp);
        fpstatep($1);
}
        ;

typedef_name : TYPEDEF_NAME
{
        strcpy($$,$1);
        fputs($1,koofp);
        fputs("    typedef\n",koofp);
        fpstatep($1);
}
        ;

enum_name : ENUM_NAME
{
        strcpy($$,$1);
        fpstatep($1);
}
        ;

t_enum : ENUM
{
}
        ;

integer_constant : INTEGER_CONSTANT
{
        sprintf(buffer,"%d",$1);
        $$=$1;
}
        ;

floating_constant : FLOATING_CONSTANT
{
        sprintf(buffer,"%f",$1);
        $$=$1;
```

```
}
        ;

character_constant : CHARACTER_CONSTANT
{
        sprintf(buffer,"%s",$1);
        strcpy($$,$1);
}
        ;

string : STRING
{
        strcpy($$,$1);
}
        ;

t_extern : EXTERN
{
        fp("extern ");
}
        ;

double_colon : DOUBLE_COLON
{
        fp("::");
}
        ;

t_new : NEW
{
        fp("new ");
}
        ;

t_typedef : TYPEDEF
{
        fp("typedef ");
}
        ;

t_sizeof: SIZEOF
{
        fp("sizeof ");
}
        ;

t_if : IF
{
        fp("if ");
}
        ;

t_else : ELSE
```

```
{
        fp("else ");
}
        ;

%%
char* remove_array_subscripts_comment(declarator)
char* declarator;
{
        int i,rsi=0;
        static char rs[1000];
        if(strncmp(declarator,"/*array_subscripts",strlen("/*array_subscripts"))==0){
                for(i=strlen("/*array_subscripts");i<strlen(declarator);i++){
                        if((declarator[i-1]=='\*')&&(declarator[i]=='/')){
                                i++;
                                break;
                        }
                }
                for(;i<strlen(declarator);i++){
                        rs[rsi++]=declarator[i];
                }
                rs[rsi]=0;
                return rs;
        }else{
                return declarator;
        }
} add_to_typedef(t,s,function_pointer,arguments)
char* t;
char* s;
int function_pointer;
struct argument_type *arguments;
{
char buffer[5000];
char asterisk[20];
char identifier[1000];
ENTRY *ent;

ent = (ENTRY*)malloc(sizeof(ENTRY));
        if(function_pointer){
        sscanf(s,"%[*] %s",asterisk,identifier);
        strcpy(buffer,t);
        strcat(buffer,"(");
        strcat(buffer,asterisk);
        strcat(buffer,"/*fp*/)");
        strcat(buffer,"(");
        if(arguments != NULL){
                for(i=0;i<arguments->count;i++){
                        strcat(buffer,arguments->arg[i]);
                        if(i<arguments->count-1) strcat(buffer," ");
                }
```

```
            }
            strcat(buffer,")");
                    ent->type=malloc(strlen(buffer)+1);
            strcpy(ent->type,buffer);
                    ent->key=malloc(strlen(identifier)+1);
            strcpy(ent->key,identifier);
        }else{
            strcpy(buffer,remove_array_subscripts_comment(s));
                    ent->type=malloc(strlen(t)+1);
            strcpy(ent->type,t);
                    ent->key=malloc(strlen(buffer)+1);
            strcpy(ent->key,buffer);
        }
            ent->kind = KINDTYPEDEF;
            entry_array[entry_array_index++]=ent;
            ent=0;
} add_to_class(s)
char* s;
{
int i;
ENTRY *ent;
        i=strlen(s);
            ent = (ENTRY *)malloc(sizeof(ENTRY));
            ent->key=malloc(i+1);
            strcpy(ent->key,s);
            ent->kind = KINDCLASS;
            entry_array[entry_array_index++]=ent;
            ent=0;
} add_to_enum(s)
char* s;
{
int i;
ENTRY *ent;

i=strlen(s);
            ent = (ENTRY*)malloc(sizeof(ENTRY));
            ent->key=malloc(i+1);
            strcpy(ent->key,s);
            ent->kind = KINDENUM;
            entry_array[entry_array_index++]=ent;
            ent=0;
} koofputs(s,fptr)
char* s;
FILE *fptr;
{
/*
```

```c
                fputs(s,fptr);
*/
} print_state(yystate)
int yystate;
{
/*
        char buffer[100];

sprintf(buffer,"%d",yystate);
        fputs(buffer,statep);
        fputs("*",statep);
*/
} fp(s)
char *s;
{
} fpstatep(s)
char *s;
{
/*
        fputs(s,statep);
*/
} get_function_pointer(s,d,declarator_count)
char* s;
struct method_or_attribute *d;
int declarator_count;
{
        strcpy(s,"/*function_pointer*/");
        strcat(s,"(");
        strcat(s,d->declarator[declarator_count]);
        strcat(s,")");
        strcat(s,"(");
        if(d->arguments != NULL){
                for(i=0;i<d->arguments->count;i++){
                        strcat(s,d->arguments->arg[i]);
                        if(i<d->arguments->count-1) strcat(s," ");
                }
        }
        strcat(s,")");

} find_first_default_initializer_pos(arguments)
struct argument_type arguments;
{
int len;
```

```
            for(i=0;i<arguments.count;i++){
                    len=strlen(arguments.arg[i]);
                    if(arguments.arg[i][len-1]=='$')
                            return i;
            }
            return -1; /* no default initializer */
} remove_trailing_dollar(arguments)
struct argument_type* arguments;
{
int i;
int len;
            for(i=0;i<arguments->count;i++){
                    len=strlen(arguments->arg[i]);
                    if(arguments->arg[i][len-1] == '$'){
                            arguments->arg[i][len-1] == 0;
                    }
            }
} update_info_array(class_name,declaration)
char *class_name;
struct method_or_attribute declaration;
{
char buff[200];
int i,j,k,l,p;
int dii;
int number_declarators=0;
int first_di_pos=0;
            l=strlen(class_name);
            k=strlen(declaration.type);
            p=strlen(declaration.pointer_operator);
            if(declaration.meth_or_att == 'a'){ /* update attr_info */
                    for(number_declarators=0;number_declarators<declaration.n;number_declarato
++){
                            attr_info_array[aia_index]=(struct attr_info*)malloc(sizeof(struct attr_in
);
                            attr_info_array[aia_index]->bc_ptr=g_bc_ptr;
                            if(declaration.function_pointer[number_declarators]){
                                    get_function_pointer(buff,&declaration,number_declarators);
                                    l=strlen(buff);
                                    attr_info_array[aia_index]->attr_name=(char*)malloc(l+1);
                                    strcpy(attr_info_array[aia_index]->attr_name,buff);
                            }else{
                                    l=strlen(declaration.declarator[number_declarators]);
                                    attr_info_array[aia_index]->attr_name=(char*)malloc(l+1);
                                    strcpy(attr_info_array[aia_index]->attr_name,declaration.dec
rator[number_declarators]);
                            }
                            p=strlen(declaration.pointer_operator[number_declarators]);
                            attr_info_array[aia_index]->attr_type=(char*)malloc(k+p+1);
```

```
                        strcpy(attr_info_array[aia_index]->attr_type,declaration.type);
                        strcat(attr_info_array[aia_index]->attr_type,declaration.pointer_operatc
number_declarators]);
                        attr_info_array[aia_index]->access_spec = last_access_specifier;
                /*
                        attr_info_array[aia_index]->superclass = superclass;
                */
                        aia_index++;
                }
        }else if(declaration.meth_or_att == 'm'){ /* update method_info */
                first_di_pos = find_first_default_initializer_pos(declaration.arguments);
                for(number_declarators=0;number_declarators<declaration.n;number_declaratoi
++){
                        method_info_array[mia_index]=(struct method_info*)malloc(sizeof(stru
method_info));
                        method_info_array[mia_index]->bc_ptr=g_bc_ptr;
                        p=strlen(declaration.pointer_operator[number_declarators]);
                        method_info_array[mia_index]->return_type=(char*)malloc(k+p+1);
                        strcpy(method_info_array[mia_index]->return_type,declaration.type);
                        strcat(method_info_array[mia_index]->return_type,declaration.pointer_
perator[number_declarators]);
                        l=strlen(declaration.declarator[number_declarators]);
                        method_info_array[mia_index]->method_name=(char*)malloc(l+1);
                        strcpy(method_info_array[mia_index]->method_name,declaration.decl
ator[number_declarators]);
                        method_info_array[mia_index]->access_spec=last_access_specifier;
                        if(first_di_pos==-1){ /* no default initializer */
                                allocate_argument_type(&(method_info_array[mia_index]->r
thod_arguments));
                                exact_alloc_copy_atval(&(method_info_array[mia_index]->n
hod_arguments),declaration.arguments);
                                method_info_array[mia_index]->extra = 0;
                                mia_index++;
                        }else{
                                allocate_argument_type(&(method_info_array[mia_index]->r
thod_arguments));
                                exact_alloc_copy_atval(&(method_info_array[mia_index]->n
hod_arguments),declaration.arguments);
                                method_info_array[mia_index]->extra = 0;
                                mia_index++;
                                for(dii=declaration.arguments->count-1;dii>=first_di_pos;dii--
                                        method_info_array[mia_index]=(struct method_infi
malloc(sizeof(struct method_info));
                                        method_info_array[mia_index]->bc_ptr=g_bc_ptr;
                                        method_info_array[mia_index]->return_type=(char
malloc(strlen(method_info_array[mia_index-1]->return_type)+1);
                                        strcpy(method_info_array[mia_index]->return_type
method_info_array[mia_index-1]->return_type);
                                        method_info_array[mia_index]->method_name=(c
r*)malloc(strlen(method_info_array[mia_index-1]->method_name)+1);
                                        strcpy(method_info_array[mia_index]->method_na
e,method_info_array[mia_index-1]->method_name);
                                        method_info_array[mia_index]->access_spec=me
```

```
od_info_array[mia_index-1]->access_spec;
                                                    allocate_argument_type(&(method_info_array[mia_
ndex]->method_arguments));
                                                    declaration.arguments->count--;
                                                    exact_alloc_copy_atval(&(method_info_array[mia_
dex]->method_arguments),declaration.arguments);
                                                    method_info_array[mia_index]->extra = 1;
                                                    mia_index++;
                                        }
                            }
                }
        }else{
                printf("update:method or attribute?\n");
                printf("\t%s %s %s moa=%c\n",class_name,declaration.type,declaration.declarat
declaration.meth_or_att);
        }
} allocate_function_pointer();
copy_declaration(a,b)
struct method_or_attribute *a;
struct method_or_attribute *b;
{
        int i;
        a->function_pointer=0;
        a->pointer_operator=0;
        a->arguments=0;
        a->declarator=0;
        b->n++; /* this will make declarator to be stored at the right place */
        strcpy(a->type,b->type);
        if(a->declarator==NULL){
                a->declarator=(char**)calloc(MAXDECLARATOR,sizeof(char*));
                if(a->declarator==NULL){
                        printf("calloc returns NULL");
                }
        }
        if(a->pointer_operator==NULL){
                a->pointer_operator=(char**)calloc(MAXDECLARATOR,sizeof(char*));
                if(a->pointer_operator==NULL){
                        printf("calloc returns NULL");
                }
        }
        if(a->function_pointer==NULL){
                allocate_function_pointer(&(a->function_pointer));
        }
        if(b->declarator==NULL){
                b->declarator=(char**)calloc(MAXDECLARATOR,sizeof(char*));
                if(b->declarator==NULL){
                        printf("calloc returns NULL");
                }
        }
        if(b->pointer_operator==NULL){
                b->pointer_operator=(char**)calloc(MAXDECLARATOR,sizeof(char*));
```

```
            if(b->pointer_operator==NULL){
                    printf("calloc returns NULL");
            }
    }
    if(b->function_pointer==NULL){
            allocate_function_pointer(&(b->function_pointer));
    }
    for (i=0;i<b->n;i++){
            if(b->declarator[i]==0){
                    a->declarator[i]=(char*)malloc(1);
                    strcpy(a->declarator[i],"");
            }else{
                    a->declarator[i]=(char*)malloc(strlen(b->declarator[i])+1);
                    strcpy(a->declarator[i],b->declarator[i]);
            }
            if(b->pointer_operator[i]==0){
                    a->pointer_operator[i]=(char*)malloc(1);
                    strcpy(a->pointer_operator[i],"");
            }else{
                    a->pointer_operator[i]=(char*)malloc(strlen(b->pointer_operator[i])+1);
                    strcpy(a->pointer_operator[i],b->pointer_operator[i]);
            }
            a->function_pointer[i] = b->function_pointer[i];
    }
    /*
    for(i=0;i<MAXDECLARATOR;i++){
    for(i=0;i<b->n;i++){
            a->function_pointer[i] = b->function_pointer[i];
    }
    */
    a->meth_or_att = b->meth_or_att;
    b->n--; /* increment will occur at declarator_list */
    a->n = b->n;

if(b->arguments!=NULL){
            if(a->arguments==NULL){
                    allocate_argument_type(&(a->arguments));
                    exact_alloc_copy_atval(&(a->arguments),b->arguments);
            }else{
                    exact_alloc_copy_atval(&(a->arguments),b->arguments);
            }
    }
} add_to_base_class_array(class_name,base_name,i)
char* class_name;
char* base_name;
int i;
{
        base_class_array[bca_index]=(struct base_class*)malloc(sizeof(struct base_class));
        strcpy(base_class_array[bca_index]->class_name,class_name);
        strcpy(base_class_array[bca_index]->base_name,base_name);
        base_class_array[bca_index++]->is_abstract=i;
```

}

```
create_class_list_node(class_name,cl_ptr)
char* class_name;
struct class_list **cl_ptr;
{
        *cl_ptr=(struct class_list*)malloc(sizeof(struct class_list));
        strcpy((*cl_ptr)->class_name,class_name);
        (*cl_ptr)->class_key_class=class_key_class;
        (*cl_ptr)->next = 0;
} append_class_list(ltail,lx)
struct class_list **ltail;
struct class_list **lx;
{
        (*ltail)->next = *lx;
        *ltail = *lx;
} delete_class_list(lhead,ltail)
struct class_list **lhead;
struct class_list **ltail;
{
        struct class_list * t;
        struct class_list * throw;

t=*lhead;
        if(t!=0){
                if(t->next!=0){ /* only one node */
                        while(t->next->next!=0){
                                t=t->next;
                        }
                        *ltail=t;
                        throw=t->next;
                        (*ltail)->next=0;
                }else{
                        *lhead=tail=0;
                        throw=t;
                }
                throw->class_name[0]=0;
                throw->next=0;
                free(throw);
        }
} empty(x)
struct class_list* x;
{
        if(x==0){
                return 1;
        }
        return 0;
```

```
}
do_class_list(s)
char* s;
{
            if(empty(head)){
                        create_class_list_node(s,&head);
                        tail=head;
            }else{
                        create_class_list_node(s,&class_list_buf);
                        append_class_list(&tail,&class_list_buf);
            }
} allocate_pointer(moaptr,plen,moan)
struct method_or_attribute *moaptr;
int plen;
int moan;
{
        if (moaptr->pointer_operator==NULL){
                    moaptr->pointer_operator=(char**)calloc(MAXDECLARATOR,sizeof(char*));
                    if (moaptr->pointer_operator==NULL){
                                printf("calloc returns NULL");
                    }
        }
        moaptr->pointer_operator[moan]=(char*)malloc(plen+1);
} allocate_declarator(moaptr,dlen,moan)
struct method_or_attribute *moaptr;
int dlen;
int moan;
{
        if (moaptr->declarator==NULL){
                    moaptr->declarator=(char**)calloc(MAXDECLARATOR,sizeof(char*));
                    if(moaptr->declarator==NULL){
                                printf("calloc returns NULL");
                    }
        }
        moaptr->declarator[moan]=(char*)malloc(dlen+1);
} allocate_function_pointer(function_pointer)
int **function_pointer;
{
        *function_pointer=(int*)calloc(MAXDECLARATOR,sizeof(int));
        if(*function_pointer==NULL){
                    printf("calloc returns NULL");
        }
} free_pointer_declarator(moaptr)
```

```c
struct method_or_attribute *moaptr;
{
        int i;
        moaptr->n++;
        for(i=0;i<moaptr->n;i++){
                free(moaptr->pointer_operator[i]);
                free(moaptr->declarator[i]);
                moaptr->pointer_operator[i]=0;
                moaptr->declarator[i]=0;
        }
        free(moaptr->declarator);
        free(moaptr->pointer_operator);
        if(moaptr->arguments!=NULL){
                free_atval(&(moaptr->arguments));
        }
        free(moaptr->function_pointer);
        moaptr->pointer_operator=0;
        moaptr->declarator=0;
        moaptr->function_pointer=0;
        moaptr->n--;
} exact_alloc_copy_atval(a,b)
struct argument_type **a;
struct argument_type *b;
{
int i;
int arglen;

for(i=0;i<b->count;i++){
                arglen=strlen(b->arg[i]);
                (*a)->arg[i]=(char*)malloc(arglen+1);
                strcpy((*a)->arg[i],b->arg[i]);
        }
        (*a)->count=b->count;
        (*a)->variable_arg=b->variable_arg;
} alloc_copy_increment_atval(atptr,s)
struct argument_type **atptr;
char *s;
{
        (*atptr)->arg[(*atptr)->count]=(char*)malloc(strlen(s)+1);
        strcpy((*atptr)->arg[(*atptr)->count],s);
        (*atptr)->count++;
} allocate_argument_type(atptr)
struct argument_type **atptr;
{
        int i;
        *atptr=(struct argument_type *)malloc(sizeof(struct argument_type));
        (*atptr)->count=0;
```

```
                (*atptr)->variable_arg=0;
                for(i=0;i<MAXARG;i++){
                        (*atptr)->arg[i]=0;
                }
} free_atval(atptr)
struct argument_type **atptr;
{
        int i;
        for(i=0;i<(*atptr)->count;i++){
                free((*atptr)->arg[i]);
                (*atptr)->arg[i]=0;
        }
        (*atptr)->count=0;
        (*atptr)->variable_arg=0;
        free(*atptr);
        *atptr=0;
} char* get_typedef(s)
char* s;
{
static char rs[MAXTYPE] = "";

for(i=0;i<entry_array_index;i++){
                if((entry_array[i]->kind==KINDTYPEDEF)&&
                  (strcmp(entry_array[i]->key,s)==0)){
                        strcpy(rs,entry_array[i]->type);
                        return rs;
                }

}
        fprintf(stderr,"get_typedef():can,t find typedef\n");
        exit(1);
} update_friend_function_array(class_name,declarator)
char* class_name;
struct method_or_attribute declarator;
{
int i; /* number of declarators */
int p,k,l;

if(declarator.meth_or_att == 'a')goto end_of_update_friend;
        for(i=0;i<declarator.n;i++){
                ff_array[ff_index]=(struct friend_function*)malloc(sizeof(struct friend_function));
                ff_array[ff_index]->class_name=malloc(strlen(class_name)+1);
                strcpy(ff_array[ff_index]->class_name,class_name);
                k=strlen(declarator.type);
                p=strlen(declarator.pointer_operator[i]);
                ff_array[ff_index]->return_type=malloc(k+p+1);
```

```
            strcpy(ff_array[ff_index]->return_type,declarator.type);
            strcat(ff_array[ff_index]->return_type,declarator.pointer_operator[i]);
            l=strlen(declarator.declarator[i]);
            ff_array[ff_index]->function_name=malloc(l+1);
            strcpy(ff_array[ff_index]->function_name,declarator.declarator[i]);
            allocate_argument_type(&(ff_array[ff_index]->arg));
            exact_alloc_copy_atval(&(ff_array[ff_index]->arg),declarator.arguments);
            ff_index++;
        }
end_of_update_friend: ;
} inline_method(method_name,s)
char* method_name;
char* s;
{
int i;
        if(in_string("::",method_name)){
                for(i=0;i<strlen(method_name);i++){
                        if(method_name[i]!=':'){
                                s[i]=method_name[i];
                        }else{
                                s[i]=0;
                                return 1;
                        }
                }
        }
        return 0;
} get_bca_i(s)
char* s;
{
int i;
        for(i=bca_index-1;i>=0;i--){
                if(strcmp(base_class_array[i]->class_name,s)==0)
                        return i;
        }
        return -1;
} put_include(i)
int i;
{
char super_classes[20][50];
int sc_count=0;
int tempi=0;

if(i<0){
                printf("put_include error\n");
                return;
        }
```

```
        sc_count=0;
        break_parts_comma(base_class_array[i]->base_name,&sc_count,super_classes);
        if(strcmp(super_classes[0],"nobase")==0)return;
        else{
                for(tempi=0;tempi<sc_count;tempi++){
                        put_include(get_bca_i(super_classes[tempi]));
                }
        }
    }
} update_g_bc_ptr(class_name,base_name,is_abs)
char* class_name;
char* base_name;
int is_abs;
{
        strcpy(g_bc_ptr->class_name,class_name);
        strcpy(g_bc_ptr->base_name,base_name);
        g_bc_ptr->is_abstract = is_abs;
        g_bc_ptr = 0;
}
```

```
/*
Copyright (c) 1990, Singapore Computer Systems Pte Ptd definition include file for main module of CLASS SCANNER
*/
#ifndef SCANNER
#define SCANNER
#include "symbol_entry.h"

define MAXARG 50
#define MAXMETHOD 7000
#define MAXATTRIBUTE 2000
#define MAXTYPE 2000
#define MAXDECLARATOR 500
define MAXFF 500 define KINDCLASS 0
define KINDTYPEDEF 1
#define KINDENUM 2
define MAXTABLE 113 define PRIVATE_M 0
define PROTECTED_M 1
define PUBLIC_M 2 struct class_list{ /* need this to handle nested class */
        int class_key_class;
        char class_name[80];
        struct class_list *next;
};

struct base_class{
        char class_name[50];
        /* if class_name is an actual class, base_name contains its base classes
separated by commas;
           if class_name is a basic type A, base_name contains a list of basic
           types that type A can be automatically converted to */
        char base_name[150];
        int is_abstract;
};

struct argument_type{
        char *arg[MAXARG];
        int count;
        /* -1 if arg consists of ... only; if arg_list has arguments followed
            by ..., then count contains the number of arguments */
        int variable_arg;
};
```

```c
struct friend_function{
        char* class_name;
        char* return_type;
        char* function_name;
        struct argument_type * arg;
};

/****************************************************************
 *   data structure to store methods and attributes info        *
 ****************************************************************/
struct method_info{
        struct base_class* bc_ptr;
        char* method_name;
        char* return_type;
        struct argument_type* method_arguments;
        char extra; /* extra methods generated without default args */
        char access_spec;
        /*
        struct superclass_type* superclass;
        */
};

struct attr_info{
        struct base_class* bc_ptr;
        char* attr_name;
        char* attr_type;
        char access_spec;
};

/*****************************
 *       can_cast_array      *
 *****************************/
struct can_cast_type{
        char* from;
        char* to;
        char constructor_cast; /* c for construct t for cast */
};

struct method_or_attribute{
        char type[MAXTYPE];
        char** pointer_operator;
        char** declarator;
        int n; /* number of operator */
        char meth_or_att; /* m for method a for attribute */
        struct argument_type* arguments;
        int* function_pointer; /* array of int 1 if function ptr 0 otherwise */
};

#endif
```

```
/*
```

Copyright (c) 1990, Singapore Computer Systems Pte Ltd

> main module for CLASS SCANNER.
>
> read user's include file search options and
> list of .h files.
>
> concatenate .h files together and preprocess it
> using C++ translator.
>
> create an expanded .h file using program
> create_exp_ifile.
>
> using the parser of the CLASS SCANNER to
> extract information of the classes defined
> in the .h files.
>
> produce the class information file ma_list.
>
> generate Object Manipulation Functions for
> each class seen by the parser.
>
> Note: The current version generate Object
> Manipulation Functions for Versant's
> C++ library for persistence objects
> as well as ordinary C++ objects.

```
*/
#include <stdio.h>
#include "scanner.h"
#include <fcntl.h>
/*************************
 *      globals          *
 *************************/
int p;

FILE* koofp;
FILE* statep;
FILE* constp;

ENTRY * entry_array[5000];
int entry_array_index=0;

struct friend_function *ff_array[MAXFF];
int ff_index = 0;

char* basic_types[30];
int bt_index=0;
```

```c
char* classes_scanned[MAXTYPE];
int cs_index = 0;

int methods_generated=0; /* incremented in create_call_method */
int attr_generated=0; /* incremented in create_get_attribute */
int classes_seen=0;
int classes_generated=0;

struct method_info* method_info_array[MAXMETHOD];
int mia_index=0;
struct attr_info* attr_info_array[MAXATTRIBUTE];
int aia_index=0;

struct base_class * base_class_array[MAXATTRIBUTE];
/* base_class_array contains all possible types with infomation regarding base
classes and abstract classes */
int bca_index=0;

struct can_cast_type* cast_operator_array[MAXMETHOD];
struct can_cast_type* one_arg_constructor[MAXMETHOD];
int coa_index=0;
int oac_index=0;

struct can_cast_type* integral_promotion_array[MAXMETHOD];
int ip_index=0;

struct can_cast_type* standard_conversions_array[MAXMETHOD];
int sc_index=0;

char I[100][100]; /* to store search path */
int I_index=0;
char D[100][100]; /* to store -D defines */
int D_index=0;

extern yyparse();
extern char yytext[];

main(argc,argv)
int argc;
char* argv[];
{
        FILE *pp;

koofp = fopen("koo","w");
        statep = fopen("koo3","w");
        constp = fopen("constant","w");

system("mkdir scanh_dir > /dev/null");
        system("rm -f -r temp_scanh_dir > /dev/null");
        system("rm -r -f temp_scanh_dir1 > /dev/null");
        system("mkdir temp_scanh_dir > /dev/null");
        system("mkdir temp_scanh_dir1 > /dev/null");
```

```
            CC_with_minus_E(argc,argv);
            /* file to scan is file.scanh */ system("cp file.scanh expanded_ifilet");
            system("create_exp_ifile expanded_ifilet");
            system("cp expanded_ifile scanh_dir/expanded_ifile.h");
            pp = fopen("scanh_dir/error_c.h","w");
            fputs("#define    ATTR_FUNCTION_PTR    -100\n\
#define   ABSTRACT_CLASS           -101\n\
#define   CONSTRUCTOR_ABS          -102\n\
#define   DESTRUCTOR_ABS           -103\n\
#define   UNKNOWN_ARG_TYPE         -104\n\
#define   UNKNOWN_RET_TYPE         -105\n\
#define RETURN_ABS                 -106\n\
#define   VOID_ASSIGN              -107\n\
#define   NO_METHOD                -108\n\
#define   NO_ATTR                  -109\n\
#define   PERSISTENT_NDFP          -110\n\
#define   ARRAY_ABS                -111\n\
#define   NO_CONSTRUCTOR_WO_ARG   -112\n\
#define   D_TO_B_CAST_FAILED       -113\n\
#define   PERSISTENT_ABS           -114\n\
#define CLASS_NOT_FOUND            -115\n\
#define METHOD_NOT_FOUND           -116\n\
#define ATTR_NOT_FOUND             -117\n\
#define PRIVATE_MEMBER             -118\n\
#define NO_G_PCLASS_PTR            -119\n\n",pp);
            fclose(pp);

p = open("file.scanh",O_RDONLY);
            printf("scanning file.scanh\n");
            store_basic_types_in_base_class_array();
            yyparse();
            printf("number of methods seen : %d\n",mia_index);
            printf("number of attributes seen : %d\n",aia_index);
            printf("number of classes seen : %d\n",classes_seen);

update_ma_list(); /* cast_array */
            remove_all_subscripts_comment();
            create_dot_cxx();
            create_DT2_dot_cxx();
            create_extern_dot_h();
            mv_dot_cxx_to_scanh_dir();
            /*
            mv_vs_to_scanh_dir();
            */
            close(p);
            fclose(koofp);
            fclose(statep);
            fclose(constp);
            printf("number of methods generated : %d\n",methods_generated);
            printf("number of attributes generated : %d\n",attr_generated);
```

```
                printf("number of classes generated : %d\n",classes_generated);
                printf("%c%c%c%c%c",7,7,7,7,7);
                printf("done\n");
} yyerror(s)
char* s;
{
                printf("\n%s\n",s);
        printf("error yytext = %s\n",yytext);
} yywrap()
{
        printf("bye\n");
        return(1);
} create_DT2_dot_cxx()
{
FILE* maccfp;

maccfp = fopen("scanh_dir/DT2.cxx","w");
                fputs("#ifndef GENERAL\n",maccfp);
                fputs("#define GENERAL\n",maccfp);
                fputs("#include \"error_c.h\"\n",maccfp);
                fputs("#include \"expanded_ifile.h\"\n",maccfp);
                fputs("#include \"value_struct.h\"\n",maccfp);

create_extern(maccfp);
                create_integral_promotion_matrix(maccfp);
                create_assignx(maccfp);
                create_bt_assign_functions(maccfp);
                create_persistentx(maccfp);
                create_arrayx(maccfp);
                create_global_pClass_table(maccfp);
                create_equalx(maccfp);
                create_bt_equal_functions(maccfp);

fputs("#endif\n",maccfp);
                fclose(maccfp);
} store_basic_types_in_base_class_array()
{
int i;
                store_basic_types();
                for(i=0;i<bt_index;i++){
                                allocate_copy_struct_base_class(base_class_array,basic_types[i],&bca_index);
                }
}
```

```
remove_all_subscripts_comment()
{
        int i;
        char buff[100];

for(i=0;i<aia_index;i++){
                strcpy(buff,attr_info_array[i]->attr_name);
                strcpy(attr_info_array[i]->attr_name,remove_array_subscripts_comment(buff));
        }
}

CC_with_minus_E(argc,argv)
int argc;
char* argv[];
{
char charbuf[1000];
char charbuf2[1000];
        char unique_file_name1[200];
        char temp3[200];
        char H[10000];
        FILE* fptr;
        char C[1000];
        int numfiles,i;
        char* remove_string();

fptr = fopen("viragotemp3.cxx","w");
        for(numfiles = 1;numfiles < argc; numfiles++){
                if(argv[numfiles][0] == '-'){
                        if(argv[numfiles][1] == 'I'){
                                strcpy(I[I_index++],argv[numfiles]);
                        }else if(argv[numfiles][1] == 'D'){
                                strcpy(D[D_index++],argv[numfiles]);
                        }else{
                                printf("error : unknown flag -%c\n",argv[numfiles][1]);
                        }
                }else{
                        fputs("#include \"",fptr);
                        fputs(argv[numfiles],fptr);
                        fputs("\"\n",fptr);
                }
        }
        fclose(fptr);
        strcpy(temp3,"viragotemp3.cxx");
strcpy(C,"CC -E ");
for(i=0;i<I_index;i++){
    strcat(C,I[i]);
    strcat(C," ");
}
for(i=0;i<D_index;i++){
```

```
            strcat(C,D[i]);
            strcat(C," ");
    }
    strcat(C,temp3);
    strcat(C," > file.scanh");
        printf(C);
    system(C);
        printf("\ndone --> %s\n",C);
} char* get_subscripts(s)
char* s;
{
    int i;
    static char rs[100];
    int rsi=0;

for(i=strlen("/*array_subscript\#")+1;i<strlen(s);i++){
        if(s[i]!='\#'){
            rs[rsi++]=s[i];
        }else{
            rs[rsi]=0;
            break;
        }
    }
    return rs;
} get_array_type(type,subscripts) /* for every pair of [] delete a * from type */
char* type;
char* subscripts;
{
        int count=0;
        int i;

for(i=0;i<strlen(subscripts);i++){
                if(subscripts[i]=='[')count++;
        }
        type[strlen(type)-count]=0;
} get_array_subscripts(type,declarator)
char* type;
char* declarator;
{
    char temp[100];
    char subscripts[100];

if(strncmp(declarator,"/*array_subscripts",strlen("/*array_subscripts"))==0){
        strcpy(subscripts,get_subscripts(declarator));
        get_array_type(type,subscripts);
            strcpy(temp,remove_array_subscripts_comment(declarator));
            strcpy(declarator,temp);
```

```
                    strcat(declarator,subscripts);
            }
} char* remove_string();
write_attr_info_array(file_name)
char* file_name;
{
FILE *ptr;
char temp[100];
char declarator_temp[100];
int i;

ptr = fopen(file_name,"w");
/* class attributes */
        for(i=0;i<aia_index;i++){
                fputs(attr_info_array[i]->bc_ptr->class_name,ptr);
                fputs(",",ptr);
        switch(attr_info_array[i]->access_spec)
            {
            case PRIVATE_M:
                {
                    fputs("private,",ptr);
                    break;
                }
            case PROTECTED_M:
                {
                    fputs("protected,",ptr);
                    break;
                }
            case PUBLIC_M:
                {
                    fputs("public,",ptr);
                    break;
                }
            default:
                {
                    fputs(",",ptr);
                    break;
                }
            }
            if(strncmp(attr_info_array[i]->attr_name,"/*function_pointer*/",20)==0){
                strcpy(temp,remove_string("/*function_pointer*/",attr_info_array[i]->attr
ame));
                fputs(temp,ptr);
                fputs(",",ptr);
                fputs(attr_info_array[i]->attr_type,ptr);
                fputs("\n",ptr);
            }else{
                strcpy(temp,attr_info_array[i]->attr_type);
                strcpy(declarator_temp,attr_info_array[i]->attr_name);
                get_array_subscripts(temp,declarator_temp);
                fputs(declarator_temp,ptr);
```

```c
                                fputs(",",ptr);
                                fputs(temp,ptr);
                                fputs("\n",ptr);
                }
        }
        fclose(ptr);
} write_base_class_array(file_name)
char* file_name;
{
int i;
FILE* ptr;
/* class, base */
        ptr = fopen(file_name,"a");
        for(i=bt_index;i<bca_index;i++){
                fputs(base_class_array[i]->class_name,ptr);
                if(strcmp(base_class_array[i]->base_name,"nobase")!=0){
                        fputs(",",ptr);
                        fputs(base_class_array[i]->base_name,ptr);
                }
                fputs("\n",ptr);
        }
        fclose(ptr);
} write_method_info_array(file_name)
char* file_name;
{
int len;
int i,j,k;
char temp[100];
FILE* ptr;

/* class methods */
        ptr = fopen(file_name,"a");
        for(i=0;i<mia_index;i++){
                fputs(method_info_array[i]->bc_ptr->class_name,ptr);
                fputs(",",ptr);
                switch(method_info_array[i]->access_spec)
                {
                        case PRIVATE_M:
                        {
                                fputs("private,",ptr);
                                break;
                        }
                        case PROTECTED_M:
                        {
                                fputs("protected,",ptr);
                                break;
                        }
                        case PUBLIC_M:
                        {
```

```
                                fputs("public,",ptr);
                                break;
                        }
                default:
                        {
                                fputs(",",ptr);
                                break;
                        }
                }
                strcpy(temp,remove_string("conversion_type_name",method_info_array[i]->meth
d_name));
                if (method_info_array[i]->extra) strcat(temp,"\005");
        fputs(temp,ptr);
        fputs(",",ptr);
        fputs(method_info_array[i]->return_type,ptr);
        fputs(",",ptr);
                for(j=0;j<method_info_array[i]->method_arguments->count;j++){
                        len=strlen(method_info_array[i]->method_arguments->arg[j]);
                        if(method_info_array[i]->method_arguments->arg[j][len-1]=='$'){
                                method_info_array[i]->method_arguments->arg[j][len-1]=0;
                        }
                        if(strncmp(method_info_array[i]->method_arguments->arg[j],"/*functior
pointer*/",20)==0){
                                strcpy(temp,remove_string("/*function_pointer*/",method_inf
array[i]->method_arguments->arg[j]));
                                fputs(temp,ptr);
                        }else{
                                fputs(method_info_array[i]->method_arguments->arg[j],ptr);
                        }
                        for(k=0;k<len;k++){
                                if(method_info_array[i]->method_arguments->arg[j][k]=='=')n
thod_info_array[i]->method_arguments->arg[j][k]=0;
                        }
                        if(j<method_info_array[i]->method_arguments->count-1)fputs(",",ptr);
                }
                if(method_info_array[i]->method_arguments->variable_arg){
                        fputs(",...",ptr);
                }
        fputs("\n",ptr);
        }
        fclose(ptr);
} append_double_percent(file_name)
char* file_name;
{
FILE* ptr;

ptr = fopen(file_name,"a");
        fputs("%%\n",ptr);
        fclose(ptr);
}
```

```
create_ma_list() /* can_cast_array */
{
        write_attr_info_array("scanh_dir/ma_list");
        append_double_percent("scanh_dir/ma_list");
        write_base_class_array("scanh_dir/ma_list");
        append_double_percent("scanh_dir/ma_list");
        write_method_info_array("scanh_dir/ma_list");
} store_cast_info()
{
int i;
char temp[100];

for(i=0;i<mia_index;i++){
                if(is_conversion_type_name(method_info_array[i]->method_name,temp)){
                        cast_operator_array[coa_index]=(struct can_cast_type*)malloc(sizeof(
struct can_cast_type));
                        cast_operator_array[coa_index]->from=(char*)malloc(strlen(method_info
_array[i]->bc_ptr->class_name)+1);
                        cast_operator_array[coa_index]->to=(char*)malloc(strlen(temp)+1);
                        strcpy(cast_operator_array[coa_index]->from,method_info_array[i]->bc_
ptr->class_name);
                        strcpy(cast_operator_array[coa_index]->to,temp);
                        coa_index++;
                }
                if((is_constructor(i))&&
                   (method_info_array[i]->method_arguments->count==1)){
                        strcpy(temp,method_info_array[i]->method_arguments->arg[0]);
                        pure_type(temp);
                        one_arg_constructor[oac_index]=(struct can_cast_type*)malloc(sizeof(st
ruct can_cast_type));
                        one_arg_constructor[oac_index]->from=(char*)malloc(strlen(temp)+1);
                        one_arg_constructor[oac_index]->to=(char*)malloc(strlen(method_info_a
rray[i]->bc_ptr->class_name)+1);
                        strcpy(one_arg_constructor[oac_index]->from,temp);
                        strcpy(one_arg_constructor[oac_index]->to,method_info_array[i]->bc_ptr
->class_name);
                        if(strcmp(one_arg_constructor[oac_index]->from,one_arg_constructor[oa
c_index]->to)==0){
                                free(one_arg_constructor[oac_index]->from);
                                one_arg_constructor[oac_index]->from=0;
                                free(one_arg_constructor[oac_index]->to);
                                one_arg_constructor[oac_index]->to=0;
                        }else{
                                oac_index++;
                        }

}
        }
} read_line(fptr,ma_list_line,mll_index)
```

```c
FILE** fptr;
char ma_list_line[MAXMETHOD][500];
int *mll_index;
{
char* s;
        while(!feof(*fptr)){
                s = fgets(ma_list_line[*mll_index],500,*fptr);
                if(s==NULL)return;
                if(strncmp(s,"%%",2)==0)return;
                (*mll_index)++;
        }
} char* get_first_word(line)
char* line;
{
static char rt[100];
char* cptr;
int i=0;

cptr = line;
        while((*cptr!=',')&&(*cptr!='\n'))
        {
                rt[i++]=*cptr;
                cptr++;
        }
        rt[i]=0;
        return rt;
} in_base_class_array(s)
char* s;
{
int i;
        for(i=0;i<bca_index;i++){
                if(strcmp(s,base_class_array[i]->class_name)==0)return 1;
        }
        return 0;
} write_attributes(ma_list_line,mll_index)
char ma_list_line[MAXMETHOD][500];
int mll_index;
{
FILE* ptr;
int i=0;
char class_name[100];

write_attr_info_array("scanh_dir/temp_ma_list");
        ptr = fopen("scanh_dir/temp_ma_list","a");
        for(i=0;i<mll_index;i++){
                strcpy(class_name,get_first_word(ma_list_line[i]));
```

```c
                if(lin_base_class_array(class_name)){
                        fputs(ma_list_line[i],ptr);
                }
        }
        fclose(ptr);
        append_double_percent("scanh_dir/temp_ma_list");
} write_classes(ma_list_line,mll_index)
char ma_list_line[MAXMETHOD][500];
int mll_index;
{
FILE* ptr;
int i=0;
char class_name[100];
        write_base_class_array("scanh_dir/temp_ma_list");
        ptr = fopen("scanh_dir/temp_ma_list","a");
        for(i=0;i<mll_index;i++){
                strcpy(class_name,get_first_word(ma_list_line[i]));
                if(lin_base_class_array(class_name)){
                        fputs(ma_list_line[i],ptr);
                }
        }
        fclose(ptr);
        append_double_percent("scanh_dir/temp_ma_list");
} write_methods(ma_list_line,mll_index)
char ma_list_line[MAXMETHOD][500];
int mll_index;
{
FILE* ptr;
int i;
char class_name[100];
        write_method_info_array("scanh_dir/temp_ma_list");
        ptr = fopen("scanh_dir/temp_ma_list","a");
        for(i=0;i<mll_index;i++){
                strcpy(class_name,get_first_word(ma_list_line[i]));
                if(lin_base_class_array(class_name)){
                        fputs(ma_list_line[i],ptr);
                }
        }
        fclose(ptr);
} file_exist();
update_ma_list()
{
FILE* maptr;
char ma_list_line[MAXMETHOD][500];
int mll_index;

if(file_exist("scanh_dir/ma_list"))
```

```
        {
                maptr = fopen("scanh_dir/ma_list","r");
                mll_index = 0;
                read_line(&maptr,ma_list_line,&mll_index); /* attributes */
                write_attributes(ma_list_line,mll_index);
                mll_index = 0;
                read_line(&maptr,ma_list_line,&mll_index); /* classes */
                write_classes(ma_list_line,mll_index);
                mll_index = 0;
                read_line(&maptr,ma_list_line,&mll_index); /* methods */
                write_methods(ma_list_line,mll_index);
                fclose(maptr);
                system("mv scanh_dir/temp_ma_list scanh_dir/ma_list");
        }else{
                create_ma_list();
        }
} replace_space_underscore(s)
char* s;
{
        int i;
        for(i=0;i<strlen(s);i++){
                if(s[i]==' ')s[i]='_';
        }
} replace_aster_underscore(s)
char* s;
{
        int i;
        for(i=0;i<strlen(s);i++){
                if((s[i]=='*')||(s[i]=='&'))s[i]='_';
        }
} allocate_copy(a,b,i)
char** a;
char* b;
int *i;
{
        a[*i]=(char*)malloc(strlen(b)+1);
        strcpy(a[(*i)++],b);
} allocate_copy_struct_base_class(a,b,i)
struct base_class** a;
char* b;
int *i;
{
    a[*i]=(struct base_class*)malloc(sizeof(struct base_class));
    a[*i]->is_abstract=0;
        if(strcmp(b,"void")==0)
```

```
                strcpy(a[(*i)]->base_name,"");
        else if(strcmp(b,"int")==0)
                strcpy(a[(*i)]->base_name,"long,unsigned,unsigned int");
        else if(strcmp(b,"long")==0)
                strcpy(a[(*i)]->base_name,"float,unsigned long");
        else if(strcmp(b,"short")==0)
                strcpy(a[(*i)]->base_name,"int,unsigned short");
        else if(strcmp(b,"char")==0)
                strcpy(a[(*i)]->base_name,"short,int,unsigned char");
        else if(strcmp(b,"float")==0)
                strcpy(a[(*i)]->base_name,"double");
        else if(strcmp(b,"double")==0)
                strcpy(a[(*i)]->base_name,"");
        else if(strcmp(b,"unsigned")==0)
                strcpy(a[(*i)]->base_name,"unsigned long");
        else if(strcmp(b,"unsigned int")==0)
                strcpy(a[(*i)]->base_name,"unsigned long");
        else if(strcmp(b,"unsigned long")==0)
                strcpy(a[(*i)]->base_name,"float");
        else if(strcmp(b,"unsigned short")==0)
                strcpy(a[(*i)]->base_name,"unsigned,unsigned int");
        else if(strcmp(b,"unsigned char")==0)
                strcpy(a[(*i)]->base_name,"unsigned short,unsigned,unsigned int");
        strcpy(a[(*i)++]->class_name,b);
} store_basic_types(){
        /* always store void in first element of array; and start loop with
           i = 1 to prevent generating code like sizeof(void) */
        allocate_copy(basic_types,"void",&bt_index);
        allocate_copy(basic_types,"int",&bt_index);
        allocate_copy(basic_types,"long",&bt_index);
        allocate_copy(basic_types,"short",&bt_index);
        allocate_copy(basic_types,"char",&bt_index);
        allocate_copy(basic_types,"float",&bt_index);
        allocate_copy(basic_types,"double",&bt_index);
        allocate_copy(basic_types,"unsigned int",&bt_index);
        allocate_copy(basic_types,"unsigned long",&bt_index);
        allocate_copy(basic_types,"unsigned short",&bt_index);
        allocate_copy(basic_types,"unsigned char",&bt_index);
        allocate_copy(basic_types,"unsigned",&bt_index);
}
create_value_struct_hh()
{
FILE* vsfp;
        int i,j;
        char var[100];
        char type[100];

vsfp = fopen("temp_scanh_dir1/value_struct.h","w");
fputs("#ifndef VALUE_STRUCT\n",vsfp);
fputs("#define VALUE_STRUCT\n",vsfp);
for(i=bt_index;i<bca_index;i++){  /* first bt_index types are basic types */
```

```
            fputs("class ",vsfp);
            fputs(base_class_array[i]->class_name,vsfp);
            fputs(";\n",vsfp);
    } fputs("\n\nstruct value_struct {\n",vsfp);
    fputs("\tint type;\n",vsfp);
    fputs("\tint flag;\n",vsfp);
    fputs("\tunion {\n",vsfp);
    for(i=0;i<bca_index;i++){
        strcpy(var,base_class_array[i]->class_name);
        strcpy(type,base_class_array[i]->class_name);
        for(j=0;j<3;j++){
            fputs("\t\t",vsfp);
            fputs(type,vsfp);
            switch(j){
                case 0 : fputs("* V",vsfp);
                    break;
                case 1 : fputs("** V1",vsfp);
                    break;
                case 2 : fputs("*** V2",vsfp);
                    break;
            }
            replace_space_underscore(var);
            replace_aster_underscore(var);
            fputs(var,vsfp);
            if(base_class_array[i]->is_abstract){
                fputs("/* abstract class */",vsfp);
            }
            fputs(";\n",vsfp);
        }
    }
    fputs("\t};\n",vsfp);
    fputs("};\n",vsfp);
    fputs("void method_malloc(int,int);\n",vsfp);
    fputs("void value_struct_malloc(int);\n",vsfp);
    fputs("void free_global_arg();\n",vsfp);
    fputs("extern struct value_struct* global_return_value;\n",vsfp);
    fputs("extern struct value_struct** global_arguments;\n",vsfp);
    fputs("extern void* global_objectptr;\n",vsfp);
    fputs("\nextern char* get_type(int);\n",vsfp);
    fputs("\nextern char* get_class(int);\n",vsfp);
    fputs("\nextern int get_typei(char*);\n",vsfp);
    fputs("\nextern char all_types[][30];\n",vsfp);
    fputs("\nextern int all_index;\n",vsfp);
    fputs("\nextern \"C\" {char* malloc(unsigned int);}\n",vsfp);
    fputs("\nextern \"C\" {void free(char*);}\n",vsfp);
    fputs("#endif\n",vsfp);
} int search_all_types(s)  /* return a -1 if type is not found */
char* s;
```

```c
{
    static int i;
    for(i=0;i<bca_index;i++){
        if(strcmp(s,base_class_array[i]->class_name)==0){
            return i;
        }
    }
    return (-1);
} char* remove_string(rs,s)    /* remove string rs from s */
char *rs;
char *s;
{
    int rsi, si, i, j=0, k=0;
    static char rstring[1000];
    char* t;

t=s;
    rsi=strlen(rs);
    si=strlen(s);
    for(i=0;i<si;i++){
        if(*t==rs[0]){
            if(strncmp(t,rs,rsi)==0){
                for(j=0;j<rsi;j++)t++;
            }
        }
        rstring[k++]=*t;
        t++;
    }
    rstring[k]=0;
    return rstring;
} remove_blanks(s)
char* s;
{
    int i,j,b=0;
    char buff[1000];

j=strlen(s);
    for(i=0;i<j;i++){
        if(s[i]!=' ') buff[b++]=s[i];
    }
    buff[b]=0;
    strcpy(s,buff);
} int get_typei(s)
char * s;
{
    int i;
    char temp1[100];
```

```
        char temp2[20];

temp1[0]=0;
        temp2[0]=0;
    sscanf(s,"%[^\"] %s",temp1,temp2);
    i = search_all_types(temp1);
        if(i==(-1))
                return(-1);
        else
                return(i*3+strlen(temp2));
} char *get_var(typei)
int typei;
{
    int i;
    int j;
    static char type[100];
    char buffer[100];
    i = typei / 3;
    j = typei % 3;
    strcpy(type,"V");
    if(j!=0){
        sprintf(buffer,"%d",j);
        strcat(type,buffer);
    }
    strcat(type,base_class_array[i]->class_name);
        replace_space_underscore(type);
    return type;
} char *get_type(typei)
int typei;
{
    int i;
    int j;
    int k;
    static char type[100];
    i = typei / 3;
    j = typei % 3;
    strcpy(type,base_class_array[i]->class_name);
    for(k=0;k<j;k++)
        strcat(type,"*");
    return type;
} attr_is_array(s)
char *s;
{
        int i=0;

for(i=0;i<strlen(s);i++){
                if(s[i]=='[') return 1;
```

```
            }
            return 0;
} int attr_is_const(s)
char* s;
{
    char* t;
    t = s;
    while(*t != 0){
        if(*t=='c'){
            if(strncmp(t,"const",5)==0){
                return (1);
            }
        }
        t++;
    }
    return (0);
} remove_ampersand(s)
char* s;
{
int i,j=0;
char buff[100];
int ampersand_seen = 0;

for(i=0;i<strlen(s);i++){
            if(s[i]!='&'){
                    buff[j++]=s[i];
            }else{
                    ampersand_seen = 1;
            }
        }
        buff[j]=0;
        strcpy(s,buff);
        return ampersand_seen;
} void remove_init(s)
char* s;
{
int i;
    for(i=0;i<strlen(s);i++){
        if(s[i]=='='){
            s[i]=0;
            break;
        }
    }
} pure_type(s)   /* changes the string passed in */
char *s;
```

```
{
char temp1[100];
char temp3[100];
int j=0;
int ampersand_seen=0;

strcpy(temp3,remove_string("const ",s));
        strcpy(temp1,remove_string("auto ",temp3));
        strcpy(temp3,remove_string("register ",temp1));
        strcpy(temp1,remove_string("static ",temp3));
        strcpy(temp3,remove_string("extern ",temp1));
        strcpy(temp1,remove_string("const",temp3));
        strcpy(temp3,remove_string("auto",temp1));
        strcpy(temp1,remove_string("register",temp3));
        strcpy(temp3,remove_string("static",temp1));
        strcpy(temp1,remove_string("extern",temp3));
        strcpy(temp3,remove_string("inline ",temp1));
        strcpy(temp1,remove_string("virtual ",temp3));
        strcpy(temp3,remove_string("friend ",temp1));
        strcpy(temp1,remove_string("inline",temp3));
        strcpy(temp3,remove_string("virtual",temp1));
        strcpy(temp1,remove_string("friend",temp3));
        remove_init(temp1);
        if(remove_ampersand(temp1))ampersand_seen=1;
        if(strcmp(temp1,"")==0){
                strcpy(s,"int");
        }else{
                for(j=strlen(temp1)-1;j>=0;j--){ /* remove trailing blanks */
                        if(temp1[j]==' ')temp1[j]=0;
                        else break;
                }
                strcpy(s,temp1);
        }
        return ampersand_seen;
} remove_subscripts(s)
char* s;
{
        int i;

for(i=0;i<strlen(s);i++){
                if(s[i]=='['){
                        s[i]='\0';
                        break;
                }
        }
} file_exist(file_name)
char* file_name;
```

```
{
FILE* fptr;
        fptr = fopen(file_name,"r");
        fclose(fptr);
        if(fptr == 0)return 0;
        return 1;
} is_different(file1,file2)
char* file1;
char* file2;
{
char command[100];
int exit_status;
        strcpy(command,"diff ");
        strcat(command,file1);
        strcat(command," ");
        strcat(command,file2);
        strcat(command," > /dev/null");
        exit_status = system(command);
        if(exit_status)printf("\t%s %s are different\n",file1,file2);
        return exit_status; /* exit status is 0 if 2 files by diff is equal */
} copy_h_to_cxx(s1,s2)
char* s1;
char* s2;
{
char command[100];
        strcpy(command,"cp ");
        strcat(command,s1);
        strcat(command," ");
        strcat(command,s2);
        system(command);
        /* chmod copied file to 666 */
        strcpy(command,"chmod 666 ");
        strcat(command,s2);
        system(command);
} create_expanded_dot_h(file_name_no_path,file_name_with_path)
char* file_name_no_path;
char* file_name_with_path;
{
char scanh_dir_file[100];
char temp_scanh_dir_file[100];
char temp_scanh_dir_temp_file[100];
char temp_scanh_dir_dot_cxx[100];
int lexi;
char system_com[300];

strcpy(scanh_dir_file,"scanh_dir/expanded_");
```

```
            strcat(scanh_dir_file,file_name_no_path);

strcpy(temp_scanh_dir_temp_file,"temp_scanh_dir/expanded_");
            strcat(temp_scanh_dir_temp_file,file_name_no_path);
            strcat(temp_scanh_dir_temp_file,"t");

strcpy(temp_scanh_dir_file,"temp_scanh_dir/expanded_");
            strcat(temp_scanh_dir_file,file_name_no_path);

strcpy(temp_scanh_dir_dot_cxx,temp_scanh_dir_file);
            strcat(temp_scanh_dir_dot_cxx,".cxx");

if(!file_exist(temp_scanh_dir_dot_cxx)){
                    printf("creating expanded_%s",file_name_no_path);
                    copy_h_to_cxx(file_name_with_path,temp_scanh_dir_dot_cxx);
                    strcpy(system_com,"CC -E ");
                    for(lexi=0;lexi<I_index;lexi++){
                            strcat(system_com,I[lexi]);
                            strcat(system_com," ");
                    }
                    for(lexi=0;lexi<D_index;lexi++){
                            strcat(system_com,D[lexi]);
                            strcat(system_com," ");
                    }
                    strcat(system_com,temp_scanh_dir_dot_cxx);
                    strcat(system_com," > ");
                    strcat(system_com,temp_scanh_dir_temp_file);
                    system(system_com);

strcpy(system_com,"create_exp_ifile ");
                    strcat(system_com,temp_scanh_dir_temp_file);
                    system(system_com);
                    if((!file_exist(scanh_dir_file))||(is_different(scanh_dir_file,temp_scanh_dir_file))){
                            strcpy(system_com,"mv temp_scanh_dir/expanded_");
                            strcat(system_com,file_name_no_path);
                            strcat(system_com," ");
                            strcat(system_com,scanh_dir_file);
                            system(system_com);
                    }
            }
    }

} char* remove_agg_and_stuff(cn)
char* cn;
{
        if(in_string("_agg",cn)){
                return (remove_string("_agg",cn));
        }else if(in_string("_link_vstr",cn)){
/* order of the following 2 statements matters */
                return (remove_string("_link_vstr",cn));
        }else if(in_string("_link",cn)){
```

```
                    return (remove_string("_link",cn));
            }
        return cn;
} open_file(i,cn,cnm,j,lmaccfp,mode,s1,sw)
int i;
char* cn,*cnm;
int* j;
FILE** lmaccfp;
char* mode;
char* s1;
int sw;
{
char file_name[100];
char temp[100];
char file_name_no_path[100];
char file_name_with_path[100];
char buf[20];
int inc_flag=1;

sprintf(buf,"%d",50);
        if((i==0)||(strcmp(cn,cnm)!=0)){
                    strcpy(file_name,"temp_scanh_dir1/S_");
                    strcpy(temp,remove_agg_and_stuff(cn));
                    strcat(file_name,temp);
                    strcat(file_name,".cxx");
                    if(file_exist(file_name))inc_flag=0;
                    *lmaccfp=fopen(file_name,"a");
                    *j=0;
                    switch(sw){
                            case 0:
                                    break;
                            case 1:
                                    strcpy(s1,"struct value_struct* (*");
                                    strcat(s1,attr_info_array[i]->bc_ptr->class_name);
                                    strcat(s1,"attrfp[])() = {\n");
                                    break;
                            case 2:
                                    /*
                                    get_file_name_from_hash_table2(cn,file_name_no_path,file_name_with_path);
                                    create_expanded_dot_h(file_name_no_path,file_name_with_path);
                                    */
                                    if(inc_flag){
                                            fputs("#include \"expanded_ifile.h\"\n",*lmaccfp);
                                            fputs("#include \"error_c.h\"\n",*lmaccfp);
                                            fputs("#include \"extern.h\"\n",*lmaccfp);
                                            fputs("#include \"value_struct.h\"\n",*lmaccfp);
                                    }
                                    break;
                            case 3:
```

```
                    strcpy(s1,"struct value_struct* (*");
                        strcat(s1,method_info_array[i]->bc_ptr->class_name);
                        strcat(s1,"methodfp[])() = {\n");
                        break;
                case 5:
                        strcpy(s1,"struct value_struct* (*");
                        strcat(s1,method_info_array[i]->bc_ptr->class_name);
                        strcat(s1,"persistentfp[])() = {\n");
                        break;
                case 6:
                        strcpy(s1,"char ");
                        strcat(s1,method_info_array[i]->bc_ptr->class_name);
                        strcat(s1,"_cast_to[][");
                        strcat(s1,buf);
                        strcat(s1,"] = {\n");
                        break;
                case 7:
                        strcpy(s1,"char ");
                        strcat(s1,method_info_array[i]->bc_ptr->class_name);
                        strcat(s1,"_construct_from[][");
                        strcat(s1,buf);
                        strcat(s1,"] = {\n");
                        break;
            };
        }
} state_abstract_class(s,lptr)
char* s;
FILE* lptr;
{
        fputs("/* abstract class ",lptr);
        fputs(s,lptr);
        fputs(" */\n",lptr);
} create_attr_functions_contents(i,lptr)
int i;
FILE* lptr;
{
int typei;
char buff[100];
char type[100];
char temp1[100];
char temp2[10];
char temp3[100];
char buf[20];

state_class(attr_info_array[i]->bc_ptr->class_name,"",lptr);
        if(strncmp(attr_info_array[i]->attr_name,"/*function_pointer*/",20)==0){
                fputs("// ",lptr);
                fputs(attr_info_array[i]->attr_name,lptr);
                fputs("\n",lptr);
```

```
                        fputs("\treturn (struct value_struct*)ATTR_FUNCTION_PTR;\n",lptr);
                        goto end_of_attr_contents;
            }
            if(attr_info_array[i]->bc_ptr->is_abstract){
                        state_abstract_class(attr_info_array[i]->bc_ptr->class_name,lptr);
            }
            strcpy(temp1,attr_info_array[i]->attr_type);
            pure_type(temp1);
            fputs("\tvalue_struct_malloc(get_typei(\"",lptr);
            fputs(temp1,lptr);
            fputs("\"));\n",lptr);
            fputs("\tglobal_return_value->Vvoid = ",lptr);
            if(attr_is_const(attr_info_array[i]->attr_type)){
                        fputs("(void*)",lptr);
            }
            if(!attr_is_array(attr_info_array[i]->attr_name))
                        fputs("&",lptr);
            fputs("((",lptr);
            fputs(attr_info_array[i]->bc_ptr->class_name,lptr);
            fputs("*)",lptr);
            fputs("global_objectptr)->",lptr);
            if(attr_is_array(attr_info_array[i]->attr_name)){
                        strcpy(buff,attr_info_array[i]->attr_name);
                        remove_subscripts(buff);
                        fputs(buff,lptr);
            }else{
                        fputs(attr_info_array[i]->attr_name,lptr);
            }
            fputs(";\n",lptr);
            fputs("\treturn global_return_value;\n",lptr);
end_of_attr_contents: ; /* label may not immediately precede a closing right brace */
} create_attr_functions()
{
int i;
int j=0;
char buff[50];
FILE* lptr=0;
int last_entry;
char message[100];

for(i=0;i<aia_index;i++){
                        open_file(i,attr_info_array[i]->bc_ptr->class_name,i?attr_info_array[i-1]->bc_ptr->:
ass_name:"",&j,&lptr,"a","",0);
                        sprintf(buff,"%d",j++);
                        fputs("struct value_struct* ",lptr);
                        fputs(attr_info_array[i]->bc_ptr->class_name,lptr);
                        fputs("attr",lptr);
                        fputs(buff,lptr);
                        fputs("()\n",lptr);
                        fputs("{\n",lptr);
                        if(attr_info_array[i]->access_specl=PRIVATE_M){
```

```
                create_attr_functions_contents(i,lptr);
        }else{
                strcpy(message,"attribute ");
                strcat(message,attr_info_array[i]->attr_name);
                state_class(attr_info_array[i]->bc_ptr->class_name,message,lptr);
                fputs("\treturn (struct value_struct*)PRIVATE_MEMBER;\n",lptr);
        }
        fputs("}\n",lptr);
        last_entry=(i==(aia_index-1));
        close_file(lptr,0,last_entry,attr_info_array[i]->bc_ptr->class_name,last_entry?"":"a
_info_array[i+1]->bc_ptr->class_name,0,"");
        }
} create_pointers_to_attr_functions()
{
int i;
int j=0;
char s1[2000];
char buff[20];
FILE* lptr;
int last_entry;
        for(i=0;i<aia_index;i++){
                open_file(i,attr_info_array[i]->bc_ptr->class_name,i?attr_info_array[i-1]->bc_ptr->class_nai
:"",&j,&lptr,"a",s1,1);
                attr_generated++;
                sprintf(buff,"%d",j++);
                strcat(s1,attr_info_array[i]->bc_ptr->class_name);
                strcat(s1,"attr");
                strcat(s1,buff);
                strcat(s1,",");
                if((j+1)%8==0)strcat(s1,"\n");
                last_entry=(i==(aia_index-1));
                close_file(lptr,2,last_entry,attr_info_array[i]->bc_ptr->class_name,last_entry?"":attr_info_ar
y[i+1]->bc_ptr->class_name,j,s1);
        }
}
create_attr_set()
{
        create_attr_functions();
        create_pointers_to_attr_functions();
}

/* not used */
create_globals(fptr)
FILE* fptr;
{
char buf[20];
        fputs("//for both cases below value_struct must still be freed\n",fptr);
        fputs("const int FREE = 1; //free what union in value_struct is pointing to\n",fptr);
        fputs("const int FREENOT = 0;// don't free what union is pointing to\n",fptr);
        fputs("void* global_objectptr;\n",fptr);
        fputs("void* global_temp_objectptr;\n",fptr);
```

```
        fputs("int global_temp_arg_count;\n",fptr);
        fputs("int global_arg_count;\n",fptr);
        fputs("char *indirection,**indirection1,**indirection2;\n",fptr);
        fputs("char* assignptr;\n",fptr);
        fputs("struct value_struct* global_return_value;\n",fptr);
        fputs("struct value_struct* global_temp_arg0;\n",fptr);
        fputs("struct value_struct** global_arguments;\n",fptr);
        fputs("struct cast_info{\n",fptr);
        fputs("\tint type;\n",fptr);
        fputs("\tchar type_of_conversion;\n",fptr);
        fputs("// c=constructor t=cast i=integral promotion s=standard conversion e=exact match\n'
ptr);
        fputs("};\n",fptr);

/*
        fputs("int cca_index = ",fptr);
        sprintf(buf,"%d",cca_index);
        fputs(buf,fptr);
        fputs(";\n\n",fptr);
        */ fputs("int max_attribute = ",fptr);
        sprintf(buf,"%d",aia_index);
        fputs(buf,fptr);
        fputs(";\n\n",fptr);

fputs("int max_method = ",fptr);
        sprintf(buf,"%d",mia_index);
        fputs(buf,fptr);
        fputs(";\n\n",fptr);
} create_assign_functions_contents(i,lptr)
int i;
FILE* lptr;
{
char buffer[100];
char buf[20];

state_class(base_class_array[i]->class_name,"",lptr);
        if(base_class_array[i]->is_abstract){
                fputs("/* abstract class ",lptr);
                fputs(base_class_array[i]->class_name,lptr);
                fputs(" */\n",lptr);
                fputs("\tfree((char*)global_arguments);\n",lptr);
                fputs("return (struct value_struct*)ABSTRACT_CLASS;\n",lptr);
        }else{
            if(strcmp(base_class_array[i]->class_name,"void")!=0){
                strcpy(buffer,base_class_array[i]->class_name);
                fputs("\tmethod_malloc(get_sizeof(\"",lptr);
                fputs(buffer,lptr);
                fputs("\"),get_typei(\"",lptr);
                fputs(buffer,lptr);
```

```c
                fputs("\"));\n",lptr);
                fputs("\t",lptr); /* here static */
                fputs(base_class_array[i]->class_name,lptr);
                fputs(" udomchanachokG1",lptr);
                replace_space_underscore(buffer);
                replace_aster_underscore(buffer);
                fputs(buffer,lptr);
                fputs(" = *(global_arguments[0]->V",lptr);
                fputs(buffer,lptr);
                fputs(");\n",lptr);
                fputs("\tfree((char*)global_arguments);\n",lptr);
                fputs("\treturn global_return_value;\n",lptr);
        }else{
                fputs("/* type void */\n",lptr);
                fputs("\tfree((char*)global_arguments);\n",lptr);
                fputs("return (struct value_struct*)VOID_ASSIGN;\n",lptr);
        }
    }
end_of_assign_contents:;
} create_bt_assign_functions(maccfp)
FILE* maccfp;
{
int i;
char buffer[100];

for(i=0;i<bt_index;i++){
                strcpy(buffer,base_class_array[i]->class_name);
                replace_space_underscore(buffer);
                fputs("void* ",maccfp);
                fputs(buffer,maccfp);
                fputs("assign",maccfp);
                fputs("()\n",maccfp);
                fputs("{\n",maccfp);
                create_assign_functions_contents(i,maccfp);
                fputs("}\n",maccfp);
        }
} create_assign_functions()
{
int i;
char buffer[100];
char file_name[100];
FILE* lptr;

for(i=bt_index;i<bca_index;i++){
                strcpy(file_name,"temp_scanh_dir1/S_");
                strcat(file_name,remove_agg_and_stuff(base_class_array[i]->class_name));
                strcat(file_name,".cxx");
                lptr = fopen(file_name,"a");
                fputs("void* ",lptr);
```

```
                    fputs(base_class_array[i]->class_name,lptr);
                    fputs("assign",lptr);
                    fputs("()\n",lptr);
                    fputs("{\n",lptr);
                    create_assign_functions_contents(i,lptr);
                    fputs("}\n",lptr);
                    fclose(lptr);
        }
} create_assignx(maccfp)
FILE* maccfp;
{
        fputs("void* assignx()\n",maccfp);
        fputs("{\n",maccfp);
        fputs("\nfree((char*)global_arguments);\n",maccfp);
        fputs("\nreturn (void*)-1;\n",maccfp);
        fputs("}\n",maccfp);

} create_assign_set()
{
        create_assign_functions();
} is_constructor(i)
int i;
{
        if(strcmp(method_info_array[i]->bc_ptr->class_name,method_info_array[i]->method_name
=0)return 1;
        return 0;
} is_destructor(i)
int i;
{
        char buffer[100];

strcpy(buffer,"~");
        strcat(buffer,method_info_array[i]->bc_ptr->class_name);
        if(strcmp(buffer,method_info_array[i]->method_name)==0)return 1;
        return 0;
} look_up_typedef(s)
char *s;
{
int i;
        for(i=0;i<entry_array_index;i++){
                if((entry_array[i]->kind == KINDTYPEDEF)&&
                  (strcmp(entry_array[i]->key,s)==0)){
```

```
                                return (get_typei(entry_array[i]->type));
                        }
                }
                return -1;
} get_default_val(s,default_val)
char* s;
char* default_val;
{
int i;
        for(i=0;i<strlen(s);i++){
        }
} put_default_arguments(argpos,i,statement)
int argpos;
int i;
char* statement;
{
int arg_count;
char default_val[100];
int j;
        arg_count=method_info_array[i]->method_arguments->count;
        for(j=argpos;j<arg_count;j++){
                get_default_val(method_info_array[i]->method_arguments->arg[j],default_val);
                strcat(statement,default_val);
                if(j<arg_count-1)strcat(statement,",");
        }
} put_arguments(i,statement)
int i;
char *statement;
{
int arg_count;
int j,k,typei;
char buffer[100];
char type[100];
char var[100];

arg_count=method_info_array[i]->method_arguments->count;
        for(j=0;j<arg_count;j++){
                if(strncmp(method_info_array[i]->method_arguments->arg[j],"/*function_pointer*/
20)==0)return 0;
                sprintf(buffer,"%d",j);
                strcpy(type,method_info_array[i]->method_arguments->arg[j]);
                pure_type(type);
                typei = get_typei(type);
                if(typei==(-1)){
                        typei = look_up_typedef(type);
                        if(typei==(-1)){
                                strcat(statement,"// method ");
```

```c
                    strcat(statement,method_info_array[i]->method_name);
                    strcat(statement," has argument of unknown type -- ");
                    strcat(statement,type);
                    strcat(statement," --\n");
                    return 0;
            }else{
                    strcpy(var , get_var(typei));
            }
        }else{
                    strcpy(var , get_var(typei));
        }
        strcat(statement,"*(global_arguments[");
        strcat(statement,buffer);
        strcat(statement,"]->");
        strcat(statement,var);
        strcat(statement,")");
        if(j<arg_count-1)strcat(statement,",");
    }
    return 1;
} create_constructor_contents(i,maccfp)
int i;
FILE* maccfp;
{
char buffer[100];
char statement[5000];
int print=1;
char buf[20];

state_class(method_info_array[i]->bc_ptr->class_name,"constructor",maccfp);
        if(method_info_array[i]->bc_ptr->is_abstract){
                state_abstract_class(method_info_array[i]->bc_ptr->class_name,maccfp);
                fputs("free_global_arg();\n",maccfp);
                fputs("return (struct value_struct*)CONSTRUCTOR_ABS;\n",maccfp);
        }else{
                strcpy(statement,"\t"); /*here static */
                strcat(statement,method_info_array[i]->bc_ptr->class_name);
                strcat(statement,"* t = new ",maccfp);
                strcat(statement,method_info_array[i]->method_name);
                strcat(statement,"(");
                print = put_arguments(i,statement);
                strcat(statement,");\n");
                if(print){
                        strcpy(buffer,method_info_array[i]->bc_ptr->class_name);
                        strcat(buffer,"*");
                        fputs(statement,maccfp);
                        fputs("\tvalue_struct_malloc(get_typei(\"",maccfp);
                        fputs(method_info_array[i]->bc_ptr->class_name,maccfp);
                        fputs("\"));\n",maccfp);
                        fputs("\tglobal_return_value->Vvoid",maccfp);
                        fputs(" = t;\n",maccfp);
                        fputs("free_global_arg();\n",maccfp);
```

```
                        fputs("\treturn global_return_value;\n",maccfp);
            }else{
                        fputs("free_global_arg();\n",maccfp);
                        fputs("\treturn (struct value_struct*)UNKNOWN_ARG_TYPE;\n",maccf
            }
        }
end_of_constructor_contents:;
} create_destructor_contents(i,maccfp)
int i;
FILE* maccfp;
{
        state_class(method_info_array[i]->bc_ptr->class_name,"destructor",maccfp);
        if(method_info_array[i]->bc_ptr->is_abstract){
                    state_abstract_class(method_info_array[i]->bc_ptr->class_name,maccfp);
                    fputs("free_global_arg();\n",maccfp);
                    fputs("return (struct value_struct*)DESTRUCTOR_ABS;\n",maccfp);
        }else{
                    fputs("\tdelete (",maccfp);
                    fputs(method_info_array[i]->bc_ptr->class_name,maccfp);
                    fputs("*) global_objectptr;\n",maccfp);
                    fputs("free_global_arg();\n",maccfp);
                    fputs("\treturn 0;\n",maccfp);
        }
end_of_destructor_contents:;
} is_conversion_type_name(source,result)
char* source;
char* result;
{
        char cast_type_name[100];

if(strncmp(source,"conversion_type_name",strlen("conversion_type_name"))==0){
                    strcpy(result,remove_string("conversion_type_nameoperator ",source));
                    return 1;
        }else{
                    return 0;
        }
} state_class(class_name,message,maccfp)
char* class_name;
char *message;
FILE* maccfp;
{
        fputs("/* ",maccfp);
        fputs(message,maccfp);
        fputs(" from class ",maccfp);
        fputs(class_name,maccfp);
        fputs(" */\n",maccfp);
}
```

```
int do_conversion_type_name(i,statement,conversion_type_name,ampersand_seen)
int i;
char* statement;
char* conversion_type_name;
int ampersand_seen;
{
        char type[100];
        static int print;

strcpy(type,conversion_type_name);
                pure_type(type);
                if(ampersand_seen)strcat(statement,"&");
                strcat(statement,"((");
                strcat(statement,method_info_array[i]->bc_ptr->class_name);
                strcat(statement,"*)global_objectptr)->operator ");
                strcat(statement,type);
                strcat(statement,"("); /* arguments */
                print = put_arguments(i,statement);
                strcat(statement,");\n"); /* arguments */
                strcat(statement,"\t\t\t/*conversion_type_name*/\n");
                return print;

} int do_general_method_call(i,statement,ampersand_seen)
int i;
char* statement;
int ampersand_seen;
{
static int print;
                if(ampersand_seen)strcat(statement,"&");
                strcat(statement,"((");
                strcat(statement,method_info_array[i]->bc_ptr->class_name);
                strcat(statement,"*)global_objectptr)->");
                strcat(statement,method_info_array[i]->method_name);
                strcat(statement,"(");
                print = put_arguments(i,statement);
                strcat(statement,");\n");
                return print;
} int do_static_method(i,statement,ampersand_seen)
int i;
char* statement;
int ampersand_seen;
{
        char buf[100];
        static int print;
                if(ampersand_seen)strcat(statement,"&");
                strcpy(buf,method_info_array[i]->bc_ptr->class_name);
                strcat(buf,"::");
                if(lin_string(buf,method_info_array[i]->method_name)){
                        strcat(statement,buf);
```

```
                }
                strcat(statement,method_info_array[i]->method_name);
                strcat(statement,"(");
                print = put_arguments(i,statement);
                strcat(statement,");\n");
                return print;
} in_string(source,target)   /* is string source in string target ? */
char* source;
char* target;
{
        int i,j,k;
        char *cptr;

j=strlen(source);
        k=strlen(target);
        cptr=target;
        for(i=0;i<k-j+1;i++){
                if(*cptr==source[0]){
                        if(strncmp(cptr,source,j)==0){
                                return 1;
                        }
                }
                cptr++;
        }
        return 0;
} friend_method(i)
int i;
{
        if(in_string("friend",method_info_array[i]->return_type)){
                return 1;
        }
        return 0;
} is_static_method(i)
int i;
{
        if(in_string("static",method_info_array[i]->return_type)){
                return 1;
        }
        return 0;
} is_cast_operator(i)
int i;
{
        if(in_string("conversion_type_name",method_info_array[i]->method_name)){
                return 1;
```

```
            }
            return 0;
} int put_nonmember_function_arguments(i,statement)
int i;
char* statement;
{
            int arg_count;
            int j,typei;
            char buffer[100];
            char type[100];
            char var[100];
            char operator[100];

strcpy(operator,remove_string("operator ",method_info_array[i]->method_name));
            arg_count=method_info_array[i]->method_arguments->count;
            for(j=0;j<arg_count;j++){
                        sprintf(buffer,"%d",j);
                        strcpy(type,method_info_array[i]->method_arguments->arg[j]);
                        pure_type(type);
                        if(strcmp(type,method_info_array[i]->bc_ptr->class_name)==0){
                                    strcat(statement,"*((");
                                    strcat(statement,method_info_array[i]->bc_ptr->class_name);
                                    strcat(statement,"*)global_objectptr)");
                        }else{
                                    typei = get_typei(type);
                                    if(typei==(-1)){
                                                typei = look_up_typedef(type);
                                                if(typei==(-1)){
                                                            strcat(statement,"// method ");
                                                            strcat(statement,method_info_array[i]->method_na
e);
                                                            strcat(statement," has argument of unknown type -
);
                                                            strcat(statement,type);
                                                            strcat(statement," --\n");
                                                            return 0;
                                                }else{
                                                            strcpy(var , get_var(typei));
                                                }
                                    }else{
                                                strcpy(var , get_var(typei));
                                    }
                                    strcat(statement,"*(global_arguments[");
                                    strcat(statement,buffer);
                                    strcat(statement,"]->");
                                    strcat(statement,var);
                                    strcat(statement,")");
                        }
                        if(j<arg_count-1)strcat(statement,",");
            }
            return 1;
```

```
} do_friend_method(i,statement,method)
int i;
char* statement;
char* method;
{
        static int print;
                strcat(statement,method);
                strcat(statement,"(");
                print = put_nonmember_function_arguments(i,statement);
                strcat(statement,")");
                strcat(statement,";\n");
                strcat(statement,"/* friend method */\n");
                return print;
} define_var(i,statement,type,var,ampersand_seen)
int i;
char* statement;
char* type;
char* var;
int ampersand_seen;
{
        int typei ;

pure_type(type);
                typei = get_typei(type);
                if(typei==(-1)){
                        typei = look_up_typedef(type);
                        if(typei==(-1)){
                                strcat(statement,"// method ");
                                strcat(statement,method_info_array[i]->method_name);
                                strcat(statement," returns an unknown type -- ");
                                strcat(statement,type);
                                strcat(statement," --\n");
                                return 0;
                        }
                }
                if(ampersand_seen){
                        strcat(statement,"\tglobal_return_value->Vvoid = (void*)");
                }else{
                        strcat(statement,"\t"); /* here static */
                        strcat(statement,type);
                        strcat(statement," udomchanachokG1");
                        strcat(statement,var);
                        strcat(statement," = ");
                        strcat(statement,"(");
                        strcat(statement,type);
                        strcat(statement,")");
                }
                return 1;
}
```

```
put_global_return_value(print,print2,statement,var,type)
int print;
int print2;
char* statement;
char* var;
char* type;
{
        if(print&&print2){
                strcat(statement,"\treturn global_return_value;\n");
        }else{
                if(!print){
                        strcat(statement,"\treturn (struct value_struct*)UNKNOWN_ARG_TYPI
n");
                }else if(!print2){
                        strcat(statement,"\treturn (struct value_struct*)UNKNOWN_RET_TYPE
n");
                }
        }
} do_this1(statement,type)
char* statement;
char* type;
{
char buf[20];
        strcpy(statement,"/* return reference type */\n");
        strcat(statement,"\tvalue_struct_malloc(get_typei(\"");
        strcat(statement,type);
        strcat(statement,"\"));\n");
} do_this2(statement,type)
char* statement;
char* type;
{
char buf[20];
        strcpy(statement,"\tmethod_malloc(get_sizeof(\"");
        strcat(statement,type);
        strcat(statement,"\"),get_typei(\"");
        strcat(statement,type);
        strcat(statement,"\"));\n");
} do_this0(i,statement)
int i;
char* statement;
{
int print=1;
int print2=1;
char conversion_type_name[100];
char conversion_type_var[100];
char method[100];
```

```
char type[100];
char var[100];
int ampersand_seen=0;

if(strcmp(method_info_array[i]->return_type,"")!=0){
                strcpy(type,method_info_array[i]->return_type);
        }else{
                strcpy(type,"int");
        }
        ampersand_seen = pure_type(type);
        if(ampersand_seen){
                do_this1(statement,type);
        }else{
                do_this2(statement,type);
        }
        if(is_conversion_type_name(method_info_array[i]->method_name,conversion_type_name)
                strcpy(conversion_type_var,conversion_type_name);
                replace_space_underscore(conversion_type_var);
                replace_aster_underscore(conversion_type_var);
                strcpy(type,conversion_type_name);
                pure_type(type);
                if(ampersand_seen){
                        do_this1(statement,type);
                }else{
                        do_this2(statement,type);
                }
                print2 = define_var(i,statement,conversion_type_name,conversion_type_var,amp
rsand_seen);
                print = do_conversion_type_name(i,statement,conversion_type_name,ampersar
_seen);
                put_global_return_value(print,print2,statement,conversion_type_var,conversion_
pe_name);
        }else if(friend_method(i)){
                strcpy(var,method_info_array[i]->return_type);
                replace_space_underscore(var);
                replace_aster_underscore(var);
                strcpy(type,method_info_array[i]->return_type);
                print2 = define_var(i,statement,method_info_array[i]->return_type,var,ampersan
seen);
                print = do_friend_method(i,statement,method_info_array[i]->method_name);
                put_global_return_value(print,print2,statement,var,type);
        }else if(is_static_method(i)){
                strcpy(var,method_info_array[i]->return_type);
                replace_space_underscore(var);
                replace_aster_underscore(var);
                strcpy(type,method_info_array[i]->return_type);
                print2 = define_var(i,statement,method_info_array[i]->return_type,var,ampersan
seen);
                print = do_static_method(i,statement,ampersand_seen);
                put_global_return_value(print,print2,statement,var,type);
        }else{
                strcpy(var,method_info_array[i]->return_type);
                replace_space_underscore(var);
```

```c
                    replace_aster_underscore(var);
                    strcpy(type,method_info_array[i]->return_type);
                    print2 = define_var(i,statement,method_info_array[i]->return_type,var,ampersand_seen);
                    print = do_general_method_call(i,statement,ampersand_seen);
                    put_global_return_value(print,print2,statement,var,type);
            }
            return (print && print2);
} create_method_contents(i,maccfp)
int i;
FILE* maccfp;
{
            char type[100];
            char statement[5000];
            int print=1;

state_class(method_info_array[i]->bc_ptr->class_name,"",maccfp);
            strcpy(type,method_info_array[i]->return_type);
            if(method_info_array[i]->bc_ptr->is_abstract){
                    state_abstract_class(method_info_array[i]->bc_ptr->class_name,maccfp);
            }
            pure_type(type);
            if(class_is_abstract(type)){
                    fputs("/* return type -- ",maccfp);
                    fputs(type,maccfp);
                    fputs(" -- is an abstract class */\t",maccfp);
                    fputs("free_global_arg();\n",maccfp);
                    fputs("return (struct value_struct*)RETURN_ABS;\n",maccfp);
            }else{
                    if(strcmp(type,"void")!=0){
                            print = do_this0(i,statement);
                    }else{ /* no return value void */
                            if(!friend_method(i)){
                                    strcpy(statement,"\t((");
                                    strcat(statement,method_info_array[i]->bc_ptr->class_name);
                                    strcat(statement,"*)global_objectptr)->");
                            }else{
                                    strcpy(statement,"/*friend method*/\n");
                            }
                            strcat(statement,method_info_array[i]->method_name);
                            strcat(statement,"(");
                            print = put_arguments(i,statement);
                            strcat(statement,");\n");
                            strcat(statement,"/* void -- no return value */\t");
                            strcat(statement,"free_global_arg();\n");
                            strcat(statement,"\treturn 0;\n");
                    }
                    if(print){
                            fputs(statement,maccfp);
                    }else{
                            fputs("free_global_arg();\n",maccfp);
```

```c
                                        fputs("\treturn (struct value_struct*)UNKNOWN_ARG_TYPE;\n",maccf
                }
        }
end_of_method_contents: ; /*closing right brace may not follow label*/
} create_method_functions_contents(i,maccfp)
int i;
FILE* maccfp;
{
        if(is_constructor(i)){
                create_constructor_contents(i,maccfp);
        }else if(is_destructor(i)){
                create_destructor_contents(i,maccfp);
        }else{
                create_method_contents(i,maccfp);
        }
} close_file(lmaccfp,s2,last_entry,cn,cnp,print,s1)
FILE* lmaccfp;
int s2;
int last_entry;
char* cn;
char* cnp;
int print;
char* s1;
{
char buf[20];

if((last_entry)||(strcmp(cn,cnp)!=0)){
                switch(s2){
                        case 0:{
                                break;
                        }
                        case 1:{
                                if(print){
                                        fputs(s1,lmaccfp);
                                        fputs("\n};\n\n",lmaccfp);
                                        fputs("struct value_struct* call",lmaccfp);
                                        fputs(cn,lmaccfp);
                                        fputs("method(int i)",lmaccfp);
                                        fputs("{\n",lmaccfp);
                                        fputs("\treturn ",lmaccfp);
                                        fputs(cn,lmaccfp);
                                        fputs("methodfp[i]();\n",lmaccfp);
                                        fputs("}\n\n",lmaccfp);
                                }else{
                                        fputs("struct value_struct* call",lmaccfp);
                                        fputs(cn,lmaccfp);
                                        fputs("method(int i)",lmaccfp);
                                        fputs("{\n",lmaccfp);
```

```
                                                    fputs("\treturn (struct value_struct*)NO_METHOD;
,lmaccfp);
                                                    fputs("}\n\n",lmaccfp);
                                        }
                    break;
                    }
            case 2:{
                                if(print){
                                        fputs(s1,lmaccfp);
                                        fputs("\n};\n\n",lmaccfp);
                                        fputs("struct value_struct* get",lmaccfp);
                                        fputs(cn,lmaccfp);
                                        fputs("attr(int i)",lmaccfp);
                                        fputs("{\n",lmaccfp);
                                        fputs("\treturn ",lmaccfp);
                                        fputs(cn,lmaccfp);
                                        fputs("attrfp[i]();\n",lmaccfp);
                                        fputs("}\n\n",lmaccfp);
                                }else{
                                        fputs("struct value_struct* get",lmaccfp);
                                        fputs(cn,lmaccfp);
                                        fputs("attr(int i)",lmaccfp);
                                        fputs("{\n",lmaccfp);
                                        fputs("\treturn (struct value_struct*)NO_ATTR;\n",l
accfp);
                                        fputs("}\n\n",lmaccfp);
                                }
                    break;
                    }
            case 3:{
                                if(print){
                                        fputs(s1,lmaccfp);
                                        fputs("\n};\n\n",lmaccfp);
                                        fputs("struct value_struct* call",lmaccfp);
                                        fputs(cn,lmaccfp);
                    fputs("persistent(int i)",lmaccfp);
                                        fputs("{\n",lmaccfp);
                                        fputs("\treturn ",lmaccfp);
                                        fputs(cn,lmaccfp);
                                        fputs("persistentfp[i]();\n",lmaccfp);
                                        fputs("}\n\n",lmaccfp);
                                }else{
                                        fputs("struct value_struct* call",lmaccfp);
                                        fputs(cn,lmaccfp);
                    fputs("persistent(int i)",lmaccfp);
                                        fputs("{\n",lmaccfp);
                                        fputs("\treturn (struct value_struct*)PERSISTENT_NDFP;\n",lmac
p);
                                        fputs("}\n\n",lmaccfp);
                                }
                    break;
                    }
            case 4:{
```

```
                if(print){
                        fputs(s1,lmaccfp);
                        fputs("};\n\n",lmaccfp);
                        fputs("int ",lmaccfp);
                        fputs(cn,lmaccfp);
                        fputs("_ct_index = ",lmaccfp);
                        sprintf(buf,"%d",print);
                        fputs(buf,lmaccfp);
                        fputs(";\n\n",lmaccfp);
                        fputs("operator_cast_from_",lmaccfp);
                        fputs(cn,lmaccfp);
                        fputs("(char* toclass){\n",lmaccfp);
                        fputs("int i;\n",lmaccfp);
                        fputs("\tfor(i=0;i<",lmaccfp);
                        fputs(cn,lmaccfp);
                        fputs("_ct_index;i++){\n",lmaccfp);
                        fputs("\t\tif(strcmp(toclass,",lmaccfp);
                        fputs(cn,lmaccfp);
                        fputs("_cast_to[i])==0)return 1;\n",lmaccfp);
                        fputs("\t}\n",lmaccfp);
                        fputs("\treturn 0;\n",lmaccfp);
                        fputs("}\n\n",lmaccfp);
                }else{
                        fputs("operator_cast_from_",lmaccfp);
                        fputs(cn,lmaccfp);
                        fputs("(char* toclass){\n",lmaccfp);
                        fputs("\treturn 0;\n",lmaccfp);
                        fputs("}\n\n",lmaccfp);
                }
        break;
        }
case 5:{
                if(print){
                        fputs(s1,lmaccfp);
fputs("\n};\n\n",lmaccfp);
fputs("int ",lmaccfp);
fputs(cn,lmaccfp);
                        fputs("_cf_index = ",lmaccfp);
                        sprintf(buf,"%d",print);
                        fputs(buf,lmaccfp);
                        fputs(";\n\n",lmaccfp);
fputs("construct_from_",lmaccfp);
                        fputs(cn,lmaccfp);
                        fputs("(char* fromclass){\n",lmaccfp);
fputs("int i;\n",lmaccfp);
                        fputs("\tfor(i=0;i<",lmaccfp);
                        fputs(cn,lmaccfp);
                        fputs("_cf_index;i++){\n",lmaccfp);
                        fputs("\t\tif(strcmp(fromclass,",lmaccfp);
                        fputs(cn,lmaccfp);
                        fputs("_construct_from[i])==0)return 1;\n",lmaccfp);
fputs("\t}\n",lmaccfp);
                        fputs("\treturn 0;\n",lmaccfp);
```

```
                    fputs("}\n\n",lmaccfp);
                            }else{
                    fputs("construct_from_",lmaccfp);
                                    fputs(cn,lmaccfp);
                                    fputs("(char* fromclass){\n",lmaccfp);
                                    fputs("\treturn 0;\n",lmaccfp);
                    fputs("}\n\n",lmaccfp);
                            }
            break;
                            }
        };
            fclose(lmaccfp);
        }
} create_method_functions()
{
int i;
int j=0;
char buffer[20];
FILE* lfptr=0;
int last_entry;
char message[100];

for(i=0;i<mia_index;i++){
                open_file(i,method_info_array[i]->bc_ptr->class_name,i?method_info_array[i-1]->
c_ptr->class_name:"",&j,&lfptr,"w","",2);
                sprintf(buffer,"%d",j++);
                fputs("struct value_struct* ",lfptr);
                fputs(method_info_array[i]->bc_ptr->class_name,lfptr);
                fputs("method",lfptr);
                fputs(buffer,lfptr);
                fputs("()\n",lfptr);
                fputs("{\n",lfptr);
                if(method_info_array[i]->access_spec!=PRIVATE_M){
                        create_method_functions_contents(i,lfptr);
                }else{
                        strcpy(message,"method ");
                        strcat(message,method_info_array[i]->method_name);
                        state_class(method_info_array[i]->bc_ptr->class_name,message,lfptr)
                        fputs("\t return (struct value_struct*)PRIVATE_MEMBER;\n",lfptr);
                }
                fputs("}\n",lfptr);
                last_entry=(i==mia_index-1);
                close_file(lfptr,0,last_entry,method_info_array[i]->bc_ptr->class_name,last_entry
":method_info_array[i+1]->bc_ptr->class_name,0,"");
        }
} create_pointers_to_method_functions()
{
int i;
int j;
```

```
char s1[10000];
char buffer[20];
char dum[100];
FILE* lfptr=0;
int last_entry;
char close_string[1000];
    dum[0]=0;
    strcpy(close_string,"};\n");
    for(i=0;i<mia_index;i++){
        methods_generated++;
        if(strcmp(dum,method_info_array[i]->bc_ptr->class_name)!=0){
            classes_generated++;
            strcpy(dum,method_info_array[i]->bc_ptr->class_name);
        }
        open_file(i,method_info_array[i]->bc_ptr->class_name,i?method_info_array[i-1]->bc_ptr->c
ss_name:"",&j,&lfptr,"a",s1,3);
        sprintf(buffer,"%d",j++);
        strcat(s1,method_info_array[i]->bc_ptr->class_name);
        strcat(s1,"method");
        strcat(s1,buffer);
        strcat(s1,",");
        if((j+1)%7==0)strcat(s1,"\n");
        last_entry=(i==mia_index-1);
        close_file(lfptr,1,last_entry,method_info_array[i]->bc_ptr->class_name,last_entry?"":metho
nfo_array[i+1]->bc_ptr->class_name,j,s1);
    }
} create_method_set()
{
        create_method_functions();
        create_pointers_to_method_functions();
} generate_one_dimensional(i,lptr)
int i;
FILE* lptr;
{
char buf[20];
char type[50];
        strcpy(type,base_class_array[i]->class_name);
        strcat(type,"*");
        fputs("\t\t",lptr);
        fputs("\t\tglobal_return_value->type = get_typei(\"",lptr);
        fputs(type,lptr);
        fputs("\");\n",lptr);
        fputs("\t\tindirection1 = (char**)malloc(sizeof(char*));\n",lptr);
        fputs("\t\tglobal_return_value->V1void = (void**)indirection1;\n",lptr);
        fputs("\t\t*indirection1 = (char*) new ",lptr);
        fputs(base_class_array[i]->class_name,lptr);
        fputs("[c1];\n",lptr);
        fputs("\t\tindirection1 = 0;\n",lptr);
}
```

```c
generate_two_dimensional(i,lptr)
int i;
FILE* lptr;
{
char buf[20];
char type[50];
        strcpy(type,base_class_array[i]->class_name);
        strcat(type,"**");
        fputs("\t\tglobal_return_value->type = get_typei(\"",lptr);
        fputs(type,lptr);
        fputs("\");\n",lptr);
        fputs("\t\tindirection1 = (char**)malloc(sizeof(char*));\n",lptr);
        fputs("\t\tindirection2 = (char**)malloc(sizeof(char*));\n",lptr);
        fputs("\t\tglobal_return_value->V2void = (void***)indirection1;\n",lptr);
        fputs("\t\t*indirection1 = (char*)indirection2;\n",lptr);
        fputs("\t\t*indirection2 = (char*)new ",lptr);
        fputs(base_class_array[i]->class_name,lptr);
        fputs("[c1*c2];\n",lptr);
        fputs("\t\tindirection1 = 0;\n",lptr);
        fputs("\t\tindirection2 = 0;\n",lptr);
} no_argument_constructor(s)
char *s;
{
int i;

for(i=0;i<mia_index;i++){
                if(strcmp(method_info_array[i]->method_name,s)==0){
                        if(!method_info_array[i]->extra)
                                if(method_info_array[i]->method_arguments->count==0)
                                        return 1;
                }
        }
        return 0;
} create_array_functions_contents(i,lptr)
int i;
FILE* lptr;
{
        state_class(base_class_array[i]->class_name,"",lptr);
        if(base_class_array[i]->is_abstract){
                fputs("c1=0;c2=0;\n",lptr);
                fputs("return (struct value_struct*)ARRAY_ABS;\n",lptr);
                goto end_of_call_array;
        }
        fputs("char** indirection1,**indirection2;\n",lptr);
        fputs("\tglobal_return_value = (struct value_struct*)malloc(sizeof(struct value_struct));\n",lp
        fputs("\tif(c2==0){\n",lptr);
        generate_one_dimensional(i,lptr);
        fputs("\t}else{\n",lptr);
```

```
                generate_two_dimensional(i,lptr);
                fputs("\t}\n",lptr);
                fputs("\tglobal_return_value->flag = 0;\n",lptr);
                fputs("\treturn global_return_value;\n",lptr);
end_of_call_array :;
} create_array_functions()
{
int i;
char buffer[100];
char file_name[100];
FILE* lptr;
        for(i=bt_index;i<bca_index;i++){  /* start with i = 1 to skip void */
                if(no_argument_constructor(base_class_array[i]->class_name)){
                        strcpy(file_name,"temp_scanh_dir1/S_");
                        strcat(file_name,remove_agg_and_stuff(base_class_array[i]->class_na
e));
                        strcat(file_name,".cxx");
                        lptr = fopen(file_name,"a");
                        fputs("struct value_struct* array",lptr);
                        fputs(base_class_array[i]->class_name,lptr);
                        fputs("(int c1,int c2)\n",lptr);
                        fputs("{\n",lptr);
                        create_array_functions_contents(i,lptr);
                        fputs("}\n",lptr);
                        fclose(lptr);
                }
        }
} create_arrayx(maccfp)
FILE* maccfp;
{
        fputs("struct value_struct* arrayx(int c1,int c2)\n",maccfp);
        fputs("{\n",maccfp);
        fputs("\treturn (struct value_struct*)-1;\n",maccfp);
        fputs("}\n",maccfp);
} create_call_array_set()
{
        create_array_functions();
} generate_pointer_to_cast_functions(from,to,lptr)
int from;
int to;
FILE* lptr;
{
char from_buffer[100];
```

```
char to_buffer[100];
static i=0;

strcpy(to_buffer,base_class_array[to]->class_name);
        replace_space_underscore(to_buffer);
        strcpy(from_buffer,base_class_array[from]->class_name);
        replace_space_underscore(from_buffer);
        fputs("cast_from_",lptr);
        fputs(from_buffer,lptr);
        fputs("_to_",lptr);
        fputs(to_buffer,lptr);
        fputs(",",lptr);
        if((i%5) == 0)fputs("\n",lptr);
        i++;
} create_cast_from_functions(i,lptr)
int i;
FILE* lptr;
{
        fputs("void* cast_from_",lptr);
        fputs(base_class_array[i]->class_name,lptr);
        fputs("(void* objectptr,int newclassi){\n",lptr);
        fputs("char buf[100];\n",lptr);
        fputs("int i;\n",lptr);
        fputs("\tstrcpy(buf,get_class(newclassi*3));/* typei */\n",lptr);
        fputs("\tfor(i=0;i<",lptr);
        fputs(base_class_array[i]->class_name,lptr);
        fputs("_to_index;i++){\n",lptr);
        fputs("\t\tif(strcmp(",lptr);
        fputs(base_class_array[i]->class_name,lptr);
        fputs("_to_array[i],buf)==0)break;\n",lptr);
        fputs("\t}\n",lptr);
        fputs("\tif(i==",lptr);
        fputs(base_class_array[i]->class_name,lptr);
        fputs("_to_index)return (void*)D_TO_B_CAST_FAILED;\n",lptr);
        fputs("\treturn ",lptr);
        fputs(base_class_array[i]->class_name,lptr);
        fputs("castfp[i](objectptr);\n",lptr);
        fputs("}\n\n",lptr);
} create_cast_from_functions2(i,lptr)
int i;
FILE* lptr;
{
        fputs("void* cast_from_",lptr);
        fputs(base_class_array[i]->class_name,lptr);
        fputs("(void* objectptr,int newclassi){\n",lptr);
        fputs("\treturn (void*)D_TO_B_CAST_FAILED;\n",lptr);
        fputs("}\n\n",lptr);
```

}

```
create_to_array(buf,toa,count,i,lptr)
char* buf;
char toa[][50];
int count;
FILE* lptr;
{
int j;
char temp[20];

sprintf(temp,"%d",50);
        fputs("char ",lptr);
        fputs(base_class_array[i]->class_name,lptr);
        fputs("_to_array[",lptr);
        fputs(buf,lptr);
        fputs("][",lptr);
        fputs(temp,lptr);
        fputs("] = {\n",lptr);
        for(j=0;j<count;j++){
                fputs("\"",lptr);
                fputs(toa[j],lptr);
                fputs("\"",lptr);
                fputs(",",lptr);
                if(((j+1)%5)==0)fputs("\n",lptr);
        }
        fputs("};\n\n",lptr);
}
create_pointers_to_cast_functions()
{
int i,j;
char buffer[12];
char toa[20][50];
int count=0;
char s1[100];
FILE* lptr;
int last_entry;
char file_name[100];
int print=0;

for(i=bt_index;i<bca_index;i++){
                strcpy(file_name,"temp_scanh_dir1/S_");
                strcat(file_name,remove_agg_and_stuff(base_class_array[i]->class_name));
                strcat(file_name,".cxx");
                lptr = fopen(file_name,"a");
                strcpy(s1,"\tstatic void* (*");
                strcat(s1,base_class_array[i]->class_name);
                strcat(s1,"castfp[])(void*) = {\n");
                for(j=bt_index;j<bca_index;j++){
                        if(can_cast(i,j)){
                                fputs(s1,lptr);
```

```
                                s1[0]=0;
                                print = 1;
                                generate_pointer_to_cast_functions(i,j,lptr);
                                strcpy(toa[count++],base_class_array[j]->class_name);
                        }
                }
                if(print){
                                fputs("\t};\n\n",lptr);
                                sprintf(buffer,"%d",count);
                                fputs("int ",lptr);
                                fputs(base_class_array[i]->class_name,lptr);
                                fputs("_to_index = ",lptr);
                                fputs(buffer,lptr);
                                fputs(";\n\n",lptr);
                                create_to_array(buffer,toa,count,i,lptr);
                                create_cast_from_functions(i,lptr);
                                print = 0;
                }else{
                                create_cast_from_functions2(i,lptr);
                }
                fclose(lptr);
                count=0;
        }
} create_cast_set()
{
        create_pointers_to_cast_functions();
} generate_cast_to_code(from,to,lptr)
int from;
int to;
FILE* lptr;
{
char from_buffer[100];
char to_buffer[100];
        strcpy(to_buffer,base_class_array[to]->class_name);
        replace_space_underscore(to_buffer);
        strcpy(from_buffer,base_class_array[from]->class_name);
        replace_space_underscore(from_buffer);
        fputs("void* cast_from_",lptr);
        fputs(from_buffer,lptr);
        fputs("_to_",lptr);
        fputs(to_buffer,lptr);
        fputs("(void* objectptr)\n",lptr);
        fputs("{\n",lptr);
        fputs("return (",lptr);
        fputs(base_class_array[to]->class_name,lptr);
        fputs("*)(",lptr);
        fputs(base_class_array[from]->class_name,lptr);
        fputs("*)objectptr;\n",lptr);
        fputs("}\n",lptr);
```

```
}
create_cast_to_functions()
{
int i,j;
FILE* lptr;
char file_name[100];

for(i=bt_index;i<bca_index;i++){ /* non-basic-type classes */
                strcpy(file_name,"temp_scanh_dir1/S_");
                strcat(file_name,remove_agg_and_stuff(base_class_array[i]->class_name));
                strcat(file_name,".cxx");
                lptr = fopen(file_name,"a");
                for(j=bt_index;j<bca_index;j++){
                        if(can_cast(i,j)){
                                generate_cast_to_code(i,j,lptr);
                        }
                }
                fclose(lptr);
        }
} int can_cast(from,to)
int from;
int to;
{
int newfrom ,j;
int ri;
char buffer[20][50];
int count;

if((strcmp(base_class_array[from]->base_name,"nobase")==0)||
          (strcmp(base_class_array[from]->base_name,"")==0)){
                return 0;
        }else{
                count=0;
                break_parts_comma(base_class_array[from]->base_name,&count,buffer);
        }
        for(j=0;j<count;j++){
                if(strcmp(base_class_array[to]->class_name,buffer[j])==0){
                        return 1;
                }
        }
        for(j=0;j<count;j++){
                newfrom = get_typei(buffer[j]) / 3;
                ri = can_cast(newfrom,to);
                if (ri) return 1;
        }
        return 0;
}

/* recursively find if base_name is a superclass of class_name */
```

```
base_is_base_name(class_name,base_name)
char* class_name;
char* base_name;
{
int i,j;
int count;
int ri;
char buffer[20][50];
        for(i=0;i<bca_index;i++){
                if(strcmp(class_name,base_class_array[i]->class_name)==0){
                        count=0;
                        break_parts_comma(base_class_array[i]->base_name,&count,buffer);
                        for(j=0;j<count;j++){
                                if(strcmp(buffer[j],base_name)==0)return 1;
                                ri = base_is_base_name(buffer[j],base_name);
                                if (ri==1) return 1;
                        }
                        return 0;
                }
        }
        return 0;
} create_persistent_contents(i,lptr)
int i;
FILE* lptr;
{
char statement[2000];
int print;
char buf[20];
        state_class(method_info_array[i]->bc_ptr->class_name,method_info_array[i]->method_nai
,lptr);
        if(method_info_array[i]->bc_ptr->is_abstract){
                state_abstract_class(method_info_array[i]->bc_ptr->class_name,lptr);
                fputs("\tfree_global_arg();\n",lptr);
                fputs("\tretum (struct value_struct*)PERSISTENT_ABS;\n",lptr);
        }else{
                strcpy(statement,"\t");
                strcat(statement,method_info_array[i]->bc_ptr->class_name);
                strcat(statement,"* t = new(_",lptr);
                strcat(statement,method_info_array[i]->method_name);
                strcat(statement,")",lptr);
                strcat(statement,method_info_array[i]->method_name);
                strcat(statement,"(",lptr);
                print = put_arguments(i,statement);
                strcat(statement,");\n");
                if(print){
                        fputs("extern pClass* _",lptr);
                        fputs(method_info_array[i]->method_name,lptr);
                        fputs(";\n",lptr);
                        fputs(statement,lptr);
                        fputs("\tvalue_struct_malloc(get_typei(\"",lptr);
                        fputs(method_info_array[i]->bc_ptr->class_name,lptr);
```

```
                    fputs("\"));\n",lptr);
                    fputs("\tglobal_return_value->Vvoid = t;\n",lptr);
                    fputs("free_global_arg();\n",lptr);
                    fputs("\treturn global_return_value;\n",lptr);
            }else{
                    fputs("\tfree_global_arg();\n",lptr);
                    fputs("\treturn (struct value_struct*)UNKNOWN_ARG_TYPE;\n",lptr);
            }
        }
end_of_persistent_contents:;
} create_persistent_functions()
{
int j=0;
int i;
char s1[2000];
char buffer[100];
FILE* lptr=0;
int last_entry;

for(i=0;i<mia_index;i++){
                open_file(i,method_info_array[i]->bc_ptr->class_name,i?method_info_array[i-1]->bc_ptr-
class_name:"",&j,&lptr,"a",s1,0);
                if((is_constructor(i))&&(base_is_base_name(method_info_array[i]->bc_ptr->class_name
pObject"))){
                            sprintf(buffer,"%d",j++);
                            fputs("struct value_struct* ",lptr);
                            fputs(method_info_array[i]->bc_ptr->class_name,lptr);
                            fputs("persistent",lptr);
                            fputs(buffer,lptr);
                            fputs("(){\n",lptr);
                            create_persistent_contents(i,lptr);
                            fputs("}\n",lptr);
                }
                last_entry=(i==(mia_index-1));
                close_file(lptr,0,last_entry,method_info_array[i]->bc_ptr->class_name,last_entry?"":meth
d_info_array[i+1]->bc_ptr->class_name,0,"");
        }
} create_persistentx(maccfp)
FILE* maccfp;
{
                fputs("struct value_struct* persistentx()\n",maccfp);
                fputs("{\n",maccfp);
                fputs("// not a constructor\n",maccfp);
                fputs("// constructor does not derive from pObject\n",maccfp);
                fputs("// not an interested class\n",maccfp);
                fputs("\treturn (struct value_struct*)-1;\n",maccfp);
                fputs("}\n",maccfp);
}
```

```
create_pointers_to_persistent()
{
int i,j=0;
char buffer[20];
char s1[2000];
FILE *lptr;
int last_entry;

for(i=0;i<mia_index;i++){
                open_file(i,method_info_array[i]->bc_ptr->class_name,i?method_info_array[i-1]-:
c_ptr->class_name:"",&j,&lptr,"a",s1,5);
                if((is_constructor(i))&&(base_is_base_name(method_info_array[i]->bc_ptr->clas:
name,"pObject"))){
                        sprintf(buffer,"%d",j++);
                        strcat(s1,method_info_array[i]->bc_ptr->class_name);
                        strcat(s1,"persistent");
                        strcat(s1,buffer);
                        if(j<mia_index-1) strcat(s1,",");
                        if((j+1)%5==0)strcat(s1,"\n");
                }
                last_entry=(i==(mia_index-1));
                close_file(lptr,3,last_entry,method_info_array[i]->bc_ptr->class_name,last_entry'
:method_info_array[i+1]->bc_ptr->class_name,j,s1);
        }
} create_call_persistent_set()
{
        create_persistent_functions();
        create_pointers_to_persistent();
} char pClass_table[2000][100];
int pClass_table_index=0;

create_get_global_pClass_ptr();
create_call_as();

create_call_as2(maccfp)
FILE* maccfp;
{
    fputs("struct value_struct* call_as(char* class_name,struct value_struct* vs){\n",maccfp);
    fputs("return (struct value_struct*)NO_G_PCLASS_PTR;\n",maccfp);
    fputs("}\n",maccfp);
} create_get_global_pClass_ptr2(maccfp)
FILE* maccfp;
{
        fputs("pClass* get_global_pClass_ptr(char* class_name){\n",maccfp);
        fputs("return (pClass*)NO_G_PCLASS_PTR;\n",maccfp);
        fputs("}\n",maccfp);
}
```

```c
create_global_pClass_table(maccfp)
FILE* maccfp;
{
int i;
char buf1[20];
int max_length=0;
        for(i=bt_index;i<bca_index;i++){
                if(base_is_base_name(base_class_array[i]->class_name,"pObject")){
                        strcpy(pClass_table[pClass_table_index],base_class_array[i]->class_r
me);
                        if(strlen(pClass_table[pClass_table_index])>max_length){
                                max_length=strlen(pClass_table[pClass_table_index]);
                        }
                        pClass_table_index++;
                }
        }
        if(pClass_table_index>0){
                for(i=0;i<pClass_table_index;i++){
                        fputs("extern pClass* _",maccfp);
                        fputs(pClass_table[i],maccfp);
                        fputs(";",maccfp);
                        if(((i+1)%3)==0)fputs("\n",maccfp);
                }
                fputs("\n",maccfp);
                fputs("int pClass_table_size = ",maccfp);
                sprintf(buf1,"%d",pClass_table_index);
                fputs(buf1,maccfp);
                fputs(";\n",maccfp);
                fputs("char pClass_global[",maccfp);
                fputs(buf1,maccfp);
                fputs("][",maccfp);
                sprintf(buf1,"%d",20); /* max_length */
                fputs(buf1,maccfp);
                fputs("] = {\n",maccfp);
                for(i=0;i<pClass_table_index;i++){
                        fputs("\"",maccfp);
                        fputs(pClass_table[i],maccfp);
                        fputs("\"",maccfp);
                        fputs(",",maccfp);
                        if(((i+1)%4)==0)fputs("\n",maccfp);
                }
                fputs("};\n",maccfp);
                fputs("pClass** global_pClass_ptr[",maccfp);
                sprintf(buf1,"%d",pClass_table_index);
                fputs(buf1,maccfp);
                fputs("] = {\n",maccfp);
                for(i=0;i<pClass_table_index;i++){
                        fputs("&_",maccfp);
                        fputs(pClass_table[i],maccfp);
                        fputs(",",maccfp);
                        if(((i+1)%4)==0)fputs("\n",maccfp);
                }
```

```c
                fputs("};\n",maccfp);
                create_get_global_pClass_ptr(maccfp);
                create_call_as(maccfp);
        }else{
                create_get_global_pClass_ptr2(maccfp);
                create_call_as2(maccfp);
        }
} create_get_global_pClass_ptr(maccfp)
FILE* maccfp;
{
        fputs("pClass* get_global_pClass_ptr(char* class_name){\n",maccfp);
        fputs("int i;\n",maccfp);
        fputs("\tif(get_typei(class_name)==-1)return (pClass*)-1;\n",maccfp);
        fputs("\tfor(i=0;i<pClass_table_size;i++){\n",maccfp);
        fputs("\t\tif(strcmp(class_name,pClass_global[i])==0)\n",maccfp);
        fputs("\t\t\treturn *global_pClass_ptr[i];\n",maccfp);
        fputs("\t}\n",maccfp);
        fputs("return (pClass*)-1;\n",maccfp);
        fputs("}\n",maccfp);
}

/* not used */
create_as_functions(maccfp)
FILE* maccfp;
{
int i;
char buf[20];
        for(i=bt_index;i<bca_index;i++){  /* bt_index : basic types */
                if(base_is_base_name(base_class_array[i]->class_name,"pObject")){
                        fputs("AS_to_",maccfp);
                        fputs(base_class_array[i]->class_name,maccfp);
                        fputs("(){\n",maccfp);
                        fputs("\tmethod_malloc(get_sizeof(\"",maccfp);
                        fputs(base_class_array[i]->class_name,maccfp);
                        fputs("*\"),get_typei(\"",maccfp);
                        fputs(base_class_array[i]->class_name,maccfp);
                        fputs("\"));\n",maccfp);
                        fputs("assignptr = (global_object->as(_",maccfp);
                        fputs(base_class_array[i]->class_name,maccfp);
                        fputs("));\n",maccfp);
                        fputs("return global_return_value;\n",maccfp);
                        fputs("}\n",maccfp);
                }
        }
} create_equalx(maccfp)
FILE* maccfp;
{
        fputs("void equalx(void*a,void*b){\n",maccfp);
        fputs("}\n",maccfp);
```

```
} create_equal_contents(i,lptr)
int i;
FILE* lptr;
{
char buffer[100];
char buf[20];

state_class(base_class_array[i]->class_name,"",lptr);
        if(base_class_array[i]->is_abstract){
                fputs("/* abstract class ",lptr);
                fputs(base_class_array[i]->class_name,lptr);
                fputs(" */\n",lptr);
        }else{
           if(i==0){fputs("/* can not de reference void* */\n",lptr);
           }else{
                fputs("*((",lptr);
                fputs(base_class_array[i]->class_name,lptr);
                fputs("*)to) = *((",lptr);
                fputs(base_class_array[i]->class_name,lptr);
                fputs("*)from);\n",lptr);
           }
        }
end_of_assign_contents:;
} create_bt_equal_functions(maccfp)
FILE* maccfp;
{
int i;
char buffer[100];

for(i=0;i<bt_index;i++){
                        strcpy(buffer,base_class_array[i]->class_name);
                        replace_space_underscore(buffer);
                        fputs("void equal",maccfp);
                        fputs(buffer,maccfp);
                        fputs("(void*to ,void* from)\n",maccfp);
                        fputs("{\n",maccfp);
                        create_equal_contents(i,maccfp);
                        fputs("}\n",maccfp);
        }
} create_equal_functions()
{
int i;
char buffer[100];
char file_name[100];
FILE* lptr;

for(i=bt_index;i<bca_index;i++){
```

```c
            strcpy(file_name,"temp_scanh_dir1/S_");
            strcat(file_name,remove_agg_and_stuff(base_class_array[i]->class_name));
            strcat(file_name,".cxx");
            lptr = fopen(file_name,"a");
            fputs("void equal",lptr);
            fputs(base_class_array[i]->class_name,lptr);
            fputs("(void*to ,void* from)\n",lptr);
            fputs("{\n",lptr);
            create_equal_contents(i,lptr);
            fputs("}\n",lptr);
            fclose(lptr);
        }
} create_call_equal_set()
{
        create_equal_functions();
} create_constructor_cast_tables()
{
int i,j=0;
char s1[2000];
FILE* lptr;
int last_entry;
int count = 0;
char temp[100];

for(i=0;i<mia_index;i++){
            open_file(i,method_info_array[i]->bc_ptr->class_name,i?method_info_array[i-1]-:
c_ptr->class_name:"",&j,&lptr,"a",s1,6);
            if(is_conversion_type_name(method_info_array[i]->method_name,temp)){
                j++;
                strcat(s1,"\"");
                strcat(s1,temp);
                strcat(s1,"\"");
                strcat(s1,",");
                if(((j+1)%2)==0)strcat(s1,"\n");
            }
            last_entry=(i==(mia_index-1));
            close_file(lptr,4,last_entry,method_info_array[i]->bc_ptr->class_name,last_entry'
:method_info_array[i+1]->bc_ptr->class_name,j,s1);
        }
        for(i=0;i<mia_index;i++){
            open_file(i,method_info_array[i]->bc_ptr->class_name,i?method_info_array[i-1]-:
c_ptr->class_name:"",&j,&lptr,"a",s1,7);
            if((is_constructor(i))&&
                (method_info_array[i]->method_arguments->count==1)){
                    strcpy(temp,method_info_array[i]->method_arguments->arg[0]);
                    pure_type(temp);
                    j++;
```

```
                    strcat(s1,"\"");
                    strcat(s1,temp);
                    strcat(s1,"\"");
                    strcat(s1,",");
                    if(((j+1)%2)==0)strcat(s1,"\n");
            }
            last_entry=(i==(mia_index-1));
            close_file(lptr,5,last_entry,method_info_array[i]->bc_ptr->class_name,last_entry'
:method_info_array[i+1]->bc_ptr->class_name,j,s1);
        }
} create_extern_dot_h()
{
FILE* lptr;
char file_name[100];

strcpy(file_name,"scanh_dir/extern.h");
        lptr = fopen(file_name,"w");

fputs("#ifndef EXTERN\n",lptr);
        fputs("#define EXTERN\n",lptr);
        fputs("\nextern \"C\" void free(void*);\n",lptr);
        fputs("\nextern \"C\" char* malloc(unsigned int);\n",lptr);
        fputs("\nextern \"C\" int strcmp(const char*, const char*);\n",lptr);
        fputs("\nextern \"C\" int strncmp(const char*, const char*,int);\n",lptr);
        fputs("\nextern \"C\" int strlen(const char*);\n",lptr);
        fputs("\nextern \"C\" char *strcpy(char*, const char*);\n",lptr);
        fputs("\nextern \"C\" char *strcat(char*, const char*);\n",lptr);

fputs("extern void* global_objectptr;\n",lptr);
        fputs("extern char* assignptr;\n",lptr);
        fputs("extern struct value_struct* global_return_value;\n",lptr);
        fputs("extern struct value_struct** global_arguments;\n",lptr);

fputs("extern void free_global_arg();\n",lptr);
        fputs("extern void method_malloc(unsigned int, int);\n",lptr);
        fputs("extern void value_struct_malloc(int);\n",lptr);
        fputs("extern char* get_class(int);\n",lptr);
        fputs("extern int get_sizeof(char*);\n",lptr);
        fputs("extern int get_typei(char*);\n",lptr);
        fputs("#endif\n",lptr);

fclose(lptr);
} create_extern(maccfp)
FILE* maccfp;
{
        fputs("\nextern \"C\" void free(void*);\n",maccfp);
        fputs("\nextern \"C\" char* malloc(unsigned int);\n",maccfp);
        fputs("\nextern \"C\" int strcmp(const char*, const char*);\n",maccfp);
        fputs("\nextern \"C\" int strncmp(const char*, const char*,int);\n",maccfp);
```

```c
        fputs("\nextern \"C\" int strlen(const char*);\n",maccfp);
        fputs("\nextern \"C\" char *strcpy(char*, const char*);\n",maccfp);
        fputs("\nextern \"C\" char *strcat(char*, const char*);\n",maccfp);

fputs("extern void method_malloc(unsigned int, int);\n",maccfp);
        fputs("extern void* cast(void*, int, int);\n",maccfp);
        fputs("extern int get_sizeof(char*);\n",maccfp);
        fputs("extern int get_typei(char*);\n",maccfp);
        fputs("extern struct value_struct** global_arguments;\n",maccfp);
        fputs("extern struct value_struct* global_return_value;\n",maccfp);
        fputs("extern char* assignptr;\n",maccfp);
        fputs("class pClass;\n",maccfp);
} create_call_as(maccfp)
FILE* maccfp;
{
int i;
char buf[20];

fputs("struct value_struct* call_as(char* class_name,struct value_struct* vs){\n",maccfp);
        fputs("int classi,newclassi;\n",maccfp);
        fputs("int i,j;\n",maccfp);
        fputs("char to_type[100];\n",maccfp);
        fputs("class pObject* temp;\n",maccfp);
        fputs("\tstrcpy(to_type,class_name);\n",maccfp);
        fputs("\tstrcat(to_type,\"*\");\n",maccfp);
        fputs("\tmethod_malloc(sizeof(char*),get_typei(to_type));\n",maccfp);
        fputs("\tclassi = (vs->type) /3;\n",maccfp);
        fputs("\tnewclassi = get_typei(\"pObject\")/3;\n",maccfp);
        fputs("\ttemp = (pObject*)cast(*(vs->V1void),classi,newclassi);\n",maccfp);
        fputs("\tif(temp==(pObject*)-1)return (struct value_struct*)-1;\n",maccfp);
        fputs("\tfor(j=0;j<pClass_table_size;j++){\n",maccfp);
        fputs("\t\tif(strcmp(pClass_global[j],class_name)==0)break;\n",maccfp);
        fputs("\t}\n",maccfp);
        fputs("\tif(j==pClass_table_size)return (struct value_struct*)-1;\n",maccfp);
        fputs("\t/* casting not allowed */\n",maccfp);
        fputs("\t*((char **)assignptr) = (char*)((temp)->as(*global_pClass_ptr[j]));\n",maccfp);
        fputs("\treturn global_return_value;\n",maccfp);
        fputs("}\n",maccfp);
} create_dot_cxx(){
        create_method_set(); /* must be created first, fopen with "w" */
        create_constructor_cast_tables();
        create_attr_set();
        create_assign_set();
        create_cast_to_functions();
        create_cast_set();
        create_call_persistent_set();
        create_call_array_set();
        create_call_equal_set();
}
```

```
file_exist();
is_different();
mv_dot_cxx_to_scanh_dir()
{
char scanh_dir_file[100];
char temp_scanh_dir1_file[100];
char sys_command[100];
int i;

for(i=0;i<cs_index;i++){
                strcpy(scanh_dir_file,"scanh_dir/S_");
                strcat(scanh_dir_file,remove_agg_and_stuff(classes_scanned[i]));
                strcat(scanh_dir_file,".cxx");
                strcpy(temp_scanh_dir1_file,"temp_scanh_dir1/S_");
                strcat(temp_scanh_dir1_file,remove_agg_and_stuff(classes_scanned[i]));
                strcat(temp_scanh_dir1_file,".cxx");
                if(!file_exist(temp_scanh_dir1_file))continue;
                if((!file_exist(scanh_dir_file))||(is_different(scanh_dir_file,temp_scanh_dir1_file)))
                        strcpy(sys_command,"mv ");
                        strcat(sys_command,temp_scanh_dir1_file);
                        strcat(sys_command," ");
                        strcat(sys_command,scanh_dir_file);
                        system(sys_command);
                }
        }
} mv_vs_to_scanh_dir()
{
char scanh_dir_file[100];
char temp_scanh_dir1_file[100];
char sys_command[100];

strcpy(scanh_dir_file,"scanh_dir/");
        strcpy(temp_scanh_dir1_file,"temp_scanh_dir1/");
        strcat(scanh_dir_file,"value_struct.h");
        strcat(temp_scanh_dir1_file,"value_struct.h");
        if((!file_exist(scanh_dir_file))||(is_different(scanh_dir_file,temp_scanh_dir1_file))){
                        strcpy(sys_command,"mv ");
                        strcat(sys_command,temp_scanh_dir1_file);
                        strcat(sys_command," ");
                        strcat(sys_command,scanh_dir_file);
                        system(sys_command);
                }
}

/* break_parts_comma will break a string containing parts separated by comma
   and store them in an array of string buffer -- count = number of parts */
break_parts_comma(s,count,temp)
char *s;
int *count;
char temp[][50];
```

```c
{
char *t;
int j=0;
/*
        *count = 0;
*/
        t = s;
        if(strlen(s)==0)goto end_comma;
        while(*t!=0){
                if(*t!=','){
                        temp[*count][j++]=*t;
                }else{
                        temp[*count][j]=0;
                        (*count)++;
                        j=0;
                }
                t++;
        }
        temp[*count][j]=0;
        (*count)++;
end_comma : ;
} class_is_abstract(s)
char* s;
{
        int i;

for(i=0;i<bca_index;i++){
                if(strcmp(base_class_array[i]->class_name,s)==0){
                        return base_class_array[i]->is_abstract;
                }
        }
        return 0;
} set_bit(bitpos,set)
long bitpos;
char *set;
{
short bitmask;

bitmask = 1 << (bitpos% 8);
        *set = ((*set) | bitmask);
} create_integral_promotion_matrix(maccfp)
FILE* maccfp;
{
int i,j;
int bitpos=0;
char set=0;
```

```
char buf[12];
        fputs("int bt_index = ",maccfp);
        sprintf(buf,"%d",bt_index);
        fputs(buf,maccfp);
        fputs(";\n",maccfp);
        sprintf(buf,"%d",bt_index*bt_index/8+1);
        fputs("char integral_promotion_matrix[",maccfp);
        fputs(buf,maccfp);
        fputs("] = {\n",maccfp);
        for(i=0;i<bt_index;i++){
                for(j=0;j<bt_index;j++){
                        bitpos = i*bt_index+j;
                        if(can_cast(i,j)){
                                set_bit(bitpos,&set);
                        }
                        if(((bitpos+1)%8)==0){
                                sprintf(buf,"%d",set);
                                fputs(buf,maccfp);
                                fputs(", ",maccfp);
                                set = 0;
                                if((((bitpos/8)+1)%8)==0){
                                        fputs("\n",maccfp);
                                }
                        }
                }
        }
        fputs("};\n",maccfp);
}
```

```
/*

Copyright (c) 1990, Singapore Computer Systems Pte Ltd extern declarations for all global symbols used
            by CLASS SCANNER

*/ ifndef EXTERNH
define EXTERNH 1 include "symbol_entry.h"

define MAXARG 50
#define MAXMETHOD 7000
#define MAXATTRIBUTE 2000
#define MAXTYPE 2000
#define MAXDECLARATOR 500
define MAXFF 500 define KINDCLASS 0
define KINDTYPEDEF 1
#define KINDENUM 2
define MAXTABLE 113 define PRIVATE_M 0
define PROTECTED_M 1
define PUBLIC_M 2 extern int p;
extern FILE *koofp;
extern FILE *statep;
extern FILE *constp;

extern struct class_list{ /* need this to handle nested class */
        int class_key_class;
    char class_name[80];
    struct class_list *next;
};

extern struct base_class{
    char class_name[50];
    char base_name[150];
        int is_abstract;
};

extern ENTRY * entry_array[5000];
extern int entry_array_index;

extern struct argument_type{
    char *arg[MAXARG];
```

```
        int count;
            /* -1 if arg consists of ... only; if arg_list has arguments followed
               by ..., then count contains the number of arguments */
            int variable_arg;
};

extern struct friend_function{
    char* class_name;
    char* return_type;
    char* function_name;
    struct argument_type * arg;
};

extern struct friend_function *ff_array[MAXFF];
extern int ff_index;

extern char* basic_types[30];
extern bt_index;

/* data structure to store methods and attributes info */
extern char* classes_scanned[MAXTYPE];
extern int cs_index;
extern struct method_info{
        struct base_class* bc_ptr;
        char* method_name;
        char* return_type;
        struct argument_type* method_arguments;
        char extra;
        char access_spec;
};

extern methods_generated; /* incremented in create_call_method */
extern attr_generated; /* incremented in create_get_attribute */
extern classes_seen;
extern classes_generated;

extern struct attr_info{
        struct base_class* bc_ptr;
        char* attr_name;
        char* attr_type;
        char access_spec;
};

extern struct method_info* method_info_array[MAXMETHOD];
extern int mia_index;
extern struct attr_info* attr_info_array[MAXATTRIBUTE];
extern int aia_index;

extern struct base_class * base_class_array[MAXATTRIBUTE];
extern int bca_index;

extern struct method_or_attribute{
    char type[MAXTYPE];
```

```
        char** pointer_operator;
        char** declarator;
            int n; /* number of operators */
        char meth_or_att; /* m for method a for attribute */
            struct argument_type *arguments;
            int* function_pointer; /* array of int 1 if function ptr 0 otherwise */
};

extern char I[][100]; /* to store search path */
extern int I_index;
extern char D[][100]; /* to store -D defines */
extern int D_index;

#endif
```

```
/*

Copyright (c) 1990, Singapore Computer Systems Pte Ltd definition include file of ENTRY data structure
        describing a class, typedef or enum symbol found
        in the CLASS SCANNER symbol table.

*/ typedef struct {
        char* key;
        char* type;     /* for typedef only */
        short kind;             /* 0 for class; 1 for typedef; 2 for enum */
}ENTRY;
```

```
/*

Copyright (c) 1990, Singapore Computer Systems Pte Ltd make file for create_exp_ifile program.

*/
create_exp_ifile : create_exp_ifile.o lex.yy.o
        cc -g -o create_exp_ifile create_exp_ifile.o lex.yy.o -ll
create_exp_ifile.o : create_exp_ifile.c
        cc -g -o create_exp_ifile.o create_exp_ifile.c -c
lex.yy.o : lex.yy.c
        cc -g -o lex.yy.o lex.yy.c -c
lex.yy.c : create_exp_ifile.lex
        lex create_exp_ifile.lex
```

```
%{
/*

Copyright (c) 1990, Singapore Computer Systems Pte Ltd

Lexical Analyser for create_exp_ifile program.

*/
#include <sys/file.h>
#include <sys/types.h>
#include <sys/stat.h>
#undef input()
#undef output()
#undef unput()
extern FILE *ffp;
extern int p;
int quit=0;
int previous_c;
int present_c;
char *bufferptr=0;
char *cbuffer=-1;
%}
%%
class[ \t\n]+[^\{\;]+[\{\;]                 {
            fputs(yytext,ffp);
            if(yytext[yyleng-1]!=';'){
                        fputs("\npublic :\n",ffp);
            }
}
private[ \t\n]*\:                 {
}
public[ \t\n]*\:                  {
}
protected[ \t\n]*\:               {
}
\/\*    {
/* c comments */
        previous_c = input();
        while(!quit){
                present_c = input();
                if((present_c=='\/')&&(previous_c=='\*')){
                        quit=1;
                }
                previous_c=present_c;
        }
        quit=0;
}
\/\/[^\n]+[\n]  {
/* c++ comments // */
        }
```

```
[\01-\0177]        {
           fputs(yytext,ffp);
}
%%
input()
{
struct stat st;
static int buffercount=0;
int c;
int i;
if (buffercount==-1) return 0;
if (buffercount==0)
        {
        fstat(p,&st);
        cbuffer = malloc(st.st_size+100);
        c = read(p,cbuffer,st.st_size+10);
        if (c <= 0) return 0;
        buffercount = c;
        bufferptr = cbuffer;
        }
if (bufferptr >= (cbuffer + buffercount))
{
buffercount = -1;
free(cbuffer);
return 0;
}
c = *bufferptr++;
return(c);
} unput(c)
char c;
{
if (bufferptr && (bufferptr > cbuffer)) --bufferptr;
} output(c)
char c;
{
} yyerror()
{
     printf("error yytext = %s\n",yytext);

} yywrap()
{
     printf("create_expanded_ifile -- bye\n");
     return(1);
}
```

```
/*

Copyright (c) 1990, Singapore Computer Systems Pte Ltd main module for create_exp_ifile program.

create_exp_ifile is executed by the main
        module of the CLASS SCANNER.

call the lexical analyser to remove priviate,
        protected, and public declarations in every class
        definition and make every class publicy
        accessible.

*/
#include <stdio.h>
#include <fcntl.h>
extern yylex();
FILE *ffp;
int p;

main(argc,argv)
int argc;
char *argv[];
{
char buffer[100];
        if(argc!=2){
                printf("create_exp_ifile usage : create_exp_ifile filename\n");
                exit(1);
        }
        strcpy(buffer,argv[1]);
        buffer[strlen(argv[1])-1]=0; /* output file with trailing t */
        ffp = fopen(buffer,"w");
        p = open(argv[1],O_RDONLY);
        yylex();
        close(p);
        fclose(ffp);
}
```

```
/*

Copyright (c) 1990, Singapore Computer Systems Pte Ptd make file for the PATCH program.

*/
patch : patch.o lex.yy.o
        cc -g -o patch patch.o lex.yy.o -ll
patch.o : patch.c
        cc -g -o patch.o patch.c -c
lex.yy.o : lex.yy.c
        cc -g -o lex.yy.o lex.yy.c -c
lex.yy.c : patch.lex
        lex patch.lex
```

```c
/*
 * Copyright (c) 1990, Singapore Computer Systems Pte Ptd
 *
 *
 *
 * main module of PATCH program.
 *
 * patch c source files and remove special variable in local scope and replacing
 * it with global return variable.
 *
 *
 */
#include <stdio.h>
#include "patch.h"

/************************
 *       globals        *
 ************************/
FILE    *testfp;
struct static_func_info *sf_info[5000];
int     sf_info_index = 0;

main(argc, argv)
        int     argc;
        char    *argv[];
{
        char    wfile[100];

if (argc == 1) {
                yyin = stdin;
                yyout = stdout;
                testfp = fopen("testr", "w");
        } else if (argc == 2) {
                strcpy(wfile, "P_");
                strcat(wfile, argv[1]);
                yyin = fopen(argv[1], "r");
                yyout = fopen(wfile, "w");
                testfp = fopen("testr", "w");
        } else {
                fprintf(stderr, "scan2 usage : scan2 <filename>\n");
                exit(1);
        }
        yylex();
        fclose(testfp);
}
```

```c
#ifndef LEXMAIN2
define LEXMAIN2 struct static_func_info{
        char* func_name;
        char* in_file;
};

extern yylex();
extern FILE* yyin, * yyout;    /* lex.yy.c */ endif
```

```
%{
/* Copyright (c) 1990, Singapore Computer Systems Pte Ltd

Lexical Analyser of the PATCH program

*/ undef output()
extern FILE *testfp;
int i;
char c_name[100];
char buffer[100];
int j;
int pointer=0;
char* put_underscore();
is_basic_type();
char* get_union_name();
char* get_c_name();
char union_name[100];
%}
%%
\\*         {
            do_this2();
}
\\/[^\n]*\n         {
}
static[ \t\n]+[^\(\;]+\(([^\)]*\)[ \t\n]*\{                                              {
            fputs(yytext,yyout);
#if 0
            /* static functions with no arg */
            do_this(yytext);
#endif
}
static[ \t\n]+[^\(\;]+\(([^\)]*\)[ \t\n]*[^\;\(\)\=][^\(]*\{                              {
            fputs(yytext,yyout);
#if 0
            do_this(yytext);
#endif
}
union[ \t\n][^ \t\n]*[ \t\n]__[a-zA-Z]+[0-9]+__[0-9]+value_struct                         {
            fputs(yytext,yyout);
            strcpy(union_name,get_union_name(yytext));
}
__[a-zA-Z]+[0-9]+__[0-9]+value_struct            {
            fputs(union_name,yyout);
}
struct[ \t\n]+[A-Za-z_][A-Za-z0-9_\.]*[ \t\n]+[\*]*__1udomchanachok[^\;]+\;
            strcpy(c_name,get_c_name(yytext));
```

```
}
int[ \t\n]+[\*]*__1udomchanachok[^;]+\;                 {
        strcpy(c_name,get_c_name(yytext));
}
long[ \t\n]+[\*]*__1udomchanachok[^;]+\;                {
        strcpy(c_name,get_c_name(yytext));
}
short[ \t\n]+[\*]*__1udomchanachok[^;]+\;               {
        strcpy(c_name,get_c_name(yytext));
}
char[ \t\n]+[\*]*__1udomchanachok[^;]+\;                {
        strcpy(c_name,get_c_name(yytext));
}
float[ \t\n]+[\*]*__1udomchanachok[^;]+\;               {
        strcpy(c_name,get_c_name(yytext));
}
double[ \t\n]+[\*]*__1udomchanachok[^;]+\;              {
        strcpy(c_name,get_c_name(yytext));
}
unsigned[ \t\n]+int[ \t\n]+[\*]*__1udomchanachok[^;]+\;         {
        strcpy(c_name,get_c_name(yytext));
}
unsigned[ \t\n]+long[ \t\n]+[\*]*__1udomchanachok[^;]+\;            {
        strcpy(c_name,get_c_name(yytext));
}
unsigned[ \t\n]+short[ \t\n]+[\*]*__1udomchanachok[^;]+\;           {
        strcpy(c_name,get_c_name(yytext));
}
unsigned[ \t\n]+char[ \t\n]+[\*]*__1udomchanachok[^;]+\;            {
        strcpy(c_name,get_c_name(yytext));
}
unsigned[ \t\n]+[\*]*__1udomchanachok[^;]+\;            {
        strcpy(c_name,get_c_name(yytext));
}
__1udomchanachokG1[a-zA-Z_0-9.]*                        {
        /*
        if(c_name[strlen(c_name)-1]!='*'){
        */
                fputs("*((",yyout);
                fputs(c_name,yyout);
                fputs("*)assignptr",yyout);
        /*
        }else{
                fputs("*assignptr",yyout);
        }
        */
}
\&[ \t\n]*__1udomchanachokG1[a-zA-Z_0-9.]*              {
        fputs("(",yyout);
        fputs(c_name,yyout);
        fputs("*)",yyout);
        fputs("assignptr",yyout);
}
```

```
\&[ \t\n]*\#line[^n]*\n__1udomchanachokG1[a-zA-Z_0-9.]*              {
        fputs("(",yyout);
        fputs(c_name,yyout);
        fputs(")",yyout);
        fputs("assignptr",yyout);
}
__dt__[^\(]*\([ \t\n]*\&[ \t\n]*__1udomchanachokG1[^\;]*\;             {
        fputs("/*destructor removed*/",yyout);
}
^\n {
}
\#line[^\n]*\n          {
}
[\01-\0177]        {
        fputs(yytext,yyout);
}
%%
char* get_union_name(s)
char* s;
{
char a[10];
char b[10];
char union_name[25];
        sscanf(s,"%[^ \t\n] %[^ \t\n] %s",a,b,union_name);
        return union_name;
} char* get_c_name(s)
char* s;
{
        static char type[100];
        int i=0;
        int j=0;
        char* t;

t=s;
        while(strncmp(t,"__1udomchanachok",strlen("__1udomchanachok"))!=0){
                type[i++]=s[j++];
                t++;
        }
        type[i]=0;
        return type;
} is_basic_type(s)
char* s;
{
        if((strcmp(s,"int")==0)||
                (strcmp(s,"long")==0)||
                (strcmp(s,"short")==0)||
        (strcmp(s,"char")==0)||
        (strcmp(s,"float")==0)||
        (strcmp(s,"double")==0)||
```

```
            (strcmp(s,"unsigned long")==0)||
            (strcmp(s,"unsigned int")==0)||
            (strcmp(s,"unsigned short")==0)||
            (strcmp(s,"unsigned char")==0)||
            (strcmp(s,"unsigned")==0)){
                    return 1;
            }
            return 0;
}

/*
input()
{
        static int i=0;
        i = fgetc(p);
        if(i < 0)
                return (0);
        else{
                return(i);
                }
} unput(c)
char c;
{
            fseek(p,-sizeof(char),1);
#if 0
        ungetc(c,p);
#endif
}
*/ output(c)
char c;
{
} yyerror()
{
        fprintf(stderr,"error yytext = %s\n",yytext);
} yywrap()
{
        return(1);
} char *put_underscore(s)
char* s;
{
            int i;
            static char rs[100];
```

```
        for(i=0;i<strlen(s);i++){
                if(s[i]==' ')
                        rs[i] = '_';
                else
                        rs[i] = s[i];
        }
        rs[i]=0;
        return rs;
} write_decl(s)
char* s;
{
char* cptr;

cptr = s;
        while(*cptr != '\('){
                fputc(*cptr,yyout);
                cptr++;
        }
        fputs("\(\);\n",yyout);
} char* getFname(s)
char* s;
{
char* cptr;
static char r[1000];
int ri=0;

cptr = s;
        while(*cptr != '\('){
                r[ri++]=*cptr;
                cptr++;
        }
        r[ri]=0;
        while(r[--ri]==' ')r[ri]=0; /* remove trailing blanks */
        cptr = &r[strlen(r)];
        while((*cptr!=' ')&&(*cptr!='\*'))cptr--;
        cptr++;
        strcpy(r,cptr);
        return r;
} do_this(lyytext)
char* lyytext;
{
char yytextBuf[50000];
int kstop=0;
char casex=0;
int previous_c=0;
int present_c=0;
short left_cb=1;
```

```
        char* cptr;

strcpy(yytextBuf,lyytext);
                cptr = &yytextBuf[strlen(yytextBuf)];

while(lkstop){
                        casex = (char)input();
                        switch(casex){
                                case '\/':{
                                /* comments */
                                        casex=input();
                                        if(casex=='\*'){
                                                previous_c = input();
                                                while(1){
                                                        present_c = input();
                                                        if((present_c == '\/')&&(previous_c=='\*'))
                                                                break;
                                                        }
                                                        previous_c = present_c;
                                                }
                                        }else if(casex=='\/'){
                                                while(input()!='\n');
                                        }else{
                                                *cptr='\/';cptr++;
                                                *cptr=casex;cptr++;
                                        }
                                        break;
                                }
                                case '\"':{
                                        previous_c = '\"';
                                        *cptr=previous_c;cptr++;
                                        while(1){
                                                present_c = input();
                                                *cptr=present_c;cptr++;
                                                if((present_c == '\"')&&(previous_c!='\\')){
                                                        break;
                                                }
                                                previous_c = present_c;
                                        }
                                        break;
                                }
                                case '\'':{
                                        previous_c = '\'';
                                        *cptr=previous_c;cptr++;
                                        while(1){
                                                present_c = input();
                                                *cptr=present_c;cptr++;
                                                if((present_c == '\'')&&(previous_c!='\\')){
                                                        break;
                                                }
                                                previous_c = present_c;
                                        }
                                        break;
```

```
                        }
                        case '\#':{
                                while(input()!='\n');
                                break;
                        }
                        case '\{':{
                                *cptr='\{';cptr++;
                                left_cb++;
                                break;
                        }
                        case '\}':{
                                *cptr='\}';cptr++;
                                left_cb--;
                                if(left_cb==0)kstop=1;
                                break;
                        }
                        default:{
                                *cptr=casex;cptr++;
                                break;
                        }
                };
        }
        *cptr=0;
        fputs("/*compare-",testfp);
        fputs(getFname(lyytext),testfp);
        fputs("*/\n",testfp);
        fputs(yytextBuf,testfp);
        fputs("\n",testfp);
        write_decl(lyytext);
} do_this2()
{
int previous_c;
int present_c;

previous_c = input();
        while(1){
                present_c = input();
                if((present_c == '/')&&(previous_c=='*')){
                        break;
                }
                previous_c = present_c;
        }
}
```

CLASS SELECTOR

APPENDIX II

```
/*
Copyright (c) 1990, Singapore Computer Systems Pte Ltd make file for Class selector program.

use the useosc flag for VERSANT's C++
        library, else NIH library will be used.
*/
CCP = /usr/CC/sun4/CC FLAG = -g -c OBJECT = class_selector.o KPATH = -I/usr/local/osc/h -I../ENTRY_FUNCTIONS USEOSC = -Duseosc class_selector:     $(OBJECT)
        $(CCP) $(USEOSC) $(KPATH) -g -o class_selector $(OBJECT) -L/usr/local/osc/lib -L../EN
RY_FUNCTIONS -lOEF      -lcxxcls -losc -lm class_selector.o:           class_selector.cxx
        $(CCP) $(USEOSC) $(KPATH) $(FLAG) class_selector.cxx
```

```
/*

Copyright (c) 1990, Singapore Computer Systems Pte Ptd

Class selector program.

allows user to choose the classes for
                use by the the INTERACTIVE DISPATCHER
*/
#include <stdlib.h>
#include "Classinfo.h"
extern SortedCltn allclassinfo;

char *basic_types[30];
int bt_index=0;
char classes_not_interested[500][50];
int cni_index=0;
int global_max_index=0;

void allocate_copy(char** a,char* b,int* i)
{
        a[*i]=(char*)malloc(strlen(b)+1);
        strcpy(a[(*i)++],b);
} void store_basic_types(){
        /* always store void in first element of array; and start loop with
           i = 1 to prevent generating code like sizeof(void) */
        allocate_copy(basic_types,"void",&bt_index);
        allocate_copy(basic_types,"int",&bt_index);
        allocate_copy(basic_types,"long",&bt_index);
        allocate_copy(basic_types,"short",&bt_index);
        allocate_copy(basic_types,"char",&bt_index);
        allocate_copy(basic_types,"float",&bt_index);
        allocate_copy(basic_types,"double",&bt_index);
        allocate_copy(basic_types,"unsigned int",&bt_index);
        allocate_copy(basic_types,"unsigned long",&bt_index);
        allocate_copy(basic_types,"unsigned short",&bt_index);
        allocate_copy(basic_types,"unsigned char",&bt_index);
        allocate_copy(basic_types,"unsigned",&bt_index);
} in_classes_not_interested(char* s)
{
int i;
        for(i=0;i<cni_index;i++){
                if(strcmp(s,classes_not_interested[i])==0)return 1;
        }
        return 0;
```

}

```
void create_all_types(FILE* fptr)
{
int i;
int j=1;
char buff[30];
int index=0;
FILE* lfptr;

for(i=0;i<bt_index;i++){
                if(!in_classes_not_interested(basic_types[i]))
                        index++;
        }
        lfptr=fopen("arrayinfo","w");
        for(i=0;i<allclassinfo.size();i++){
                if(!in_classes_not_interested(AS(Classinfo,allclassinfo[i])->getname())){
                        index++;
                        sprintf(buff,"%d",i);
                        fputs(buff,lfptr);
                        fputs(" ",lfptr);
                        fputs(AS(Classinfo,allclassinfo[i])->getname(),lfptr);
                        fputs("\n",lfptr);
                }
        }
        fclose(lfptr);
        global_max_index=index;
        fputs("\nint all_index = ",fptr);
        sprintf(buff,"%d",index);
        fputs(buff,fptr);
        fputs(";\n",fptr);
        fputs("char all_types[",fptr);
        fputs(buff,fptr);
        fputs("][30] = {\n",fptr);

for(i=0;i<bt_index;i++){
                if(!in_classes_not_interested(basic_types[i])){
                        fputs("\"",fptr);
                        fputs(basic_types[i],fptr);
                        fputs("\"",fptr);
                        fputs(",",fptr);
                        if(j%5==0)fputs("\n",fptr);
                        j++;
                }
        }
        for(i=0;i<allclassinfo.size();i++){
                if(!in_classes_not_interested(AS(Classinfo,allclassinfo[i])->getname())){
                        fputs("\"",fptr);
                        fputs(AS(Classinfo,allclassinfo[i])->getname(),fptr);
                        fputs("\"",fptr);
                        fputs(",",fptr);
                        if(j%5==0)fputs("\n",fptr);
                        j++;
```

```
                    }
                }
                fputs("};\n\n",fptr);
} void create_sizeof_array()
{
FILE* fptr;
int i;
int j=0;
char buf[20];

fptr = fopen("DT3.cxx","w");
        fputs("#include \"expanded_ifile.h\"\n",fptr);
        fputs("int sizeof_array[",fptr);
        sprintf(buf,"%d",global_max_index);
        fputs(buf,fptr);
        fputs("] = {\n",fptr);
        fputs("sizeof(char*),",fptr);
        for(i=1;i<bt_index;i++){ /* start from 1 to skip sizeof(void) */
                if(lin_classes_not_interested(basic_types[i])){
                        fputs("sizeof(",fptr);
                        fputs(basic_types[i],fptr);
                        fputs(")",fptr);
                        fputs(",",fptr);
                        if(j%5==0)fputs("\n",fptr);
                        j++;
                }
        }
        for(i=0;i<allclassinfo.size();i++){
                if(lin_classes_not_interested(AS(Classinfo,allclassinfo[i])->getname())){
                        fputs("sizeof(",fptr);
                        fputs(AS(Classinfo,allclassinfo[i])->getname(),fptr);
                        fputs(")",fptr);
                        fputs(",",fptr);
                        if(j%5==0)fputs("\n",fptr);
                        j++;
                }
        }
        fputs("};\n\n",fptr);
        fclose(fptr);
} void replace_space_underscore(char* s)
{
int i;
        for(i=0;i<strlen(s);i++){
                if(s[i]==' ')s[i]='_';
        }
}
```

```c
void replace_aster_underscore(char* s)
{
int i;
	for(i=0;i<strlen(s);i++){
		if((s[i]=='*')||(s[i]=='&'))s[i]='_';
	}
} void create_assignfp(FILE* fptr)
{
int i;
int j=0;
char class_name[100];
int count;

count = (int)allclassinfo.size();
	for(i=0;i<bt_index;i++){
		if(!in_classes_not_interested(basic_types[i])){
			fputs("extern void* ",fptr);
			strcpy(class_name,basic_types[i]);
			replace_space_underscore(class_name);
			fputs(class_name,fptr);
			fputs("assign();\n",fptr);
		}
	}
	for(i=0;i<count;i++){
		if(!in_classes_not_interested(AS(Classinfo,allclassinfo[i])->getname())){
			fputs("extern void* ",fptr);
			fputs(AS(Classinfo,allclassinfo[i])->getname(),fptr);
			fputs("assign();\n",fptr);
		}
	}
	fputs("\tvoid* (*assignfp[])() = {\n",fptr);
	for(i=0;i<bt_index;i++){
		if(!in_classes_not_interested(basic_types[i])){
			strcpy(class_name,basic_types[i]);
			replace_space_underscore(class_name);
			fputs(class_name,fptr);
			fputs("assign",fptr);
			fputs(",",fptr);
			if(j%5==0)fputs("\n",fptr);
			j++;
		}
	}
	for(i=0;i<count;i++){
		if(!in_classes_not_interested(AS(Classinfo,allclassinfo[i])->getname())){
			fputs(AS(Classinfo,allclassinfo[i])->getname(),fptr);
			fputs("assign",fptr);
			fputs(",",fptr);
			if(j%5==0)fputs("\n",fptr);
			j++;
		}
	}
}
```

```
                fputs("};\n\n",fptr);
} void create_callmethodfp(FILE* fptr)
{
int i;
int j=0;
int count;
Classinfo* c;

count = (int)allclassinfo.size();
        fputs("struct value_struct* callmethod_failed(int){return (struct value_struct*)NO_METHOD
n",fptr);
        for(i=0;i<count;i++){
                c=AS(Classinfo,allclassinfo[i]);
                if(!in_classes_not_interested(c->getname())){
                    if(c->getmethodcount()!=0){
                            fputs("extern struct value_struct* call",fptr);
                            fputs(c->getname(),fptr);
                            fputs("method(int);\n",fptr);
                    }
                }
        }
        fputs("struct value_struct* (*callmethodfp[])(int) = {\n",fptr);
        for(i=0;i<count;i++){
                c=AS(Classinfo,allclassinfo[i]);
                if(!in_classes_not_interested(c->getname())){
                    if(c->getmethodcount()!=0){
                            fputs("call",fptr);
                            fputs(c->getname(),fptr);
                            fputs("method",fptr);
                            fputs(",",fptr);
                            if(j%2==0)fputs("\n",fptr);
                            j++;
                    }else{
                            fputs("callmethod_failed,",fptr);
                            if(j%2==0)fputs("\n",fptr);
                            j++;
                    }
                }
        }
        fputs("};\n\n",fptr);
} void create_getattrfp(FILE* fptr)
{
int i;
int j=0;
int count;
Classinfo* c;
```

```
            count = (int)allclassinfo.size();
            fputs("struct value_struct* getattr_failed(int i){return (struct value_struct*)NO_ATTR;}\n",fpt
            for(i=0;i<count;i++){
                    c=AS(Classinfo,allclassinfo[i]);
                    if(!in_classes_not_interested(c->getname())){
                        if(c->getattrcount()!=0){
                                fputs("extern struct value_struct* get",fptr);
                                fputs(c->getname(),fptr);
                                fputs("attr(int);\n",fptr);
                        }
                    }
            }
            fputs("struct value_struct* (*getattrfp[])(int) = {\n",fptr);
            for(i=0;i<count;i++){
                    c=AS(Classinfo,allclassinfo[i]);
                    if(!in_classes_not_interested(c->getname())){
                        if(c->getattrcount()!=0){
                                fputs("get",fptr);
                                fputs(c->getname(),fptr);
                                fputs("attr",fptr);
                                fputs(",",fptr);
                                if(j%2==0)fputs("\n",fptr);
                                j++;
                        }else{
                                fputs("getattr_failed,",fptr);
                                if(j%2==0)fputs("\n",fptr);
                                j++;
                        }
                    }
            }
            fputs("};\n\n",fptr);
    } no_argument_constructor(Classinfo* c)
{
int i;
methodinfo* m;
int methodcount=c->getmethodcount();

for(i=0;i<methodcount;i++){
                m = c->getmethod(i);
                if((strcmp(c->getname(),m->getname())==0)&&
                  (m->get_arguments_size() == 0))
                        {
                        if (m->get_extra()) return 0;
                        return 1;
                        }
        }
        return 0;
} void create_arrayfp(FILE* fptr)
{
```

```
int i;
char buffer[100];
int count;

/* arrayx2 */
        fputs("struct value_struct* arrayx2(int c1,int c2)\n",fptr);
        fputs("{\n",fptr);
        fputs("/* constructor with no arg not found */\n",fptr);
        fputs("\treturn (struct value_struct*)NO_CONSTRUCTOR_WO_ARG;\n",fptr);
        fputs("}\n\n",fptr);

count = (int)allclassinfo.size();
        for(i=0;i<count;i++){
            if(!in_classes_not_interested(AS(Classinfo,allclassinfo[i])->getname())){
                    if(no_argument_constructor(AS(Classinfo,allclassinfo[i]))){
                            fputs("extern struct value_struct* array",fptr);
                            fputs(AS(Classinfo,allclassinfo[i])->getname(),fptr);
                            fputs("(int,int);\n",fptr);
                    }
            }
        }
        fputs("\tstruct value_struct* (*arrayfp[])(int,int) = {\n",fptr);
        for(i=0;i<count;i++){
            if(!in_classes_not_interested(AS(Classinfo,allclassinfo[i])->getname())){
                    if(!no_argument_constructor(AS(Classinfo,allclassinfo[i]))){
                            fputs("arrayx2",fptr);
                    }else{
                            fputs("array",fptr);
                            fputs(AS(Classinfo,allclassinfo[i])->getname(),fptr);
                    }
                    fputs(",",fptr);
                    if((i+1)%6==0)fputs("\n",fptr);
            }
        }
        fputs("};\n\n",fptr);
} get_allclassinfo_i(char* cname)
{
int i;
        for(i=0;i<allclassinfo.size();i++){
                if(strcmp(cname,AS(Classinfo,allclassinfo[i])->getname())==0)
                        return i;
        }
        return -1;
} can_cast(int from,int to)
{
int superclass_count;
int newfrom=0;
char toclass[100];
Classinfo* c;
```

```
        int j;

superclass_count = AS(Classinfo,allclassinfo[from])->getsuperclasscount();
                if(superclass_count==0)return 0;
                for(j=0;j<superclass_count;j++){
                        c = AS(Classinfo,allclassinfo[from])->getsuperclass(j);
                        if(strcmp(c->getname(),AS(Classinfo,allclassinfo[to])->getname())==0)return 1;
                        newfrom = get_allclassinfo_i(c->getname());
                        if(can_cast(newfrom,to))return 1;
                }
}
void create_castfp(FILE* fptr)
{
int i;
int k=1;
int allclassinfo_size;

allclassinfo_size=(int)allclassinfo.size();
        for(i=0;i<allclassinfo_size;i++){
                if(!in_classes_not_interested(AS(Classinfo,allclassinfo[i])->getname())){
                        fputs("extern void* cast_from_",fptr);
                        fputs(AS(Classinfo,allclassinfo[i])->getname(),fptr);
                        fputs("(void*,int);\n",fptr);
                }
        }
        fputs("void* (*castfp[])(void*,int) = {\n",fptr);
        cout << allclassinfo_size << "\n";
        for(i=0;i<allclassinfo_size;i++){
                if(!in_classes_not_interested(AS(Classinfo,allclassinfo[i])->getname())){
                        fputs("cast_from_",fptr);
                        fputs(AS(Classinfo,allclassinfo[i])->getname(),fptr);
                        fputs(",",fptr);
                        if(k%3==0)fputs("\n",fptr);
                        k++;
                }
        }
        fputs("};\n\n",fptr);
} void create_persistentfp(FILE* fptr)
{
int i;
int j=0;
int allclass_size;
        allclass_size = (int)allclassinfo.size();
        for(i=0;i<allclass_size;i++){
                if(!in_classes_not_interested(AS(Classinfo,allclassinfo[i])->getname())){
                        fputs("extern struct value_struct* call",fptr);
                        fputs(AS(Classinfo,allclassinfo[i])->getname(),fptr);
                        fputs("persistent",fptr);
                        fputs("(int);\n",fptr);
                }
```

```
            }
            fputs("struct value_struct* (*persistentfp[])(int) = {\n",fptr);
            for(i=0;i<allclass_size;i++){
                    if(!in_classes_not_interested(AS(Classinfo,allclassinfo[i])->getname())){
                            fputs("call",fptr);
                            fputs(AS(Classinfo,allclassinfo[i])->getname(),fptr);
                            fputs("persistent",fptr);
                            fputs(",",fptr);
                            if(j%5==0)fputs("\n",fptr);
                            j++;
                    }
            }
            fputs("};\n\n",fptr);
} void create_equalfp(FILE* fptr)
{
int i;
int k=1;
int count;
char buffer[100];

count = (int)allclassinfo.size();
            for(i=0;i<bt_index;i++){
                    if(!in_classes_not_interested(basic_types[i])){
                            strcpy(buffer,basic_types[i]);
                            replace_space_underscore(buffer);
                            fputs("extern void equal",fptr);
                            fputs(buffer,fptr);
                            fputs("(void*,void*);\n",fptr);
                    }
            }
            for(i=0;i<count;i++){
                    if(!in_classes_not_interested(AS(Classinfo,allclassinfo[i])->getname())){
                            fputs("extern void equal",fptr);
                            fputs(AS(Classinfo,allclassinfo[i])->getname(),fptr);
                            fputs("(void*,void*);\n",fptr);
                    }
            }
            fputs("void (*equalfp[])(void*,void*) = {\n",fptr);
            for(i=0;i<bt_index;i++){
                    if(!in_classes_not_interested(basic_types[i])){
                            strcpy(buffer,basic_types[i]);
                            replace_space_underscore(buffer);
                            fputs("equal",fptr);
                            fputs(buffer,fptr);
                            fputs(",",fptr);
                            if(k%7==0)fputs("\n",fptr);
                            k++;
                    }
            }
            for(i=0;i<count;i++){
```

```
                    if(lin_classes_not_interested(AS(Classinfo,allclassinfo[i])->getname())){
                            fputs("equal",fptr);
                            fputs(AS(Classinfo,allclassinfo[i])->getname(),fptr);
                            fputs(",",fptr);
                            if(k%7==0)fputs("\n",fptr);
                            k++;
                    }
            }
            fputs("};\n",fptr);
} void set_bit(long bitpos,char* set)
{
short bitmask;

bitmask = 1 << (bitpos% 8);
        *set = ((*set) | bitmask);
} void create_standard_conversion_matrix(FILE* fptr)
{
int i;
int j;
int x,y;
int bitpos=0;
char set=0;
char buf[12];
int allclass_size;
int interested_nbt;

allclass_size = (int)allclassinfo.size();
            interested_nbt=global_max_index-bt_index;
            fputs("int allclass_size = ",fptr);
            sprintf(buf,"%d",allclass_size);
            fputs(buf,fptr);
            fputs(";\n",fptr);
            sprintf(buf,"%d",interested_nbt*interested_nbt/8+1);
            fputs("char standard_conversion_matrix[",fptr);
            fputs(buf,fptr);
            fputs("] = {\n",fptr);
            x=0;
            for(i=0;i<allclass_size;i++){
                if(lin_classes_not_interested(AS(Classinfo,allclassinfo[i])->getname())){
                    y=0;
                    for(j=0;j<allclass_size;j++){
                        if(lin_classes_not_interested(AS(Classinfo,allclassinfo[j])->getname())){
                            bitpos = x*interested_nbt+y;
                            if(can_cast(i,j)){
                                    set_bit(bitpos,&set);
                            }
                            if(((bitpos+1)%8)==0){  /* 8 bits have been seen */
```

```c
                    sprintf(buf,"%d",set);
                    fputs(buf,fptr);
                    fputs(", ",fptr);
                    set = 0;
                    if((((bitpos/8)+1)%15) == 0){
                            fputs("\n",fptr);
                    }
                }
            y++;
            }
        }
        x++;
      }
    }
    fputs("0};\n",fptr);
} void create_bt_standard_conversion_matrix(FILE* fptr)
{
int i;
int j;
int bitpos=0;
char set=0;
char buf[12];

sprintf(buf,"%d",bt_index*bt_index/8+1);
    fputs("char bt_standard_conversion_matrix[",fptr);
    fputs(buf,fptr);
    fputs("] = {\n",fptr);
    for(i=0;i<bt_index;i++){
        for(j=0;j<bt_index;j++){
            bitpos = i*bt_index+j;
            if((j==0)||(i==j)){
                    /* all ptrs can be cast to void* */
                    set_bit(bitpos,&set);
            }
            if(((bitpos+1)%8)==0){  /* 8 bits have been seen */
                    sprintf(buf,"%d",set);
                    fputs(buf,fptr);
                    fputs(", ",fptr);
                    set = 0;
                    if((((bitpos/8)+1)%15) == 0){
                            fputs("\n",fptr);
                    }
            }
        }
    }
    fputs("};\n",fptr);
} void create_castoperatorfp(FILE *fptr)
{
int i;
```

```
int k=1;
int count;

count = (int)allclassinfo.size();
        for(i=0;i<count;i++){
                if(!in_classes_not_interested(AS(Classinfo,allclassinfo[i])->getname())){
                        fputs("extern int operator_cast_from_",fptr);
                        fputs(AS(Classinfo,allclassinfo[i])->getname(),fptr);
                        fputs("(char*);\n",fptr);
                }
        }
        fputs("int (*castoperatorfp[])(char*) = {\n",fptr);
        for(i=0;i<count;i++){
                if(!in_classes_not_interested(AS(Classinfo,allclassinfo[i])->getname())){
                        fputs("operator_cast_from_",fptr);
                        fputs(AS(Classinfo,allclassinfo[i])->getname(),fptr);
                        fputs(",",fptr);
                        if(k%2==0)fputs("\n",fptr);
                        k++;
                }
        }
        fputs("};\n\n",fptr);
} void create_constructorfp(FILE *fptr)
{
int i;
int k=1;
int count;

count = (int)allclassinfo.size();
        for(i=0;i<count;i++){
                if(!in_classes_not_interested(AS(Classinfo,allclassinfo[i])->getname())){
                        fputs("extern int construct_from_",fptr);
                        fputs(AS(Classinfo,allclassinfo[i])->getname(),fptr);
                        fputs("(char*);\n",fptr);
                }
        }
        fputs("int (*constructorfp[])(char*) = {\n",fptr);
        for(i=0;i<count;i++){
                if(!in_classes_not_interested(AS(Classinfo,allclassinfo[i])->getname())){
                        fputs("construct_from_",fptr);
                        fputs(AS(Classinfo,allclassinfo[i])->getname(),fptr);
                        fputs(",",fptr);
                        if(k%2==0)fputs("\n",fptr);
                        k++;
                }
        }
        fputs("};\n\n",fptr);
} void create_DT_dot_cxx()
{
```

```c
FILE* fptr;

fptr = fopen("DT1.cxx","w");
        fputs("#include \"error_c.h\"\n",fptr);
        create_all_types(fptr);
        create_sizeof_array();
        create_assignfp(fptr);
        create_callmethodfp(fptr);
        create_getattrfp(fptr);
        create_arrayfp(fptr);
        create_castfp(fptr);
        create_persistentfp(fptr);
        create_equalfp(fptr);
        create_standard_conversion_matrix(fptr);
        create_bt_standard_conversion_matrix(fptr);
        create_castoperatorfp(fptr);
        create_constructorfp(fptr);
        fclose(fptr);
} void create_value_struct_h()
{
FILE* vsfp;
int i,j;
char var[100];
char type[100];
int count;

vsfp = fopen("value_struct.h","w");
fputs("#ifndef VALUE_STRUCT\n",vsfp);
fputs("#define VALUE_STRUCT\n",vsfp);

count = (int)allclassinfo.size();
for(i=0;i<count;i++){
        fputs("class ",vsfp);
        fputs(AS(Classinfo,allclassinfo[i])->getname(),vsfp);
        fputs(";\n",vsfp);
}
fputs("\n\nstruct value_struct {\n",vsfp);
fputs("\tint type;\n",vsfp);
fputs("\tint flag;\n",vsfp);
fputs("\tunion {\n",vsfp);
for(i=0;i<bt_index;i++){
    strcpy(var,basic_types[i]);
    strcpy(type,basic_types[i]);
    for(j=0;j<3;j++){
        fputs("\t\t",vsfp);
        fputs(type,vsfp);
        switch(j){
            case 0 : fputs("* V",vsfp);
                break;
            case 1 : fputs("** V1",vsfp);
```

```
                break;
        case 2 : fputs("**** V2",vsfp);
                break;
        }
        replace_space_underscore(var);
        replace_aster_underscore(var);
        fputs(var,vsfp);
        fputs(";\n",vsfp);
    }
}
for(i=0;i<count;i++){
    strcpy(var,AS(Classinfo,allclassinfo[i])->getname());
    strcpy(type,AS(Classinfo,allclassinfo[i])->getname());
    for(j=0;j<3;j++){
        fputs("\t\t",vsfp);
        fputs(type,vsfp);
        switch(j){
            case 0 : fputs("* V",vsfp);
                break;
            case 1 : fputs("** V1",vsfp);
                break;
            case 2 : fputs("**** V2",vsfp);
                break;
        }
        fputs(var,vsfp);
        fputs(";\n",vsfp);
    }
}
fputs("\t};\n",vsfp);
fputs("};\n",vsfp);
fputs("#endif\n",vsfp);
} in_string(char* source,char* target)   /* is string source in string target ? */
{
        int i,j,k;
        char *cptr;

j=strlen(source);
        k=strlen(target);
        cptr=target;
        for(i=0;i<k-j+1;i++){
                if(*cptr==source[0]){
                        if(strncmp(cptr,source,j)==0){
                                return 1;
                        }
                }
                cptr++;
        }
        return 0;
}
```

```
char* remove_string(char*,char*);
char* remove_agg_and_stuff(char* cn)
{
        if(in_string("_agg",cn)){
                return (remove_string("_agg",cn));
        }else if(in_string("_link_vstr",cn)){
        /* order of the following 2 statements matters */
                return (remove_string("_link_vstr",cn));
        }else if(in_string("_link",cn)){
                return (remove_string("_link",cn));
        }
        return cn;
} added_scan_make(char added[][100],int a_index,char* file_name)
{
int i;

for(i=0;i<a_index;i++){
                if(strcmp(added[i],file_name)==0)return 1;
        }
        return 0;
} void create_scan_make()
{
FILE* fptr;
int count;
int i;
char file_name[100];
char added[1000][100];
int added_index=0;

count = (int)allclassinfo.size();
        fptr = fopen("scan_make","w");
        fputs("all:           libOMF.a libDT.a\n\n",fptr);
        fputs("libOMF.a: ",fptr);
        for(i=0;i<count;i++){
                if(!in_classes_not_interested(AS(Classinfo,allclassinfo[i])->getname())){
                        strcpy(file_name,remove_agg_and_stuff(AS(Classinfo,allclassinfo[i])->
tname()));
                        if(!added_scan_make(added,added_index,file_name)){
                                fputs("P_",fptr);
                                fputs(file_name,fptr);
                                fputs(".o ",fptr);
                                strcpy(added[added_index++],file_name);
                        }
                }
        }
        fputs("\n",fptr);
        fputs("\tar clr libOMF.a ",fptr);
        added_index=0;
        for(i=0;i<count;i++){
```

```
                if(!in_classes_not_interested(AS(Classinfo,allclassinfo[i])->getname())){
                    strcpy(file_name,remove_agg_and_stuff(AS(Classinfo,allclassinfo[i])->
tname())));
                    if(!added_scan_make(added,added_index,file_name)){
                        fputs("P_",fptr);
                        fputs(file_name,fptr);
                        fputs(".o ",fptr);
                        strcpy(added[added_index++],file_name);
                    }
                }
        }
        fputs("\n\tranlib libOMF.a\n\n",fptr);
        fputs("libDT.a:\t DT1.o DT2.o DT3.o\n",fptr);
        fputs("\tar clr libDT.a DT1.o DT2.o DT3.o\n",fptr);
        fputs("\tranlib libDT.a\n",fptr);
        added_index=0;
        for(i=0;i<count;i++){
                if(!in_classes_not_interested(AS(Classinfo,allclassinfo[i])->getname())){
                    strcpy(file_name,remove_agg_and_stuff(AS(Classinfo,allclassinfo[i])->
tname())));
                    if(!added_scan_make(added,added_index,file_name)){
                        fputs("P_",fptr);
                        fputs(file_name,fptr);
                        fputs(".o: S_",fptr);
                        fputs(file_name,fptr);
                        fputs(".cxx\n",fptr);
                        fputs("\t- CC -Fc S_",fptr);
                        fputs(file_name,fptr);
                        fputs(".cxx |",fptr);
                        fputs(" patch > P_S_",fptr);
                        fputs(file_name,fptr);
                        fputs(".c\n",fptr);
                        fputs("\tcc -o P_",fptr);
                        fputs(file_name,fptr);
                        fputs(".o -g -c P_S_",fptr);
                        fputs(file_name,fptr);
                        fputs(".c\n\n",fptr);
                        strcpy(added[added_index++],file_name);
                    }
                }
        }
        fputs("DT1.o : DT1.cxx\n\tCC -g -c DT1.cxx\n\n",fptr);
        fputs("DT2.o : DT2.cxx\n\t- CC -Fc DT2.cxx |patch > P_DT2.c\n",fptr);
        fputs("\tcc -o DT2.o -g -c P_DT2.c\n\n",fptr);
        fputs("DT3.o : DT3.cxx\n\tCC -g -c DT3.cxx\n\n",fptr);
        fclose(fptr);
}

/* break_parts_comma will break a string containing parts separated by comma
   and store them in an array of string buffer -- count = number of parts */
void break_parts_comma(char* s,int* count,char temp[][50])
{
```

```
char *t;
int j=0;
/*
        *count = 0;
*/
        t = s;
        if(strlen(s)==0)goto end_comma;
        while(*t!=0){
                if(*t!=','){
                        temp[*count][j++]=*t;
                }else{
                        temp[*count][j]=0;
                        (*count)++;
                        j=0;
                }
                t++;
        }
        temp[*count][j]=0;
        (*count)++;
end_comma : ;
}

/* recursively find if base_name is a superclass of class_name */
base_is_base_name(char* class_name,char* base_name)
{
int i,j;
int count;
int ri;
int allclass_size=(int)allclassinfo.size();
Classinfo * c;

for(i=0;i<allclass_size;i++){
                c = AS(Classinfo,allclassinfo[i]);
                if(strcmp(class_name,c->getname())==0){
                        count=c->getsuperclasscount();
                        for(j=0;j<count;j++){
                                Classinfo* t;
                                t = c->getsuperclass(j);
                                if(strcmp(t->getname(),base_name)==0)return 1;
                                ri = base_is_base_name(t->getname(),base_name);
                                if (ri) return 1;
                        }
                        return 0;
                }
        }
        return 0;
} void update_classes_not_interested(char parents_interested[][50],int pi_index)
{
int i,j;
```

```
        short not_interested=1;
        int count;
        char cname[100];

count = (int)allclassinfo.size();
                for(i=0;i<count;i++){
                        strcpy(cname,AS(Classinfo,allclassinfo[i])->getname());
                        for(j=0;j<pi_index;j++){
                                if((base_is_base_name(cname,parents_interested[j]))
                                ||(strcmp(cname,parents_interested[j])==0)){
                                        not_interested = 0;
                                        break;
                                }
                        }
                        if(not_interested)
                           strcpy(classes_not_interested[cni_index++],cname);
                        not_interested = 1;
                }
        } void do_argv(int argc,char* argv[])
        {
        int i;
        char sbuf[1000];
        char parents_interested[50][50];
        int pi_index;

for(i=1;i<argc;i++){
                        if(argv[i][0] == '-'){
                                if(argv[i][1] == 'S'){
                                        strcpy(sbuf,remove_string("-S",argv[i]));
                                        pi_index=0;
                                        break_parts_comma(sbuf,&pi_index,parents_interested);
                                        update_classes_not_interested(parents_interested,pi_index)
                                }else if(argv[i][1] == 'N'){
                                        strcpy(sbuf,remove_string("-N",argv[i]));
                                        break_parts_comma(sbuf,&cni_index,classes_not_interested
                                }else{
                                        printf("unknown flag -%c used\n",argv[i][1]);
                                }
                        }
                }
        } int bca_index = 0;
        int all_index = 0;
        char integral_promotion_matrix[]={0};
        char standard_conversion_matrix[]={0};
        allow_cast_or_construct(int a ,int b, char* x) { }
        int allow_cast(int a,int b,int c,char* d) { }
        int get_typei(char* x) { }
        char* get_type(int x) { }
```

```
main(int argc,char* argv[])
{
int initialized;

initialized = Classinfo::init("ma_list");
        if(!initialized){printf("error in Classinfo::init\n");exit(1);}
        do_argv(argc,argv);
        store_basic_types();
        create_DT_dot_cxx();
        create_value_struct_h();
        create_scan_make();
}
```

OBJECT HANDLER

APPENDIX III

```
/*
Copyright (c) 1990, Singapore Computer Systems Pte Ltd make file for Object Handler's entry functions the useosc flag is for VERSANT's C++ library.
    If flag is not specified, NIH C++ library is used.
*/
CCP = /usr/CC/sun4/CC FLAG = -g -c OBJECT = entry_functions.o Classinfo.o KPATH = -I/usr/local/osc/h USEOSC = -Duseosc libOEF.a:       entry_functions.o Classinfo.o
        ar cr libOEF.a entry_functions.o Classinfo.o
        ranlib libOEF.a entry_functions.o:      entry_functions.cxx Classinfo.h
        $(CCP) $(USEOSC) $(KPATH) $(FLAG) entry_functions.cxx Classinfo.o:    Classinfo.cxx Classinfo.h
        $(CCP) $(USEOSC) $(KPATH) $(FLAG) Classinfo.cxx
```

```
/*
 * Copyright (c) 1990, Singapore Computer Systems Pte Ltd
 *
 *
 *
 * Class definition file of Classinfo class
 *
 * useosc flag for VERSANT's C++ library, else NIH C++ library is used.
 *
 */
#define STRCPY(dest,source) strcpy(dest=malloc(strlen(source)+1),source)
#define PRIVATE_M 0
define PROTECTED_M 1
define PUBLIC_M 2
#ifndef useosc
#define AS(class,coll) ((class *)coll)
#include <String.h>
#include <SortedCltn.h>
#else
#include <cxxcls/string.h>
#include <cxxcls/sortedcl.h>
#include <cxxcls/orderedc.h>
#include "Classinfo.r1"
#include "attrinfo.r1"
#include "methodinfo.r1"
#endif
extern      "C" {
        char    *malloc(unsigned);
        void    free(char *);
}
#include <libc.h>
struct value_struct;
extern struct cast_info {
        int     type;
        char    type_of_conversion;
        //c = constructor t = cast i = integral promotion s = standard conversion e = exact 1
tch
};

class       attrinfo;
class       Classinfo:public Object {
        char        *name;
        SortedCltn  attr_collection;
        SortedCltn  superclass_collection;
        SortedCltn  subclass_collection;
        SortedCltn  method_collection;
        OrderedCltn attr_dependencies;
        OrderedCltn method_dependencies;
#ifdef useosc
        public:
        DECLARE_NIH_PERSISTENCE(Classinfo);
    virtual o_4b   compare(const Object & a) const {
            return strcmp(getname(), (AS(Classinfo, &a)->getname()));
```

```
                    }
#else
                    DECLARE_MEMBERS(Classinfo);
                    protected:
                    virtual void storer(OIOofd &) const {
     };
     virtual void    storer(OIOout &) const {
     };
                    public:
     void           deepenShallowCopy() {
     }
     void           dumpOn(ostream & strm = cerr) const {}
     unsigned hash() const {return 0;
     }
                    isEqual(const Object & a) const {
                    return 1;
     }
     void           printOn(ostream & strm) const {
     }
     virtual int    compare(const Object & a) const {
                    return strcmp(getname(), (AS(Classinfo, &a)->getname()));
                    }
endif Classinfo(char *name);
     char           *getname() {
                    return name;
     }
                    ~Classinfo();
     void           addattrdep(String type);
     int            getattrdepcount() {
                    return attr_dependencies.size();
     };
     String         *getattrdep(int i) {
                    return AS(String, attr_dependencies[i]);
     };
     void           addmethoddep(String type, String arg[], int argc);
     String         *getmethoddep(int i) {
                    return AS(String, method_dependencies[i]);
     };
     int            getmethoddepcount() {
                    return method_dependencies.size();
     };
     void           addattr(char *attrname, char *attrtype, char *access_spec, int indexpos);
     //add an attrinfo to this classinfo
                    void      addsuperclass(char *superclassname);
     void           addmethod(char *mname,char extra_flag, char *mtype, char *access_spec, int
dexpos, int constructor_index, String arg[], int argc);
     methodinfo     *getmethod(int i) {
                    return (AS(methodinfo, method_collection[i]));
     }
     attrinfo       *getattr(int i) {
                    return (AS(attrinfo, attr_collection[i]));
```

```
        }
        int     getmethodcount() {
                return (method_collection.size());
        }
        int     getattrcount() {
                return (attr_collection.size());
        }
        Classinfo  *getsuperclass(int i) {
                return (AS(Classinfo, superclass_collection[i]));
        }
        int     getsuperclasscount() {
                return (superclass_collection.size());
        }
        static int   getattrindex(char *classname, char *attrname, char *new_classname);
        static int   getmethodindex(char *classname, char *methodname, char *methodtype, stru‹
cast_info * argtypes, int argc, char *new_classname, short *exact_match, int *cindex);
        static int   recursive_find_exact(char *classname, char *methodname, char *methodtype,
ruct cast_info * argtypes, int argc, char *new_classname, int *cindex);
        static int   recursive_find_converted(char *classname, char *methodname, char *methodt
e, struct cast_info * argtypes, int argc, char *new_classname, int *cindex);
        static Classinfo *search(const char *name);
        void    printall();
        void    printderive();
        void static  printclasses();
        void    printoneclass(int level);
        int static  countsuperclass(Classinfo * objclass);
        int static  init(char *filename);
        friend int  unique_pcaster(char *, char *, int);
};

class    attrinfo:public Object {
        friend    Classinfo;
        char      *name;
        char      *attrtype;
        char      ppp;           /* private, public, protected */
        int       indexpos;
#ifdef useosc
        public:
        DECLARE_NIH_PERSISTENCE(attrinfo);
        virtual o_4b  compare(const Object & a) const {
                return strcmp(getname(), (AS(attrinfo, &a)->getname()));
        }
#else
        DECLARE_MEMBERS(attrinfo);
        protected:
        virtual void storer(OIOofd &) const {
};
        virtual void storer(OIOout &) const {
};
        public:
        void    deepenShallowCopy() {
        }
        void    dumpOn(ostream & strm = cerr) const {}
```

```
            unsigned hash() const {return 0;
            }
                        isEqual(const Object & a) const {
                        return 1;
            }
            void        printOn(ostream & strm) const {
            }
            virtual int  compare(const Object & a) const {
                        return strcmp(getname(), (AS(attrinfo, &a)->getname()));
            }
endif
                        attrinfo(char *aname, char *atype, char access_spec, int ipos) {
                        STRCPY(name, aname);
                        STRCPY(attrtype, atype);
                        ppp = access_spec;
                        indexpos = ipos;
            }
            ~attrinfo() {
            };
            char        *getname() {
                        return name;
            }
            char        *getattrtype() {
                        return attrtype;
            }
            char        getppp() {
                        return ppp;
            }
};

class       methodinfo:public Object {
            friend      Classinfo;
            char        *name;
            char        *methodtype;
            char        ppp;            /* private, public, protected */
            char              extra;
            int         indexpos;
            int         constructor_index;
            int         arguments_size;
            char        **arguments;
#ifdef useosc
            public:
            DECLARE_NIH_PERSISTENCE(methodinfo);
            virtual o_4b  compare(const Object & a) const {
                        return strcmp(getname(), AS(methodinfo, &a)->getname());
            }
#else
                        DECLARE_MEMBERS(methodinfo);
                        protected:
                        virtual void storer(OIOofd &) const {
};
            virtual void  storer(OIOout &) const {
```

```
};
            public:
    void        deepenShallowCopy() {
    }
    void        dumpOn(ostream & strm = cerr) const {}
    unsigned hash() const {return 0;
    }
            isEqual(const Object & a) const {
                return 1;
    }
    void        printOn(ostream & strm) const {
    }
    virtual int compare(const Object & a) const {
                return strcmp(getname(), AS(methodinfo, &a)->getname());
    }
endif
            methodinfo(char *mname,char extra_flag, char *mtype, char access_spec, int ipc
int cpos, int argc) ;
    ~methodinfo() {
    };
    char        *getname() {
                return name;
    }
    char        *getmethodtype() {
                return methodtype;
    }
    char        getppp() {
                return ppp;
    }
    int         get_arguments_size() {
                return arguments_size;
    }
    char        **get_arguments() {
                return arguments;
    }
    char                get_extra() {
                return extra;
    }
    int         converted_match(int count, struct cast_info * other_arg_type);
    int         exact_match(int count, struct cast_info * other_arg_type);
};
#ifdef useosc
#include "Classinfo.r2"
#include "attrinfo.r2"
#include "methodinfo.r2"
#endif
```

```
/*
 * Copyright (c) 1990, Singapore Computer Systems Pte Ltd
 *
 *
 * Classinfo class.
 *
 * keep class information in memory for OBJECT HANDLER's references.
 *
 * perform argument matching and conversion of class methods maintain by
 * Classinfo.
 *
 * useosc flag for VERSANT's C++ library, else NIH C++ library is used.
 */ include "Classinfo.h"
ifdef useosc
IMPLEMENT_NIH_PERSISTENCE(Classinfo);
IMPLEMENT_NIH_PERSISTENCE(attrinfo);
IMPLEMENT_NIH_PERSISTENCE(methodinfo);
Classinfo::Classinfo(Activate & a)
{
}
methodinfo::methodinfo(char *mname,char extra_flag, char *mtype, char access_spec, int ipos, int c|
s, int argc) {
          STRCPY(name, mname);
          STRCPY(methodtype, mtype);
          ppp = access_spec;
          indexpos = ipos;
          extra = extra_flag;
          constructor_index = cpos;
          arguments_size = 0;
          arguments = (char **) malloc(argc * sizeof(char *));
     } methodinfo::methodinfo(Activate & a)
{
}
attrinfo::attrinfo(Activate & a)
{
}
#include "Classinfo.d"
#include "attrinfo.d"
#include "methodinfo.d"
#else
#define THIS attrinfo
#define BASE Object
#define BASE_CLASSES Object::desc()
#define MEMBER_CLASSES
define VIRTUAL_BASE_CLASSES DEFINE_CLASS(attrinfo, 1, "$Header$", NULL, NULL);
attrinfo: :attrinfo(OIOin & strm)
```

```
{
}
attrinfo: :attrinfo(OIOifd & fd)
{
}
#undef THIS
#define THIS classinfo
DEFINE_CLASS(Classinfo, 1, "$Header$", NULL, NULL);
Classinfo: :Classinfo(OIOin & strm)
{
}
Classinfo: :Classinfo(OIOifd & fd)
{
}
#undef THIS
#define THIS methodinfo
DEFINE_CLASS(methodinfo, 1, "$Header$", NULL, NULL);
methodinfo: :methodinfo(OIOin & strm)
{
}
methodinfo: :methodinfo(OIOifd & fd)
{
} endif ifndef VALUE_STRUCT
define VALUE_STRUCT
struct value_struct {
        int     type;
        int     flag;
        void    *Vvoid;
};
#endif
extern int    bt_index;
extern int    all_index;
extern char   integral_promotion_matrix[];
extern char   standard_conversion_matrix[];
extern int    allow_cast(int, int, int, char *);
extern int    get_typei(char *);
extern        allow_cast_or_construct(int, int, char *);

char* remove_ampersand(char* s) /* s remain unchanged */
{
        int i,j=0;
        static char buff[100];

for(i=0;i<strlen(s);i++){
                if(s[i]!='&'){
                        buff[j++]=s[i];
                }
        }
        buff[j]=0;
```

```c
            return buff;
}

/* remove string rs from s ; rs,s remain unchanged*/
char* remove_string(char* rs,char* s)
{
    int rsi, si, i, j=0, k=0;
    static char rstring[1000];
    char* t;

t=s;
    rsi=strlen(rs);
    si=strlen(s);
    for(i=0;i<si;i++){
        if(*t==rs[0]){
            if(strncmp(t,rs,rsi)==0){
                for(j=0;j<rsi;j++)t++;
            }
        }
        rstring[k++]=*t;
        t++;
    }
    rstring[k]=0;
    return rstring;
} char* pure_type1(char* s)   /*s remain unchanged */
{
static char rstring[100];
char buf0[100];
char buf1[100];

strcpy(buf0,remove_string("const ",s));
        strcpy(buf1,remove_string("const",buf0));
        strcpy(buf0,remove_ampersand(buf1));
        if(strlen(buf0)==0){
                strcpy(rstring,"int");
        }else{
                strcpy(rstring,buf0);
        }
        return rstring;
} void remove_asterisk(char* s)
{
int i;

for(i=strlen(s);i>0;i--)
        {
                if((s[i]=='*')||(s[i]=='(')||(s[i]==')'))s[i]=0;
        }
}
```

```c
void remove_init(char* );/* remove_init changes s */ char* pure_type2(char* s)  /* s remain unchanged */
{
static char rstring[100];
char temp1[100];
char temp3[100];
int j=0;

strcpy(temp3,remove_string("const ",s));
        strcpy(temp1,remove_string("auto ",temp3));
        strcpy(temp3,remove_string("register ",temp1));
        strcpy(temp1,remove_string("static ",temp3));
        strcpy(temp3,remove_string("extern ",temp1));
        strcpy(temp1,remove_string("const",temp3));
        strcpy(temp3,remove_string("auto",temp1));
        strcpy(temp1,remove_string("register",temp3));
        strcpy(temp3,remove_string("static",temp1));
        strcpy(temp1,remove_string("extern",temp3));
        strcpy(temp3,remove_string("inline ",temp1));
        strcpy(temp1,remove_string("virtual ",temp3));
        strcpy(temp3,remove_string("friend ",temp1));
        strcpy(temp1,remove_string("inline",temp3));
        strcpy(temp3,remove_string("virtual",temp1));
        strcpy(temp1,remove_string("friend",temp3));
        remove_init(temp1);
        strcpy(temp3,remove_ampersand(temp1));
        remove_asterisk(temp3);
        if(strcmp(temp3,"")==0){
                strcpy(rstring,"int");
        }else{
                for(j=strlen(temp3)-1;j>=0;j--){ /* remove trailing blanks */
                        if(temp3[j]==' ')temp3[j]=0;
                        else break;
                }
                strcpy(rstring,temp3);
        }
        return rstring;
} void remove_init(char* s) /* remove_init changes s */
{
int i;
        for(i=0;i<strlen(s);i++){
                if(s[i]=='='){
                        s[i]=0;
                        break;
                }
        }
} int     methodinfo::
```

```
exact_match(int count, struct cast_info * other_arg_type)
{
        char     buffer_type[100];
        int      i;

if (count != this->arguments_size)
                if ((count + 1) != (this->arguments_size))
                        return 0;
        if (count == (this->arguments_size - 1)) {
                if (strcmp(this->arguments[(this->arguments_size - 1)], "...") != 0)
                        return 0;
        }
        for (i = 0; i < count; i++) {
                strcpy(buffer_type, pure_type1(this->arguments[i]));
                remove_init(buffer_type);
                if (other_arg_type[i].type != get_typei(buffer_type)) {
                        return 0;
                }
        }
        for (i = 0; i < count; i++) {
                other_arg_type[i].type_of_conversion = 'e';
        }
        return 1;
}
int     methodinfo::
converted_match(int count, struct cast_info * other_arg_type)
{
        char     buffer_type[100];
        int      i;
        int      classi, newclassi;
        struct cast_info *newtypei;
        char     tc;

if (count != this->arguments_size)
                if ((count + 1) != (this->arguments_size))
                        return 0;
        if (count == (this->arguments_size - 1)) {
                if (strcmp(this->arguments[(this->arguments_size - 1)], "...") != 0)
                        return 0;
        }
        newtypei = (struct cast_info *) malloc(count * sizeof(struct cast_info));
        for (i = 0; i < count; i++) {
                strcpy(buffer_type, pure_type1(this->arguments[i]));
                remove_init(buffer_type);
                if (other_arg_type[i].type != get_typei(buffer_type)) {
                        classi = other_arg_type[i].type / 3;
                        newclassi = get_typei(buffer_type) / 3;
                        if (((other_arg_type[i].type) < 36)
                           && ((other_arg_type[i].type % 3) == 0)) {
                                /*
                                 * if basic types and no star -- integral
                                 * promotion
                                 */
```

```
                            if (allow_cast(classi, newclassi, bt_index, integral_promotion
matrix)) {
                                    newtypei[i].type = get_typei(buffer_type);
                                    newtypei[i].type_of_conversion = 'i';
                            } else {
                                    free((char *) newtypei);
                                    return 0;
                            }
                    } else {
                            /*
                             * standard_conversions -- ex: derived* to
                             * base*
                             */
                            if (allow_cast(classi, newclassi, all_index, standard_conversi
n_matrix)) {
                                    newtypei[i].type = get_typei(buffer_type);
                                    newtypei[i].type_of_conversion = 's';
                            } else if (
                                    allow_cast_or_construct(other_arg_type[i].type, 
t_typei(buffer_type), &tc)) {
                                    newtypei[i].type = get_typei(buffer_type);
                                    newtypei[i].type_of_conversion = tc;
                            } else {
                                    free((char *) newtypei);
                                    return 0;
                            }
                    }
            } else {
                    newtypei[i].type = other_arg_type[i].type;
                    newtypei[i].type_of_conversion = 'e';
            }
    }
    for (i = 0; i < count; i++) {
            other_arg_type[i].type = newtypei[i].type;
            other_arg_type[i].type_of_conversion = newtypei[i].type_of_conversion;
    }
    free((char *) newtypei);
    return 1;
} int
iccfindIndexofC(SortedCltn & contents, char *key)
{
        int     l = 0;
        int     u = contents.size() - 1;
        int     m = 0;

if (u < 0) {
                return -1;
        }
        if (strcmp(key, AS(Classinfo, contents[0])->getname()) < 0)
                return -1;
        while (l <= u) {
```

```
                m = (l + u) >> 1;
                if (strcmp(key, AS(Classinfo, contents[m])->getname()) > 0)
                        l = m + 1;
                else if (strcmp(key, AS(Classinfo, contents[m])->getname()) == 0) {
                        l = m - 1;
                        while (l >= 0) {
                                if (strcmp(key, AS(Classinfo, contents[l])->getname()) != 0) {
                                        return l + 1;
                                }
                                l--;
                        }
                        return 0;
                } else
                        u = m - 1;
        } return -1;
}
int
iccfindIndexofA(SortedCltn & contents, char *key)
{
        int     l = 0;
        int     u = contents.size() - 1;
        int     m = 0;

if (u < 0) {
                return -1;
        }
        if (strcmp(key, AS(attrinfo, contents[0])->getname()) < 0)
                return -1;
        while (l <= u) {
                m = (l + u) >> 1;
                if (strcmp(key, AS(attrinfo, contents[m])->getname()) > 0)
                        l = m + 1;
                else if (strcmp(key, AS(attrinfo, contents[m])->getname()) == 0) {
                        l = m - 1;
                        while (l >= 0) {
                                if (strcmp(key, AS(attrinfo, contents[l])->getname()) != 0) {
                                        return l + 1;
                                }
                                l--;
                        }
                        return 0;
                } else
                        u = m - 1;
        } return -1;
}
int
iccfindIndexofM(SortedCltn & contents, char *key)
{
        int     l = 0;
```

```
        int     u = contents.size() - 1;
        int     m = 0;

if (u < 0) {
                return -1;
        }
        if (strcmp(key, AS(methodinfo, contents[0])->getname()) < 0)
                return -1;
        while (l <= u) {
                m = (l + u) >> 1;
                if (strcmp(key, AS(methodinfo, contents[m])->getname()) > 0)
                        l = m + 1;
                else if (strcmp(key, AS(methodinfo, contents[m])->getname()) == 0) {
                        l = m - 1;
                        while (l >= 0) {
                                if (strcmp(key, AS(methodinfo, contents[l])->getname()) != 0)
                                        return l + 1;
                                }
                                l--;
                        }
                        return 0;
                } else
                        u = m - 1;
        } return -1;
}
int
icc_split(const char *a, String b[], int maxcount, char delimiter)
{
        int     i = 0;
        char    s[1000];
        int     j = 0;
        while (*a != 0) {
                if (*a != delimiter) {
                        s[j++] = *a++;
                        continue;
                }
                s[j] = 0;
                j = 0;
                b[i] = s;
                if (i++ >= maxcount)
                        return i;
                a++;
        }
        if (j != 0) {
                s[j] = 0;
                b[i++] = s;
        }
        return i;
}

SortedCltn    allclassinfo;
```

```
Classinfo::Classinfo(char *n)
{
        STRCPY(name, n);
        attr_collection.removeAll();
        superclass_collection.removeAll();
        subclass_collection.removeAll();
        method_collection.removeAll();
        attr_dependencies.removeAll();
        method_dependencies.removeAll();
        allclassinfo.add(*this);
}
Classinfo::~Classinfo()
{
}
void    Classinfo::
addattrdep(String type)
{
        char      temp[100];
        String    ptype;
        int       count;
        String    *x;
        int       i = 0;

strcpy(temp, pure_type2((char *) type));
        ptype = temp;
        count = this->attr_dependencies.size();
        for (i = 0; i < count; i++) {
                x = AS(String, this->attr_dependencies[i]);
                if (ptype == (*x))
                        break;
        }
        if (i == count) {
                if ((strcmp(temp, "void") == 0) || (strcmp(temp, "int") == 0) ||
                    (strcmp(temp, "long") == 0) || (strcmp(temp, "short") == 0) ||
                    (strcmp(temp, "char") == 0) || (strcmp(temp, "float") == 0) ||
                    (strcmp(temp, "double") == 0) || (strcmp(temp, "unsigned") == 0) ||
                    (strcmp(temp, "unsigned int") == 0) || (strcmp(temp, "unsigned long") == 0) ||
                    (strcmp(temp, "unsigned char") == 0) || (strcmp(temp, "unsigned short") == 0))
                } else {
                        String    *s = new String(temp);
                        this->attr_dependencies.add(*s);
                }
        }
}
void    Classinfo::
addmethoddep(String type, String arg[], int argc)
{
        char      temp[100];
        String    ptype;
        int       count;
        int       i, j;
        String    *x;
```

```
            strcpy(temp, pure_type2((char *) type));
            ptype = temp;
            count = this->method_dependencies.size();
            for (j = 0; j < count; j++) {
                    x = AS(String, this->method_dependencies[j]);
                    if (ptype == (*x))
                            break;
            }
            if (j == count) {
                    if ((strcmp(temp, "void") == 0) || (strcmp(temp, "int") == 0) ||
                        (strcmp(temp, "long") == 0) || (strcmp(temp, "short") == 0) ||
                        (strcmp(temp, "char") == 0) || (strcmp(temp, "float") == 0) ||
                        (strcmp(temp, "double") == 0) || (strcmp(temp, "unsigned") == 0) ||
                        (strcmp(temp, "unsigned int") == 0) || (strcmp(temp, "unsigned long") == 0) ||
                        (strcmp(temp, "unsigned char") == 0) || (strcmp(temp, "unsigned short") == 0))
                    } else {
                            this->method_dependencies.add(*(new String(temp)));
                    }
            }
    }
    for (i = 0; i < argc; i++) {
            if (strcmp(arg[i], "...") != 0) {
                    strcpy(temp, pure_type2((char *) arg[i]));
                    ptype = temp;
                    for (j = 0; j < count; j++) {
                            x = AS(String, this->method_dependencies[j]);
                            if (ptype == (*x))
                                    break;
                    }
                    if (j == count) {
                            if ((strcmp(temp, "void") == 0) || (strcmp(temp, "int") == 0) ||
                                (strcmp(temp, "long") == 0) || (strcmp(temp, "short") == 0)
                                (strcmp(temp, "char") == 0) || (strcmp(temp, "float") == 0)
                                (strcmp(temp, "double") == 0) || (strcmp(temp, "unsigned"
= 0) ||
                                (strcmp(temp, "unsigned int") == 0) || (strcmp(temp, "unsig
ed long") == 0) ||
                                (strcmp(temp, "unsigned char") == 0) || (strcmp(temp, "uns
ned short") == 0)) {
                            } else {
                                    this->method_dependencies.add(*(new String(tem
));
                            }
                    }
            }
    }
}
void    Classinfo::
addattr(char *attrname, char *attrtype, char *access_spec, int indexpos)
{
        attrinfo    *a;
        if (strcmp(access_spec, "private") == 0) {
                a = new attrinfo(attrname, attrtype, PRIVATE_M, indexpos);
        } else if (strcmp(access_spec, "public") == 0) {
```

```
                    a = new attrinfo(attrname, attrtype, PUBLIC_M, indexpos);
            } else if (strcmp(access_spec, "protected") == 0) {
                    a = new attrinfo(attrname, attrtype, PROTECTED_M, indexpos);
            } else {
                    printf("error in Classinfo::addattr\n");
            }
            attr_collection.add(*a);
}
void      Classinfo::
addsuperclass(char *superclassname)
{
            Classinfo    *a = search(superclassname);
            if (!a)
                    a = new Classinfo(superclassname);
            superclass_collection.add(*a);
            a->subclass_collection.add(*this);
}
void      Classinfo::
addmethod(char *mname, char extra_flag,char *mtype, char *access_spec, int indexpos, int construc
r_index, String arg[], int argc)
{
            methodinfo   *a;
            if (strcmp(access_spec, "private") == 0) {
                    a = new methodinfo(mname, extra_flag,mtype, PRIVATE_M, indexpos, construc
_index, argc);
            } else if (strcmp(access_spec, "public") == 0) {
                    a = new methodinfo(mname, extra_flag,mtype, PUBLIC_M, indexpos, constructc
index, argc);
            } else if (strcmp(access_spec, "protected") == 0) {
                    a = new methodinfo(mname, extra_flag,mtype, PROTECTED_M, indexpos, cons
uctor_index, argc);
            } else {
                    printf("error in Classinfo::addmethod\n");
            }
            method_collection.add(*a);
            for (a->arguments_size = 0; a->arguments_size < argc; a->arguments_size++) {
                    char        tmp[200];
                    strcpy(tmp, (const char *) arg[a->arguments_size]);
                    STRCPY(a->arguments[a->arguments_size], tmp);
            }
}
Classinfo    *Classinfo::
search(const char *cname)
{
            Int         i;
            i = allclassinfo.size();
            if (i == 0)
                    return (0);
            i = iccfindIndexofC(allclassinfo, (char *) cname);
            if (i == -1)
                    return NULL;
            char     *s = AS(Classinfo, allclassinfo[i])->getname();
            if (strcmp(s, cname) == 0)
```

```
                    return AS(Classinfo, allclassinfo[i]);
        return NULL;
}
extern char    *get_type(int);

other_arg_malloc(char **&other_arg, int *argtypes, int argc)
{
        int        i;
        char       arg_type_buf[100];
        other_arg = (char **) malloc(argc * sizeof(char *));
        for (i = 0; i < argc; i++) {
                strcpy(arg_type_buf, get_type(argtypes[i]));
                /*
                 * if(strcmp(arg_type_buf,"")==0)return -1;
                 */
                other_arg[i] = (char *) malloc(strlen(arg_type_buf) + 1);
                strcpy(other_arg[i], arg_type_buf);
        }
} int        Classinfo::
recursive_find_exact(char *cname, char *mname, char *mtype, struct cast_info * argtypes, int argc, c
r *new_cname, int *cindex)
{
        int        i;
        int        j;
        Classinfo  *bc;
        Classinfo  *a = search(cname);
        if (a == NULL)
                return -2;              /* class not found */
        if (a->method_collection.size() == 0) {          /* look up base classes */
                for (j = 0; j < a->superclass_collection.size(); j++) {
                        bc = AS(Classinfo, a->superclass_collection[j]);
                        i = Classinfo::recursive_find_exact(bc->getname(), mname, mtype, argtypes, argc, new_cr
me, cindex);
                        if (i == -2)
                                return -2;      /* class not found */
                        if (i != -1)
                                return i;
                }
                return -1;              /* searched through all base classes */
        } else {
                i = iccfindIndexofM(a->method_collection, mname);
                if (i == -1) {           /* look up base classes */
                        for (j = 0; j < a->superclass_collection.size(); j++) {
                                bc = AS(Classinfo, a->superclass_collection[j]);
                                i = Classinfo::recursive_find_exact(bc->getname(), mname, mtype, argtypes, arg
new_cname, cindex);
                                if (i == -2)
                                        return -2;      /* class not found */
                                if (i != -1)
                                        return i;
                        }
```

```
                    return -1;        /* searched through all base classes */
        } else {
                for (; i < a->method_collection.size(); i++) {
                        methodinfo    *b = AS(methodinfo, a->method_collection[i]);
                        if (strcmp(b->getname(), mname))
                                break;
                        if (b->exact_match(argc, argtypes)) {
                                strcpy(new_cname, cname);
                                *cindex = b->constructor_index;
                                return b->indexpos;
                        }
                }
                /* arguments do not match look up base classes */
                for (j = 0; j < a->superclass_collection.size(); j++) {
                        bc = AS(Classinfo, a->superclass_collection[j]);
                        i = Classinfo::recursive_find_exact(bc->getname(), mname, mtype, argtypes, arg
new_cname, cindex);
                        if (i == -2)
                                return -2;        /* class not found */
                        if (i != -1)
                                return i;
                }
                return -1;        /* searched through all base classes */
        }
    }
} int        Classinfo::
recursive_find_converted(char *cname, char *mname, char *mtype, struct cast_info * argtypes, int ar
, char *new_cname, int *cindex)
{
        int       i;
        int       j;
        Classinfo *bc;
        Classinfo *a = search(cname);
        if (a == NULL)
                return -2;        /* class not found */
        if (a->method_collection.size() == 0) {        /* look up base classes */
                for (j = 0; j < a->superclass_collection.size(); j++) {
                        bc = AS(Classinfo, a->superclass_collection[j]);
                        i = Classinfo::recursive_find_converted(bc->getname(), mname, mtype, argtypes, argc, ne
cname, cindex);
                        if (i == -2)
                                return -2;        /* class not found */
                        if (i != -1)
                                return i;
                }
                return -1;        /* searched through all base classes */
        } else {
                i = iccfindIndexofM(a->method_collection, mname);
                if (i == -1) {        /* look up base classes */
                        for (j = 0; j < a->superclass_collection.size(); j++) {
                                bc = AS(Classinfo, a->superclass_collection[j]);
```

```
                        i = Classinfo::recursive_find_converted(bc->getname(), mname, mtype, argtypes
rgc, new_cname, cindex);
                                if (i == -2)
                                        return -2;              /* class not found */
                                if (i != -1)
                                        return i;
                        }
                        return -1;              /* searched through all base classes */
                } else {
                        for (; i < a->method_collection.size(); i++) {
                                methodinfo  *b = AS(methodinfo, a->method_collection[i]);
                                if (strcmp(b->getname(), mname))
                                        break;
                                if (b->converted_match(argc, argtypes)) {
                                        strcpy(new_cname, cname);
                                        *cindex = b->constructor_index;
                                        return b->indexpos;
                                }
                        }
                        /* arguments do not match look up base classes */
                        for (j = 0; j < a->superclass_collection.size(); j++) {
                                bc = AS(Classinfo, a->superclass_collection[j]);
                        i = Classinfo::recursive_find_converted(bc->getname(), mname, mtype, argtypes
rgc, new_cname, cindex);
                                if (i == -2)
                                        return -2;              /* class not found */
                                if (i != -1)
                                        return i;
                        }
                        return -1;              /* searched through all base classes */
                }
        }
} int     Classinfo::
getmethodindex(char *cname, char *mname, char *mtype, struct cast_info * argtypes, int argc, char *
w_cname, short *exact_match, int *cindex)
{
        int     index;
index = Classinfo::recursive_find_exact(cname, mname, mtype, argtypes, argc, new_cname, cindex)
        if (index >= 0) {
                *exact_match = 1;
                return index;
        }
index = Classinfo::recursive_find_converted(cname, mname, mtype, argtypes, argc, new_cname, cir
ex);
        *exact_match = 0;
        return index;
} int     Classinfo::
getattrindex(char *cname, char *aname, char *new_cname)
{
```

```
        int     i;
        int     j;
        Classinfo   *bc;
        Classinfo   *a = search(cname);
        if (a == NULL)
                return -2;          /* class not found */
        if (a->attr_collection.size() == 0) {       /* look up base classes */
                for (j = 0; j < a->superclass_collection.size(); j++) {
                        bc = AS(Classinfo, a->superclass_collection[j]);
                        i = Classinfo::getattrindex(bc->getname(), aname, new_cname);
                        if (i == -2)
                                return -2;          /* class not found */
                        if (i != -1)
                                return i;
                }
                return -1;          /* searched through all base classes */
        } else {
                i = iccfindIndexofA(a->attr_collection, aname);
                if (i == -1) {      /* look up base classes */
                        for (j = 0; j < a->superclass_collection.size(); j++) {
                                bc = AS(Classinfo, a->superclass_collection[j]);
                                i = Classinfo::getattrindex(bc->getname(), aname, new_cname);
                                if (i == -2)
                                        return -2;          /* class not found */
                                if (i != -1)
                                        return i;
                        }
                        return -1;          /* searched through all base classes */
                } else {
                        attrinfo    *attr = AS(attrinfo, a->attr_collection[i]);
                        strcpy(new_cname, cname);
                        return attr->indexpos;
                }
        }
} star_seen(char *mname)
{
        int     l = strlen("operator");
        for (int i = strlen(mname); i >= l; i--) {
                if (mname[i] == '*')
                        return 1;
        }
        return 0;
} int
is_operator_something_star(char *mname)
{
        static int  cmp_l = strlen("operator");                 /* compare length */
        if ((strncmp(mname, "operator", cmp_l) == 0) &&
            (star_seen(mname))) {
                return 1;
```

```
            }
            return 0;
} int
unique_pcaster(char *cname, char *operator_name, int initcount)
{
        static int    count;
        methodinfo    *b;
        Classinfo     *c;
        int           ri, i;
        Classinfo     *a = Classinfo::search(cname);
        count = initcount;
        if (a == NULL)
                return 0;              /* class not found */
        if (a->method_collection.size() == 0) {        /* look up base classes */
                for (i = 0; i < a->superclass_collection.size(); i++) {
                        c = AS(Classinfo, a->superclass_collection[i]);
                        ri = unique_pcaster(c->getname(), operator_name, count);
                        if (!ri)
                                return 0;
                }
                /* searched through all base classes */
                return 1;
        } else {
                for (i = 0; i < a->method_collection.size(); i++) {
                        b = AS(methodinfo, a->method_collection[i]);
                        if (is_operator_something_star(b->getname())) {
                                if (strcmp(operator_name, b->getname()) != 0) {
                                        count++;
                                        strcpy(operator_name, b->getname());
                                }                /* if a class and its base class has
                                                  * the same cast operator, it is
                                                  * counted as one */
                        }
                }
                if (count > 1)
                        return 0;
                for (i = 0; i < a->superclass_collection.size(); i++) {
                        c = AS(Classinfo, a->superclass_collection[i]);
                        ri = unique_pcaster(c->getname(), operator_name, count);
                        if (!ri)
                                return 0;
                }
                /* searched through all base classes */
                return 1;
        }
} void      Classinfo::
printall()
```

```
{
        cout << "Class name is " << (const char *) getname() << "\n";
        int     i;
        cout << " Attributes are \n";
        for (i = 0; i < attr_collection.size(); i++) {
                attrinfo    *a = AS(attrinfo, attr_collection[i]);
                printf("         %s %s %d\n", a->getname(), a->attrtype, a->indexpos);

}
        if (subclass_collection.size() == 0)
                return;
        printf("subclass for %s is \n", getname());
        for (i = 0; i < subclass_collection.size(); i++) {
                Classinfo    *a = AS(Classinfo, subclass_collection[i]);
                a->printall();
        }
        printf("end subclass for %s\n", getname());
}
void     Classinfo::
printclasses()
{
        int     i = allclassinfo.size();
        for (int j = 0; j < i; j++) {
                Classinfo    *a = AS(Classinfo, allclassinfo[j]);
                printf("%s\n", a->getname());
                a->printoneclass(1);
        }
}
void     Classinfo::
printoneclass(int level)
{
        int     i, j;
        for (j = 0; j < method_collection.size(); j++) {
                methodinfo    *a = AS(methodinfo, method_collection[j]);
                for (i = 0; i < level; i++)
                        printf("  ");
                printf("method %d %d %s %s: ", j, a->indexpos, a->getname(), a->methodtype);
                for (i = 0; i < a->arguments_size; i++)
                        printf("%s, ", a->arguments[i]);
                printf("\n");
        } if (subclass_collection.size() == 0)
                return;
        for (j = 0; j < subclass_collection.size(); j++) {
                Classinfo    *a = AS(Classinfo, subclass_collection[j]);
                for (i = 0; i < level; i++)
                        printf("  ");
                printf("%s\n", a->getname());
                a->printoneclass(level + 1);
        }
}
```

```
int     Classinfo::
countsuperclass(Classinfo* objclass)
{
        int     i;
        int     size = objclass->superclass_collection.size();
        int     s = size;
        for (i = 0; i < s; i++) {
                Classinfo       *a = AS(Classinfo, objclass->superclass_collection[i]);
                size += countsuperclass(a);
        }
        return (size);
} void    Classinfo::
printderive()
{
        cout << "Class name is " << (const char *) getname() << " - derived from \n";
        int     i;
        cout << "  Attributes are \n";
        for (i = 0; i < attr_collection.size(); i++) {
                attrinfo        *a = AS(attrinfo, attr_collection[i]);
                cout << "          " << a->getname() << " " << a->attrtype << " " << a->indexpos << "\n";
        }
        if (superclass_collection.size() == 0)
                return;
        cout << "superclass for " << getname() << "is \n";
        for (i = 0; i < superclass_collection.size(); i++) {
                Classinfo       *a = AS(Classinfo, superclass_collection[i]);
                a->printderive();
        }
        cout << "end superclass for " << getname() << "\n";
}
int     Classinfo::
init(char *filename)
{
        String          tmpstring[100];
        char            line[1000];
        char            *s;
        int             i, index = -1;
        int             constructor_index = -1;
        int             store_constructor_index;
        char            pre_cname[200];
        Classinfo       *theclass;
        FILE            *f = fopen(filename, "r");
        if (f == NULL)
                return (0);
        pre_cname[0] = 0;
        while (!feof(f)) {
                s = fgets(line, 1000, f);
                if (s == NULL)
                        break;
```

```
                if (strncmp(line, "%%", 2) == 0)
                        break;
                i = strlen(line) - 1;
                if (line[i] == '\n')
                        line[i] = 0;
                i = icc_split(line, tmpstring, 99, ',');
                if (strcmp(pre_cname, tmpstring[0]) != 0) {
                        index = -1;
                        strcpy(pre_cname, tmpstring[0]);
                }
                index++;
                if (i != 4)
                        continue;
                theclass = search((const char *) tmpstring[0]);
                if (!theclass)
                        theclass = new Classinfo((char *) (const char *) tmpstring[0]);
                theclass->addattr((char *) (const char *) tmpstring[2], (char *) (const char *) tmps
ng[3], (char *) (const char *) tmpstring[1], index);
                theclass->addattrdep(tmpstring[3]);
        }
        while (!feof(f)) {
                s = fgets(line, 1000, f);
                if (s == NULL)
                        break;
                if (strncmp(line, "%%", 2) == 0)
                        break;
                i = strlen(line) - 1;
                if (line[i] == '\n')
                        line[i] = 0;
                i = icc_split(line, tmpstring, 99, ',');
                if (i < 2)
                        continue;
                theclass = search(tmpstring[0]);
                if (!theclass)
                        theclass = new Classinfo((char *) (const char *) tmpstring[0]);
                for (index = 1; index < i; index++)
                        theclass->addsuperclass((char *) (const char *) tmpstring[index]);
        }
        index = -1;
        constructor_index = -1;
        pre_cname[0] = 0;
        while (!feof(f)) {
                int extra_flag;
                s = fgets(line, 1000, f);
                if (s == NULL)
                        break;
                i = strlen(line) - 1;
                if (line[i] == '\n')
                        line[i] = 0;
                i = icc_split(line, tmpstring, 99, ',');
                if (strcmp(pre_cname, tmpstring[0]) != 0) {
                        index = -1;
                        constructor_index = -1;
```

```
                strcpy(pre_cname, tmpstring[0]);
        }
        index++;
        if (i < 3)
                continue;
        theclass = search((const char *) tmpstring[0]);
        if (!theclass)
                theclass = new Classinfo((char *) (const char *) tmpstring[0]);
        char nnn[1000];
        strcpy(nnn,tmpstring[2]);
        extra_flag = 0;
        if ((strlen(nnn)!=0) && (nnn[strlen(nnn)-1]==5))
                {
                nnn[strlen(nnn)-1]=0;
                extra_flag = 1;
                tmpstring[2]= nnn;
                }
        if (strcmp(tmpstring[0], tmpstring[2]) == 0) {        /* tmpstring[0]=class
ame
                                                               * 1=methodname *
                constructor_index++;
                store_constructor_index = constructor_index;
        } else {
                store_constructor_index -= 1;
        }
        theclass->addmethod((char *) (const char *) tmpstring[2], extra_flag,(char *) (cor
char *) tmpstring[3], (char *) (const char *) tmpstring[1], index, store_constructor_index, &tmpstring[4
- 4);

theclass->addmethoddep(tmpstring[3], &tmpstring[4], i - 4);
    }
    return (1);
}
```

```c
/*
 * Copyright (c) 1990, Singapore Computer Systems Pte Ptd
 *
 *
 *
 * Object Manipulation Functions module
 *
 */
include "Classinfo.h"
#include "error_code.h"

struct value_struct {
        int     type;
        int     flag;
        union {
                void    *Vvoid;
                void    **V1void;
                void    ***V2void;
                char    *Vchar;
                int     *Vint;
                short   *Vshort;
                double  *Vdouble;
                float   *Vfloat;
        };
};

/************************
 *      GLOBAL VAR      *
 ************************/
char    *assignptr;
int     global_arg_count;
int     global_temp_arg_count;
void    *global_objectptr;
void    *global_temp_objectptr;
char    *indirection;
char    **indirection1;
char    **indirection2;
struct value_struct **global_arguments;
struct value_struct *global_temp_arg0;
struct value_struct *global_return_value;

/************************
 *      EXTERN stuff    *
 ************************/
extern int      bt_index;
extern char     all_types[][30];
extern int      all_index;
extern int      sizeof_array[];
extern char     standard_conversion_matrix[];
extern struct value_struct *(*callmethodfp[]) (int);
extern struct value_struct *(*getattrfp[]) (int);
```

```
extern void    *(*assignfp[]) ();
extern struct value_struct *(*arrayfp[]) (int, int);
extern struct value_struct *(*persistentfp[]) (int);
extern void    (*equalfp[]) (void *, void *);
/*
extern int     get_class_type(char *);
extern int     get_typei(char *);
*/
extern void    *(*castfp[]) (void *, int);
extern int     (*castoperatorfp[]) (char *);
extern int     (*constructorfp[]) (char *);

/*
        returns true if the type is of pointers.
        the 1st element of the group is not a pointer type.
*/
int is_pointer_type( int typei )
{
if ( typei - typei/3*3 )
        return 1;
return 0;
}

/*
        given the type value ( an int ),
        will return the type ( in string ) associated to the value.
*/
char *get_type( int typei )
{
int i;                          // the group the variable belongs to
int j;                          // the element in the group
int k;                          // to genereate the '*'
static char type[100];          // return value if ( ( typei >= ( all_index*3 ) ) || ( typei < 0 ) )
        return NULL;
i = typei / 3;
j = typei % 3;
strcpy( type,all_types[i] );
for( k=0;k<j;k++ )
        strcat( type,"*" );
return type;
}

/*
        returns the class of the given integer value.
*/
char *get_class( int typei )
{
int i;                          // the class the variable belongs to
int j;                          // the element in the class
```

```
static char type[100];          // return value if ( ( typei >= ( all_index*3 ) ) || ( typei < 0) )
        return NULL;
i = typei / 3;
j = typei % 3;
strcpy( type,all_types[i] );
return type;
}

/*
        given the type ,
        returns the value associated to it.  -1 for failure.
*/
int get_class_type( char *s )
{
static int i;

for( i=0;i<all_index;i++ )
        {
        if( strcmp( s, all_types[i] )==0 )
                {
                return i;
                }
        }
return( -1 );                   // unknown type
}

/*
        given the type ( in string ) this function will return an integer value
        associated to it.
*/
int get_typei( char *s )
{
int i;
char temp[100];
char temp1[100];
char temp2[100];

temp2[0] = 0;
sscanf( s, "%[^\"] %s", temp1, temp2 );
i = get_class_type( temp1 );
if ( i >= 0 )
        return( i * 3 + strlen( temp2 ) );
return( -1 );
} is_pointer(char *type)
{
        int        i;
        for (i = strlen(type) - 1; i >= 0; i--) {
                if (type[i] == ' ') {
```

```c
                            /* do nothing */
            } else if (type[i] == '*') {
                    return 1;
            } else {
                    return 0;
            }
        }
    }
} int
get_nbt_typei(char *type)
{
        return (get_typei(type) - (bt_index * 3));
} int
get_nbt_classi(char *type)
{
        return (get_class_type(type) - bt_index);
} int
get_sizeof(char *type)
{
        int       i;
        if (is_pointer(type))
                    return sizeof_array[0];
        for (i = 1; i < all_index; i++) {
                    if (strcmp(all_types[i], type) == 0) {
                            return sizeof_array[i];
                    }
        }
        return -1;
} void Classinfo_init(char* file_name)
{
    if(!Classinfo::init(file_name)){
            fprintf(stderr,"Classinfo::init() failed\ncannot find file %s\n"
,file_name);
        }
} int getmethodindex(char*a,char*b,char*c,struct cast_info*d,int e,char*f,short*g,
int*h)
{
     return Classinfo::getmethodindex(a,b,c,d,e,f,g,h);
} int getattrindex(char*a ,char*b,char*c)
{
     return Classinfo::getattrindex(a,b,c);
}
```

```
         malloc_global_arg(struct cast_info *, int, struct value_struct *[]);
int      allow_cast(int, int, int, char *);
void     *cast(void *, int, int);
char     *get_type(int);
char     *get_class(int);
int      getmethodindex(char *, char *, char *, struct cast_info *, int, char *, short *, int *);

char     *
call_method(char *class_name, void *objectptr, char *method_name, struct value_struct * arg[], int co
nt)
{
         struct cast_info *type_array;
         int     i, index, constructor_index;
         short   exact_match;
         char    new_classname[100];
         int     classi, newclassi;              /* these i's are from
                                                  * attr_info_arrays */
         type_array = (struct cast_info *) malloc(count * sizeof(struct cast_info));
         global_arg_count = count;
         for (i = 0; i < count; i++) {
                 type_array[i].type = arg[i]->type;
         }
         index = getmethodindex(class_name, method_name, "", type_array, count, new_classnam
&exact_match, &constructor_index);
         if (index == -1)
                 return (char *) METHOD_NOT_FOUND;
         if (index == -2)
                 return (char *) CLASS_NOT_FOUND;
         if (exact_match) {
                 global_arguments = (struct value_struct **) malloc(count * sizeof(void *));
                 for (i = 0; i < count; i++) {
                         global_arguments[i] = arg[i];
                         global_arguments[i]->flag = global_arguments[i]->flag | 0x02;
/* setting 2nd bit to 1;

* exact match */
                 }
         } else {
                 if (malloc_global_arg(type_array, count, arg) == -1)
                         return (char *) -1;
         }
         classi = get_class_type(class_name);
         if (strcmp(class_name, new_classname) == 0) {
                 global_objectptr = objectptr;
                 return ((char *) callmethodfp[classi - bt_index] (index));
         } else {
                 newclassi = get_class_type(new_classname);
                 /*
                  * allow_cast is true only when a class pointer may be
                  * converted to its base class pointer or to void*
                  */
```

```
                if (!allow_cast(classi, newclassi, all_index, standard_conversion_matrix))
                        return (char *) D_TO_B_CAST_FAILED;
                global_objectptr = cast(objectptr, classi, newclassi);
                return ((char *) callmethodfp[newclassi - bt_index] (index));
        }
} char        *
get_attribute(char *class_name, void *objectptr, char *attribute_name)
{
        int        i = 0;
        int        classi, newclassi;
        char        new_classname[100];
        int        getattrindex(char *, char *, char *);

i = getattrindex(class_name, attribute_name, new_classname);
        if (i == -1)
                return (char *) ATTR_NOT_FOUND;
        if (i == -2)
                return (char *) CLASS_NOT_FOUND;
        classi = get_class_type(class_name);
        if (strcmp(class_name, new_classname) == 0) {
                global_objectptr = objectptr;
                return ((char *) getattrfp[classi - bt_index] (i));
        } else {
                newclassi = get_class_type(new_classname);
                /*
                 * allow_cast is true only when a class pointer may be
                 * converted to its base class pointer
                 */
                if (!allow_cast(classi, newclassi, all_index, standard_conversion_matrix))
                        return (char *) D_TO_B_CAST_FAILED;
                global_objectptr = cast(objectptr, classi, newclassi);
                return ((char *) getattrfp[newclassi - bt_index] (i));
        }

}                                        /* end of get_attribute */ void        *
call_assign(struct value_struct * vs_ptr)
{
        int        fff = vs_ptr->type;
        if (fff - fff / 3 * 3) {
                struct value_struct *xxx = (struct value_struct *) malloc(sizeof(struct value_struct
                xxx->type = vs_ptr->type;
                xxx->flag = 0;
                xxx->Vvoid = vs_ptr->Vvoid;
                return xxx;
        }
        global_arguments = (struct value_struct **) malloc(sizeof(void *));
```

```
        /* malloc one element of global_arguments */
        global_arg_count = 1;
        global_arguments[0] = (struct value_struct *) vs_ptr;
        return assignfp[vs_ptr->type / 3] ();
}                                       /* end of call assign */ struct value_struct *
call_array(char *class_name, int c1, int c2)
{
        int        i;
        i = get_class_type(class_name);
        if (i < bt_index)
                return (struct value_struct *) - 1;
        return arrayfp[i - bt_index] (c1, c2);
        /* -bt_index because not applicable to basic types */
} struct value_struct *
call_persistent(char *class_name, struct value_struct * arg[], int count)
{
        struct cast_info *type_array;
        int        i, index, constructor_index;
        short      exact_match;
        char       new_classname[100];
        int        classi;

type_array = (struct cast_info *) malloc(count * sizeof(struct cast_info));
        for (i = 0; i < count; i++) {
                type_array[i].type = arg[i]->type;
        }
        index = getmethodindex(class_name, class_name, "", type_array, count, new_classname,
exact_match, &constructor_index);
        if (index < 0)
                return (struct value_struct *) - 1;
        global_arg_count = count;
        if (exact_match) {
                global_arguments = (struct value_struct **) malloc(count * sizeof(void *));
                for (i = 0; i < count; i++) {
                        global_arguments[i] = arg[i];
                        global_arguments[i]->flag = global_arguments[i]->flag | 0x02;
/* setting 2nd bit to 1;

* exact match */
                }
        } else {
                if (malloc_global_arg(type_array, count, arg) == -1)
                        return (struct value_struct *) - 1;
        }
        classi = get_class_type(class_name);
        return (persistentfp[classi - 12] (constructor_index));
```

}

```
void
call_equal(void *to, void *from, int classi)
{
        equalfp[classi] (to, from);
} void    *
cast(void *objectptr, int classi, int newclassi)
{
        int     nbt_classi;

if (classi == newclassi)
                return objectptr;
        if ((classi < bt_index) || (newclassi < bt_index))
                return (void *) -1;
        nbt_classi = classi - bt_index;
        return ((void *) castfp[nbt_classi] (objectptr, newclassi));
} allow_cast_or_construct(int from_type, int to_type, char *c_or_t)
{
        int     flag;
        int     i;
        char    st[100];

if (from_type > (bt_index * 3)) {               /* non basic types: look for
                                                         * cast operator */
                i = from_type / 3 - bt_index;
                strcpy(st, get_type(to_type));
                flag = castoperatorfp[i] (st);
                if (flag) {
                        *c_or_t = 't';
                        return 1;
                }
                i = to_type / 3 - bt_index;
                strcpy(st, get_type(from_type));
                flag = castoperatorfp[i] (st);
                if (flag) {
                        *c_or_t = 't';
                        return 1;
                }
        } else {
                i = to_type / 3 - bt_index;
                strcpy(st, get_type(from_type));
                flag = constructorfp[i] (st);
                if (flag) {
                        *c_or_t = 'c';
                        return 1;
```

```
                }
        }
        return 0;
} int
allow_cast(int classi, int newclassi, int i, char *matrix)
{
        char    bitmask;
        int     arrayi;         /* byte number */
        int     bitpos;         /* bit position */ if (classi == newclassi)
                return 1;
        if (newclassi == 0)
                return 1;              /* all pointers can be cast to void* */
        if ((classi >= bt_index) && (newclassi >= bt_index)) {       /* non basic types */
                /* standard conversion */
                classi -= bt_index;
                newclassi -= bt_index;
                bitpos = classi * (i - bt_index) + newclassi;
                arrayi = (bitpos) / 8;
                bitmask = 1 << ((bitpos) & 7);
                return (matrix[arrayi] & bitmask);
        } else if ((classi < bt_index) && (newclassi < bt_index)) {
                /* integral promotion */
                bitpos = classi * i + newclassi;
                arrayi = (bitpos) / 8;
                bitmask = 1 << ((bitpos) & 7);
                return (matrix[arrayi] & bitmask);
        } else {
                return 0;
        }
} struct value_struct *
call_one_arg_constructor(char *class_name, int i, struct value_struct * arg)
{
        int     index, ci;
        short   em;
        char    new_class_name[100];
        struct cast_info *type_array1;
        int     classi;

type_array1 = (struct cast_info *) malloc(sizeof(struct cast_info));
        type_array1[0].type = arg->type;
        index = getmethodindex(class_name, class_name, "", type_array1, 1, new_class_name, &
m, &ci);
        if (!em) {
                printf("error in call_one_arg_constructor");
                return (struct value_struct *) - 1;
        }
```

```
        if (index < 0)
                return (struct value_struct *) - 1;
        if (i > 0)
                global_temp_arg0 = global_arguments[0];
        global_arguments[0] = arg;
        global_temp_arg_count = global_arg_count;
        global_arg_count = 1;
        global_arguments[0]->flag = global_arguments[0]->flag | 0x2;
        /* 2nd bit to 1 */
        global_arguments[0]->flag = global_arguments[0]->flag & ~(0x4);
        /*
         * set 3rd bit to 0 so that global_arg won't be free'd when methodx
         * is called
         */
        classi = get_class_type(class_name);
        return (callmethodfp[classi - bt_index] (index));
} struct value_struct *
call_cast_operator(char *class_name, char *method_name, void *objectptr)
{
        int        index, ci;
        short      em;
        char       ncn[100];
        int        classi;

global_temp_objectptr = global_objectptr;
        global_objectptr = objectptr;
        index = getmethodindex(class_name, method_name, "", 0, 0, ncn, &em, &ci);
        if (index < 0)
                return (struct value_struct *) - 1;
        classi = get_class_type(class_name);
        return (callmethodfp[classi - bt_index] (index));
} promote_1b_to_2b(struct value_struct * to, struct value_struct * from)
{
        *to->Vshort = (short) *from->Vchar;
} promote_1b_to_1b(struct value_struct * to, struct value_struct * from)
{
        *to->Vchar = (char) *from->Vchar;
} promote_2b_to_2b(struct value_struct * to, struct value_struct * from)
{
        *to->Vshort = (short) *from->Vshort;
} promote_4b_to_4b(struct value_struct * to, struct value_struct * from)
```

```
{
        *to->Vint = (int) *from->Vint;
} promote_8b_to_8b(struct value_struct * to, struct value_struct * from)
{
        *to->Vdouble = (double) *from->Vdouble;
} promote_1b_to_4b(struct value_struct * to, struct value_struct * from)
{
        *to->Vint = (int) *from->Vchar;
} promote_1b_to_8b(struct value_struct * to, struct value_struct * from)
{
        *to->Vdouble = (double) *from->Vchar;
} promote_2b_to_4b(struct value_struct * to, struct value_struct * from)
{
        *to->Vint = (int) *from->Vshort;
} promote_2b_to_8b(struct value_struct * to, struct value_struct * from)
{
        *to->Vdouble = (double) *from->Vshort;
} promote_4b_to_8b(struct value_struct * to, struct value_struct * from)
{
        *to->Vdouble = (double) *from->Vfloat;
} integral_promotion(struct value_struct * promote_to, struct value_struct * promote_from)
{
        switch (get_sizeof(get_type(promote_to->type))) {
        case 1:{
                switch (get_sizeof(get_type(promote_from->type))) {
                case 1:
                        promote_1b_to_1b(promote_to, promote_from);
                        break;
                }
                break;
        }
        case 2:{
                switch (get_sizeof(get_type(promote_from->type))) {
                case 1:
                        promote_1b_to_2b(promote_to, promote_from);
                        break;
                case 2:
                        promote_2b_to_2b(promote_to, promote_from);
                        break;
```

```
                    }
                    break;
            }
        case 4:{
                    switch (get_sizeof(get_type(promote_from->type))) {
                    case 1:
                            promote_1b_to_4b(promote_to, promote_from);
                            break;
                    case 2:
                            promote_2b_to_4b(promote_to, promote_from);
                            break;
                    case 4:
                            promote_4b_to_4b(promote_to, promote_from);
                            break;
                    }
                    break;
            }
        case 8:{
                    switch (get_sizeof(get_type(promote_from->type))) {
                    case 1:
                            promote_1b_to_8b(promote_to, promote_from);
                            break;
                    case 2:
                            promote_2b_to_8b(promote_to, promote_from);
                            break;
                    case 4:
                            promote_4b_to_8b(promote_to, promote_from);
                            break;
                    case 8:
                            promote_8b_to_8b(promote_to, promote_from);
                            break;
                    }
                    break;
            }
        default:
                    printf("integral promotion to char 1byte\n");
        }
} integral_promotion_malloc(struct cast_info * type_array, int i, struct value_struct * arg[])
{
        global_arguments[i] = (struct value_struct *) malloc(sizeof(struct value_struct));
        global_arguments[i]->type = type_array[i].type;
        global_arguments[i]->flag = global_arguments[i]->flag & ~(0x2);
        /* 2nd bit 0,not an exact matcH */
        indirection = malloc(get_sizeof(get_type(type_array[i].type)));
        global_arguments[i]->Vvoid = indirection;
        integral_promotion(global_arguments[i], arg[i]);
} do_exact_match(struct cast_info * type_array, int i, struct value_struct * arg[])
{
```

```
                global_arguments[i] = arg[i];
                global_arguments[i]->type = arg[i]->type;
                global_arguments[i]->flag = global_arguments[i]->flag | 0x2;
                /* set 2nd bit, exact match */
} cast_operator_malloc(struct cast_info * type_array, int i, struct value_struct * arg[])
{
        char        class_name[100];
        char        method_name[100];
        strcpy(method_name, "operator ");
        strcat(method_name, get_type(type_array[i].type));
        strcpy(class_name, get_class(arg[i]->type));
        global_temp_objectptr = global_objectptr;
        global_arguments[i] = call_cast_operator(class_name, method_name, arg[i]->Vvoid);
        global_objectptr = global_temp_objectptr;
        global_arguments[i]->type = type_array[i].type;
        global_arguments[i]->flag = 0x0;
} constructor_malloc(struct cast_info * type_array, int i, struct value_struct * arg[])
{
        global_arguments[i] = call_one_arg_constructor(get_class(type_array[i].type), i, arg[i]);
        if (i > 0)
                global_arguments[0] = global_temp_arg0;
        global_arguments[0]->flag = global_arguments[0]->flag | 0x4;
        /* set 3rd bit of 1st global_arg to free the entire global_arg */
        global_arg_count = global_temp_arg_count;
};

malloc_global_arg(struct cast_info * type_array, int count, struct value_struct * arg[])
{
        int        i;
        global_arguments = (struct value_struct **) malloc(count * sizeof(void *));
        for (i = 0; i < count; i++) {
                if (type_array[i].type_of_conversion == 'i') {
                        integral_promotion_malloc(type_array, i, arg);
                } else if (type_array[i].type_of_conversion == 'e') {
                        do_exact_match(type_array, i, arg);
                } else if (type_array[i].type_of_conversion == 't') {
                        cast_operator_malloc(type_array, i, arg);
                } else if (type_array[i].type_of_conversion == 'c') {
                        constructor_malloc(type_array, i, arg);
                } else if (type_array[i].type_of_conversion == 's') {
                        global_arguments[i] = (struct value_struct *) malloc(sizeof(struct value_struct));
                        int        is_pointer_type(int);
                        if ((!is_pointer_type(type_array[i].type)) &&
                            (!is_pointer_type(arg[i]->type))) {
                                void        *tmp = cast(arg[i]->Vvoid, arg[i]->type / 3, type_ar
```

```
                                                    if (tmp == (void *) -1)
y[i].type / 3);                                             goto e1;
                                                    global_arguments[i]->type = type_array[i].type;
                                                    global_arguments[i]->flag = 0x02;
                                                    global_arguments[i]->Vvoid = tmp;
                                } else {
                        e1:
                                    printf("call_method: bad casting - from %s to %s\n", get_type
rg[i]->type), get_type(type_array[i].type));
                                    return -1;
                                }
                        }
                }
        }
}
void
free_global_arg()
{
        int     i;
        int     number_ind;
        int     exact_match;
        int     free_entire_global = 0;
        if (global_arg_count <= 0)
                goto efga;
        if (global_arguments[0]->flag & 0x4)
                free_entire_global = 1;
        for (i = 0; i < global_arg_count; i++) {
                exact_match = global_arguments[i]->flag & 0x02;
                if ((global_arguments[i]->type < 36)          /* basic types */
                        &&(!exact_match)) {    /* did not malloc a new copy of
                                                * value_struct if exact_match, don't
                                                * have to free */
                        number_ind = global_arguments[i]->type % 3;
                        switch (number_ind) {
                        case 0:
                                free((char *) global_arguments[i]->Vvoid);
                                global_arguments[i]->Vvoid = 0;
                                free((char *) global_arguments[i]);
                                global_arguments[i] = 0;
                                break;
                        case 1:
                                free((char *) *global_arguments[i]->V1void);
                                global_arguments[i]->V1void = 0;
                                free((char *) global_arguments[i]->Vvoid);
                                global_arguments[i]->Vvoid = 0;
                                free((char *) global_arguments[i]);
                                global_arguments[i] = 0;
                                break;
                        case 2:
                                free((char *) **global_arguments[i]->V2void);
                                global_arguments[i]->V2void = 0;
                                free((char *) *global_arguments[i]->V1void);
```

```
                                global_arguments[i]->V1void = 0;
                                free((char *) global_arguments[i]->Vvoid);
                                global_arguments[i]->Vvoid = 0;
                                free((char *) global_arguments[i]);
                                global_arguments[i] = 0;
                                break;
                        }
                }
        }
        if (free_entire_global)
                free((char *) global_arguments);
efga:   ;
} void
method_malloc(unsigned int size, int type)
{
        global_return_value = (struct value_struct *) malloc(sizeof(struct value_struct));
        assignptr = malloc(size);
        global_return_value->type = type;
        global_return_value->flag = 0;
        global_return_value->Vvoid = (void *) assignptr;
} void
value_struct_malloc(int type)
{
        global_return_value = (struct value_struct *) malloc(sizeof(struct value_struct));
        global_return_value->flag = 0;
        global_return_value->type = type;
}
```

```
/*
 * Copyright (c) 1990, Singapore Computer Systems Pte Ptd
 *
 *
 *
 * error code for object handler
 *
 *
 */
#define    ATTR_FUNCTION_PTR              -100
#define    ABSTRACT_CLASS                 -101
#define    CONSTRUCTOR_ABS                -102    /* construct an abs class ?? */
#define    DESTRUCTOR_ABS                 -103
#define    UNKNOWN_ARG_TYPE               -104
#define    UNKNOWN_RET_TYPE               -105
#define RETURN_ABS                        -106    /* return type is an abstract class */
#define    VOID_ASSIGN                    -107    /* can't call_assign with void */
#define    NO_METHOD                      -108    /* class has no method */
#define    NO_ATTR                        -109    /* class has no attr */
#define    PERSISTENT_NDFP                -110    /* call_persistent ;not derived from
                                                   * pObject */
#define    ARRAY_ABS                      -111    /* call_array abstract class */
#define    NO_CONSTRUCTOR_WO_ARG          -112    /* no constructor with 0 arg --
                                                   * call_array */
#define    D_TO_B_CAST_FAILED             -113    /* cast from derived* to base* failed */
#define    PERSISTENT_ABS                 -114    /* call_persistent abstract class */
#define CLASS_NOT_FOUND                   -115
#define METHOD_NOT_FOUND                  -116
#define ATTR_NOT_FOUND                    -117
#define PRIVATE_MEMBER                    -118
#define NO_G_PCLASS_PTR                   -119    /* no global pClass ptr seen */
```

What is claimed is:

1. A method implemented by a computer system to cause said computer system to execute an object-oriented source code of an object-oriented language, comprising the steps of:

writing a plurality of classes using object-oriented source code of said object-oriented language;

executing a compiler to thereby compile said plurality of classes written using said object-oriented language to create a class library of compiled classes;

scanning said class library containing said compiled classes to determine class definition information;

using said class definition information to produce object manipulation functions that allow said computer system to access the methods and attributes of said compiled classes to manipulate the objects of said compiled classes, comprising the steps of:

generating object manipulation functions source code, in said object-oriented language, using said class definition information; and compiling said object manipulation functions source code into object manipulation functions object code;

using said class definition information to produce dispatch tables containing addresses to said object manipulation functions comprising the steps of:

generating dispatch tables source code in said object-oriented language, using said class definition information; and compiling said dispatch tables source code into dispatch tables object code;

interpreting a source code written using said object-oriented language, said source code including statements seeking access to one or more of said compiled classes within said class library; and invoking previously written object entry functions which provide entry into said dispatch tables to activate said object manipulation functions during said step of said computer system interpreting said source code, at references within said source code to said compiled classes, thereby causing said computer system to use said object-oriented source code to access said compiled classes.

2. A method as in claim 1 wherein said step of scanning said class library includes the step of selecting one or more compiled classes from said class library so that only said selected one or more compiled classes can be accessed by said computer system during said step of interpreting said object-oriented source code.

3. A method implemented by a computer system to cause said computer system to execute an object-oriented source code of an object-oriented language, said computer system including a class library containing a plurality of compiled classes which have been compiled from classes written using source code of said object-oriented language, comprising the steps of:

scanning said class library containing said compiled classes to determine class definition information;

using said class definition information to produce object manipulation functions that access the methods and attributes of said compiled classes to manipulate the objects of said compiled classes, comprising the steps of:

generating object manipulation function source code, in said object-oriented language, using said class definition information; and compiling said object manipulation function source code into object manipulation functions object code;

using said class definition information to produce dispatch tables containing addresses to said object manipulation functions comprising the steps of:

generating dispatch tables source code in said object-oriented language, using said class definition information; and compiling said dispatch tables source code into dispatch tables object code;

interpreting a source code written using said object-oriented language, said source code including statements seeking access to one or more of said compiled classes within said class library; and invoking previously written object entry functions which provide entry into the dispatch tables to activate the object manipulation functions during said step of interpreting said source code, at references within said source code to said compiled classes, thereby causing said computer system to use said object-oriented source code to access said compiled classes.

4. A method as in claim 3 wherein said step of scanning said class library includes the step of selecting one or more classes from said class library so that only said selected one or more compiled classes can be accessed by said computer system during said step of interpreting said object-oriented source code.

5. A method implemented by a computer system to cause said computer system to execute an interactive database query of an object-oriented database comprising the steps of:

writing a plurality of classes using an object-oriented code of an object-oriented language;

compiling said plurality of classes written using said object-oriented language to create a class library of compiled classes;

scanning said class library containing said compiled classes to determine class definition information;

using said class definition information to produce object manipulation functions that access the methods and attributes of said compiled classes to manipulate the objects of said compiled classes comprising the steps of:

generating object manipulation functions source code, in said object-oriented language, using said class definition information; and compiling said object manipulation functions source code into object manipulation functions object code;

using said class definition information to produce dispatch tables containing addresses to said object manipulation functions comprising the steps of:

generating dispatch tables source code in said object-oriented language, using said class definition information; and compiling said dispatch tables source code into dispatch tables object code;

preprocessing a database query written using an object-oriented database query language into a source code of an object-oriented language, said source code including statements seeking access to one or more of said compiled classes within said class library;

interpreting said source code; and invoking previously written object entry functions which provide entry into said dispatch tables to activate said object manipulation functions during said step of interpreting said source code, at references within said source code to said compiled classes, thereby causing said computer system to use said source code to access said compiled classes.

6. A method as in claim 5 wherein said step of scanning said class library includes the step of selecting one or more compiled classes from said class library so that only said selected one or more compiled classes can be accessed by said computer system during said step of interpreting said object-oriented source code.

7. A method implemented by a computer system to cause said computer system to execute an interactive database query of an object-oriented database, said computer system including a class library containing a plurality of compiled classes which have been compiled from classes written using source code of said object-oriented language, comprising the steps of:

scanning said class library containing said compiled classes to determine class definition information;

using said class definition information to produce object manipulation functions that access the methods and attributes of said compiled classes to manipulate the objects of said compiled classes comprising the steps of:
generating object manipulation function source code, in said object-oriented language, using said class definition information; and
compiling said object manipulation function source code into object manipulation functions object code;

using said class definition information to produce dispatch tables containing addresses to said object manipulation functions, comprising the steps of:
generating dispatch tables source code in said object-oriented language using said class definition information; and
compiling said dispatch tables source code into dispatch tables object code;

preprocessing a database query written using an object-oriented database query language into a source code of an object-oriented language, said source code including statements seeking access to one or more of said compiled classes within said class library;

interpreting said source code; and invoking previously written object entry functions which provide entry into said dispatch tables to activate said object manipulation functions during said step of interpreting said source code, at reference within said source code, as executed by said computer system to said compiled classes, thereby causing said source code to access said compiled classes.

8. A method as in claim 7 wherein said step of scanning said class library includes the step of selecting one or more compiled classes from said class library so that only said selected one or more compiled classes can be accessed by said object-oriented source code.

9. A computer system to execute an object-oriented source code of an object-oriented language comprising:

means for storing a class library comprising one or more classes defined in object code generated from source code of an object-oriented language;

means for storing a to-be-executed code written in source code of said object-oriented language;

means for manipulating said computer system in order to interpret said to-be-executed source code, said means for manipulating comprising:
means for accessing said class library to obtain class definition information;
a first means for using said class definition information to produce object manipulation functions which access the methods and attributes of said classes to manipulate the objects of said classes, comprising:
a first means for operating said computer system to generate object manipulation function source code, in said object-oriented language, using said class definition information; and
a second means for operating said computer system to compile said object manipulation function source code into object manipulation functions object code;
a second means for using said class definition information to produce dispatch tables containing addresses to said object manipulation functions comprising:
a first means for using said class definition information to generate dispatch tables source code, in said object-oriented language using said class definition information; and
a second means for compiling said dispatch tables source code into dispatch tables object code;
means for providing entry into said dispatch tables, to activate said object manipulation functions, thereby accessing said compiled classes of said class library; and
means for interpreting said to-be-executed source code and invoking said means for providing entry at locations within said to-be-executed source code which reference said compiled classes of said class library thereby causing said to-be-executed source code to access said compiled classes in said class library.

10. A computer system as in claim 9 wherein said means for accessing said class library to obtain class definition information comprises means for selecting one or more compiled classes from said class library so that only said selected one or more compiled classes can be accessed by said to-be executed source code.

11. A computer system to execute an interactive database query comprising:

means for storing a class library comprising one or more classes defined in object code from source code of an object-oriented language;

means for storing a to-be-executed code written in an object-oriented database query language;

means for manipulating said computer system in order to interpret said to-be-executed source code, said means for manipulating comprising:
means for accessing said class library to obtain class definition information;
a first means for using said class definition information to produce object manipulation functions which access the methods and attributes of said classes to manipulate the objects of said classes, comprising:
a first means for generating object manipulation function source code, in said object-oriented language, using said class definition information; and
a second means for compiling said object manipulation function source code into object manipulation functions object code;
a second means for using said class definition information to produce dispatch tables containing addresses to said object manipulation functions comprising the steps of:
a first means for using said class definition information to generate dispatch tables source code, in said object-oriented language, using said class definition information; and a second means for compiling said dispatch tables source code into dispatch tables object code;

means for providing entry into said dispatch tables to activate said object manipulation functions, thereby accessing said compiled classes of said class library;

means for preprocessing said to-be-executed source code into a source code of an object-oriented language; and means for interpreting said source code of said object-oriented language and invoking said means for providing entry at locations within said source code which reference said compiled classes of said library thereby causing said source code to access said compiled classes in said class library.

12. A computer system as in claim 11 wherein said means for accessing said class library to obtain class definition information comprises means for selecting one or more compiled classes from said class library so that only said selected one or more compiled classes can be accessed by said to-be executed source code.

* * * * *